US012673678B2

(12) United States Patent　　(10) Patent No.: US 12,673,678 B2
　　Xu et al.　　　　　　　　　　　(45) Date of Patent: Jul. 7, 2026

---

(54) ECO-PILOT-ENERGY-EFFICIENT VEHICLE SPEED ADVISORY THROUGH VEHICLE-TO-INFRASTRUCTURE COMMUNICATIONS

(71) Applicants: UT-Battelle, LLC, Oak Ridge, TN (US); Alliance for Energy Innovation, LLC, Golden, CO (US)

(72) Inventors: Haowen Xu, Knoxville, TN (US); Jinghui Yuan, Knoxville, TN (US); Chieh Wang, Knoxville, TN (US); Timothy LaClair, Lenoir City, TN (US); Andreas Silvan Berres, Lakewood, CO (US); Wan Li, Knoxville, TN (US); Yunli Shao, Knoxville, TN (US); Hong Wang, Knoxville, TN (US); Jibonananda Sanyal, Littleton, CO (US)

(73) Assignees: UT-Battelle, LLC, Oak Ridge, TN (US); Alliance for Energy Innovation, LLC, Golden, CO (US)

( * ) Notice: Subject to any disclaimer, the term of this patent is extended or adjusted under 35 U.S.C. 154(b) by 0 days.

(21) Appl. No.: 18/920,302

(22) Filed: Oct. 18, 2024

(65) Prior Publication Data

US 2025/0128708 A1 　　Apr. 24, 2025

Related U.S. Application Data

(60) Provisional application No. 63/544,962, filed on Oct. 20, 2023.

(51) Int. Cl.
　B60W 30/14 　　　(2006.01)
　B60W 30/18 　　　(2012.01)
　　　　(Continued)

(52) U.S. Cl.
　CPC .... B60W 30/143 (2013.01); B60W 30/18154 (2013.01); B60W 50/0097 (2013.01);
　　　　(Continued)

(58) Field of Classification Search
　CPC ......... B60W 30/143; B60W 30/18154; B60W 50/0097; B60W 50/16; B60W 60/001;
　　　　(Continued)

(56) References Cited

U.S. PATENT DOCUMENTS 9,633,560 B1　　4/2017　Gao et al.
　11,508,238 B2　11/2022　Sui
　　　　(Continued)

OTHER PUBLICATIONS

Subramaniyan, A. B., Wang, C., Shao, Y., Li, W., Wang, H., Zhang, G., & Ma, T. (Sep. 2, 2022). Hybrid Recurrent Neural Network Modeling for Traffic Delay Prediction at Signalized Intersections Along an Urban Arterial. IEEE Transactions on Intelligent Transportation Systems.

(Continued)

*Primary Examiner* — Alan D Hutchinson
(74) *Attorney, Agent, or Firm* — Fox Rothschild LLP; Carol E. Thorstad-Forsyth

(57) ABSTRACT

Systems and methods for controlling the speed of a vehicle traveling over a terrain. The methods comprise: predicting, by a mobile device (MD), a queue length defined by the number of vehicles in a queue at a downstream intersection based on a traffic volume and vehicle speeds that were detected during a past period of time by a detector located at or near an upstream intersection; sensing, by MD's sensor(s), the vehicle's velocity and location; computing a distance to a downstream intersection from the vehicle's location; generating a desired speed for the vehicle based on the traffic volume and vehicle speeds, signal phase and timing data for at least the next two cycles, the predicted queue length at the downstream intersection, the vehicle's (Continued)

2700

Begin 2702

Control a vehicle to travel over terrain 2704

Obtain, by the mobile device, detected traffic volume and speed data for a past N minutes (from a first detector located at or in proximity to an upstream intersection) from a cloud-based system 2706

Obtain, by the mobile device, signal phase and timing (SPaT) data for at least the next two cycles from the cloud-based system 2708

Estimate, by the mobile device, a number of vehicles in a queue at a downstream intersection based on the detected traffic volume and speed data received in block 2706 2710

Sense, by the mobile device, a velocity and location of the vehicle 2712

Compute, by the mobile device, a distance to the downstream intersection from the sensed location of the vehicle 2714

Optionally obtain, by the mobile device, speed limits associated with roads along which the vehicle is to travel to reach the downstream intersection 2716

Obtain, by the mobile device, a current time 2718

Generate, by the mobile device, a desired speed for the vehicle based on the information obtained and/or generated in blocks 2706-2718 2720

Output the desired speed from the mobile device 2722

Communicate the desired speed from the mobile device to the vehicle's on-board computing device 2724

Optionally output the desired speed from the vehicle's on-board computing device 2726

A

Go To FIG. 27B velocity and location, the distance to the downstream intersection, and a current time; and using the desired speed to facilitate control of the speed of the vehicle.

17 Claims, 56 Drawing Sheets

(51) Int. Cl.

| | |
|---|---|
| *B60W 50/00* | (2006.01) |
| *B60W 50/14* | (2020.01) |
| *B60W 50/16* | (2020.01) |
| *B60W 60/00* | (2020.01) |
| *G08G 1/01* | (2006.01) |
| *G08G 1/052* | (2006.01) |
| *G08G 1/08* | (2006.01) |

(52) U.S. Cl.
CPC .......... *B60W 50/16* (2013.01); *B60W 60/001* (2020.02); *G08G 1/0116* (2013.01); *G08G 1/0125* (2013.01); *G08G 1/052* (2013.01); *G08G 1/08* (2013.01); *B60W 2050/0083* (2013.01); *B60W 2050/143* (2013.01); *B60W 2050/146* (2013.01); *B60W 2420/408* (2024.01); *B60W 2554/4042* (2020.02); *B60W 2554/406* (2020.02); *B60W 2555/60* (2020.02); *B60W 2556/10* (2020.02)

(58) Field of Classification Search
CPC ... B60W 2050/0083; B60W 2050/143; B60W 2050/146; B60W 2420/408; B60W 2554/4042; B60W 2554/406; B60W 2555/60; B60W 2556/10; B60W 2300/152; B60W 2420/403; B60W 2556/50; B60W 30/18145; B60W 40/114; B60W 60/0025; G08G 1/0116; G08G 1/0125; G08G 1/052; G08G 1/08; G08G 1/0112; G08G 1/0133; G08G 1/0145; G08G 1/096725
See application file for complete search history.

(56) References Cited

U.S. PATENT DOCUMENTS

| | | | |
|---|---|---|---|
| 11,900,799 | B2 | 2/2024 | Mitra et al. |
| 12,249,237 | B2 | 3/2025 | Scigliano et al. |
| 12,307,892 | B2 | 5/2025 | Jang et al. |
| 12,371,020 | B2 | 7/2025 | Zeiynali Farid et al. |
| 2012/0056994 | A1 | 3/2012 | Fyffe |
| 2021/0201669 | A1 | 7/2021 | Mitra et al. |
| 2021/0217306 | A1* | 7/2021 | Urmson ........... G08G 1/096775 |
| 2023/0053704 | A1 | 2/2023 | Denny et al. |

OTHER PUBLICATIONS

Xu, H., Berres, A., Wang, C. R., LaClair, T. J., & Sanyal, J. (Jun. 28, 2021). Visualizing Vehicle Acceleration and Braking Energy at Intersections along a Major Traffic Corridor. In Proceedings of the Twelfth ACM International Conference on Future Energy Systems (pp. 401-405).

Xu, H., Berres, A., Tennille, S. A., Ravulaparthy, S. K., Wang, C., & Sanyal, J. (Aug. 17, 2021). Continuous Emulation and Multiscale Visualization of Traffic Flow Using Stationary Roadside Sensor Data. IEEE Transactions on Intelligent Transportation Systems.

* cited by examiner

| Direction | Queue Effect | 0% | 20% | 40% | 60% | 80% | 100% |
|---|---|---|---|---|---|---|---|
| EB | Without Queue | -0.66 | 3.46 | 4.65 | 4.77 | 5.21 | 6.28 |
| | Implementable Queue | | 7.88 | 9.06 | 9.39 | 10.04 | 10.92 |
| | Ideal Queue | | 8.92 | 10.02 | 9.92 | 10.62 | 11.65 |
| WB | Without Queue | 5.53 | 9.78 | 10.17 | 9.65 | 9.95 | 10.33 |
| | Implementable Queue | | 15.49 | 17.22 | 18.21 | 18.97 | 19.42 |
| | Ideal Queue | | 17.09 | 18.30 | 19.55 | 20.19 | 20.76 |

FIG. 7

| Direction | Queue Effect | 0% | 20% | 40% | 60% | 80% | 100% |
|---|---|---|---|---|---|---|---|
| EB | Without Queue | -0.68 | 0.81 | 2.33 | 3.43 | 4.73 | 6.73 |
| | Implementable Queue | | 1.47 | 3.78 | 6.23 | 8.58 | 11.47 |
| | Ideal Queue | | 1.48 | 4.26 | 6.51 | 9.08 | 11.97 |
| WB | Without Queue | 3.54 | 3.92 | 5.62 | 6.10 | 7.20 | 8.04 |
| | Implementable Queue | | 5.53 | 8.60 | 11.63 | 14.79 | 17.21 |
| | Ideal Queue | | 5.90 | 8.94 | 12.38 | 15.43 | 18.51 |

FIG. 8

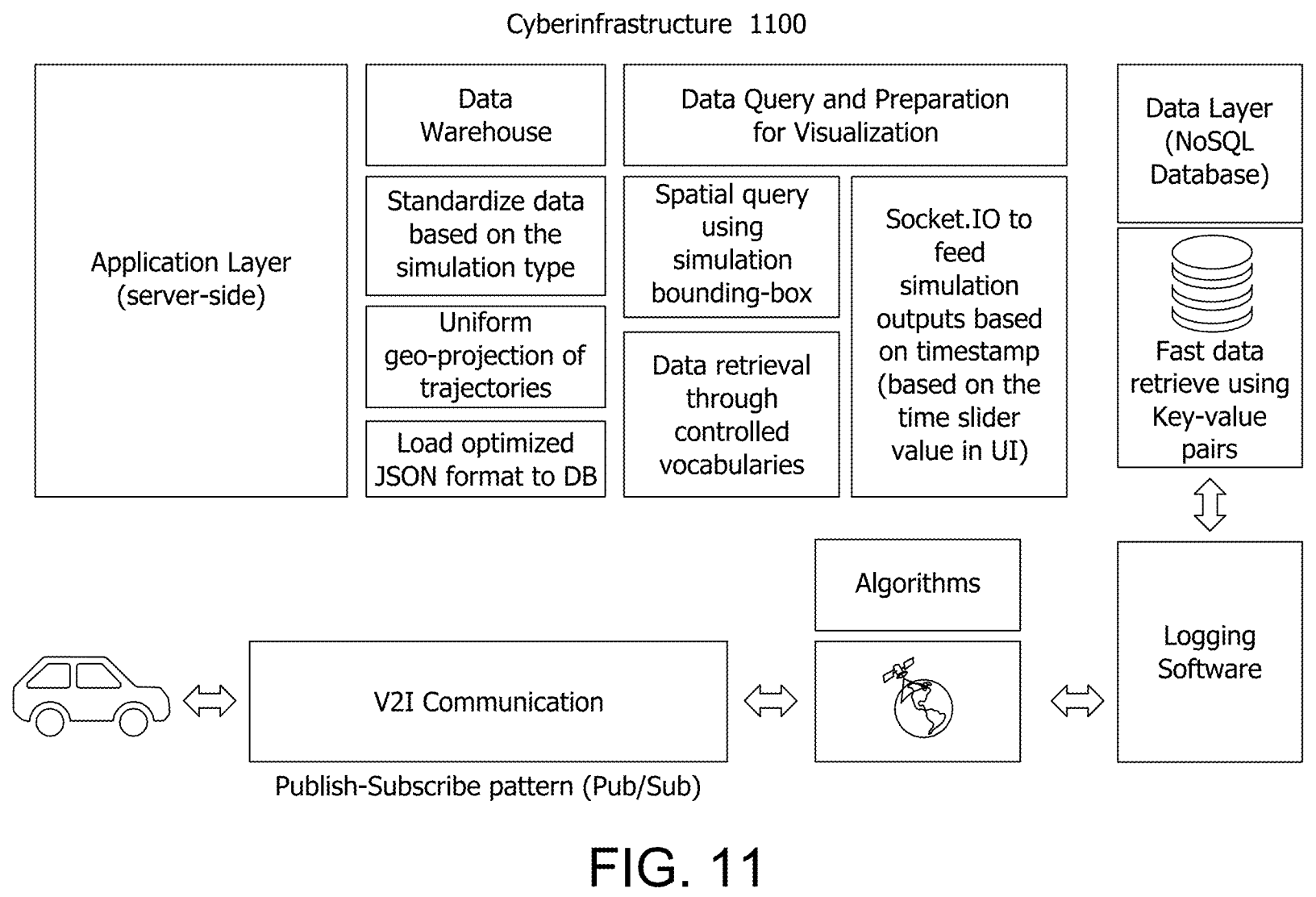

Cyberinfrastructure 1100

Data Layer (NoSQL Database)

Fast data retrieve using Key-value pairs

Logging Software

Data Query and Preparation for Visualization

Socket.IO to feed simulation outputs based on timestamp (based on the time slider value in UI)

Spatial query using simulation bounding-box

Data retrieval through controlled vocabularies

Algorithms

Data Warehouse

Standardize data based on the simulation type

Uniform geo-projection of trajectories

Load optimized JSON format to DB

Application Layer (server-side)

V2I Communication

Publish-Subscribe pattern (Pub/Sub)

FIG. 11

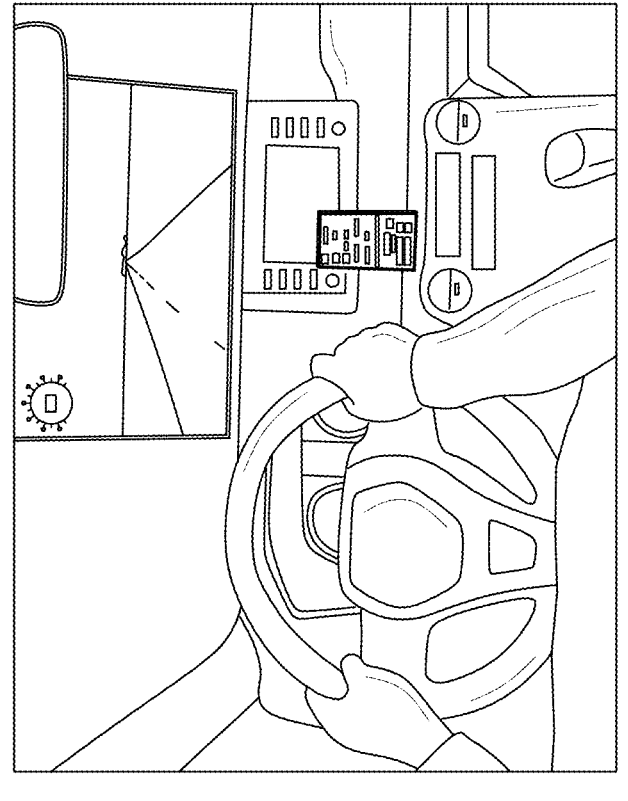
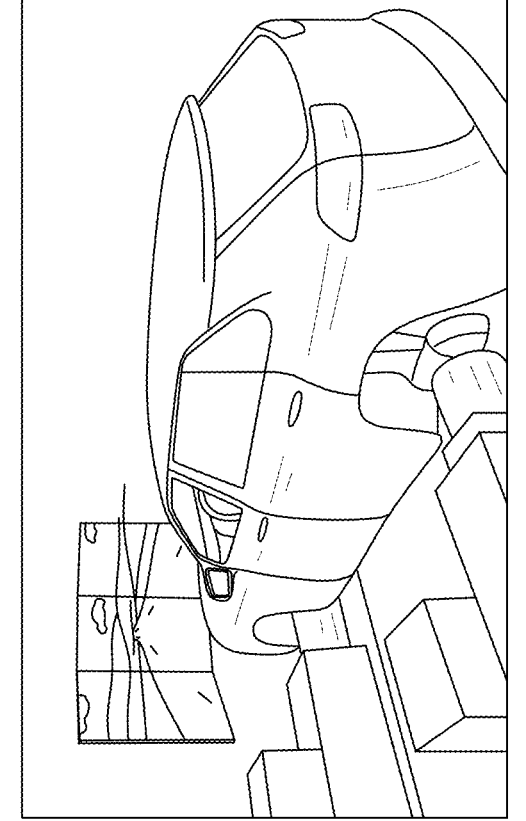
FIG. 18

21B

| | |
|---|---|
| ⊞ | 0.19 - 0.47 |
| ⊠ | 0.47 - 0.49 |
| ▨ | 0.49 - 0.53 |
| ▨ | 0.53 - 0.58 |
| ⊡ | 0.58 - 0.9 |

Communications
delay
measured in
seconds

The temporal
resolution is
one point per
second

FIG. 21D    FIG. 21E

Communication delay tests are conducted through a 20-mile drive in west Knoxville in Tennessee: (a) regional result including 2,002 GPS points and (b) subregion result in a community near MiddleBrook Pike including 426 GPS points.

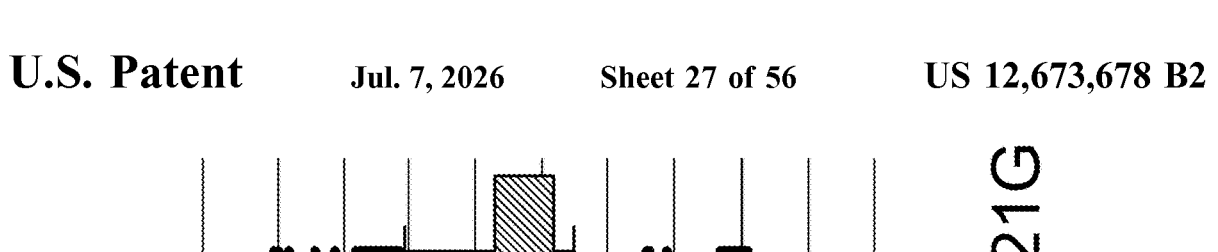
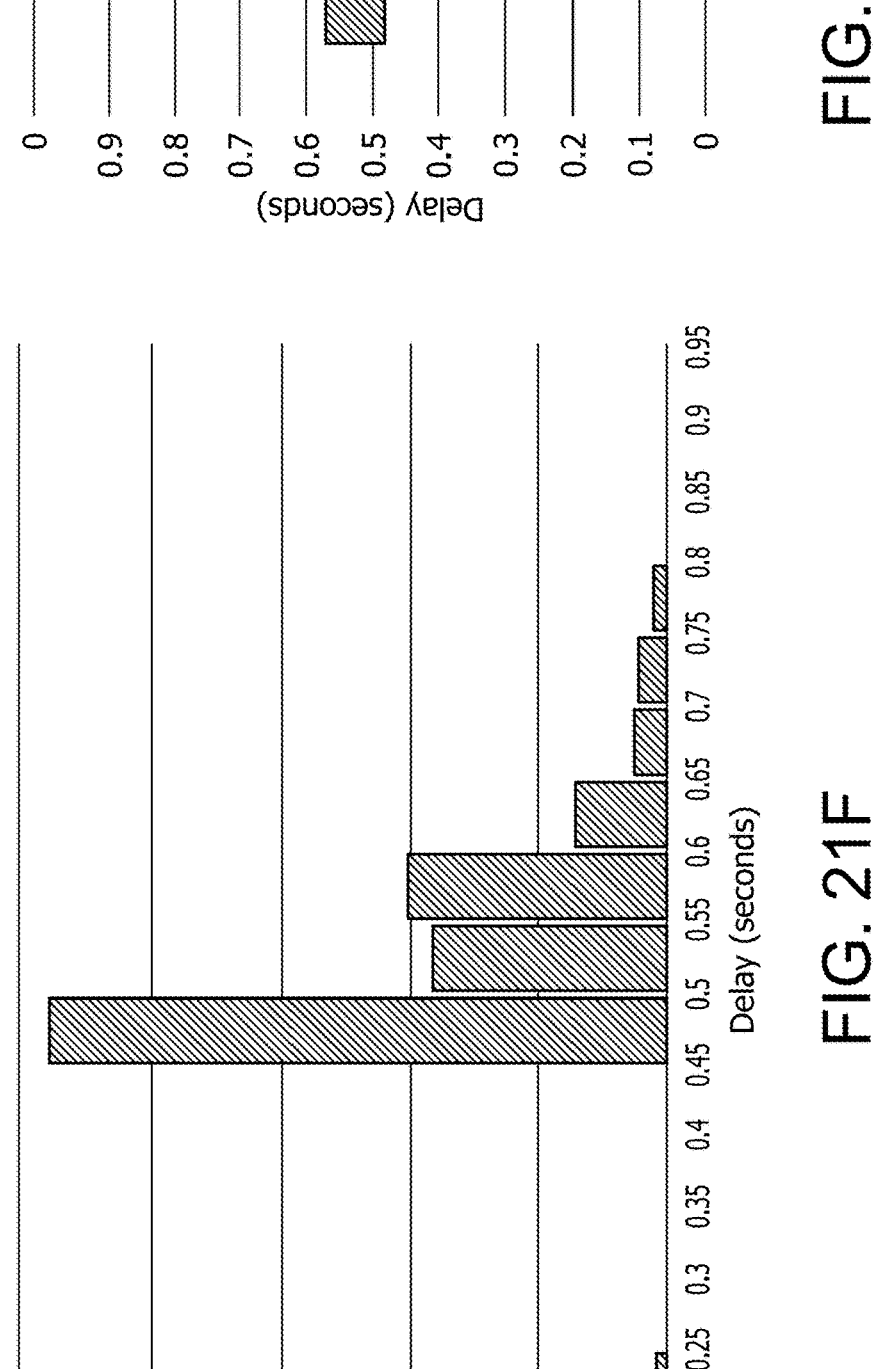
FIG. 21G
FIG. 21F

FIG. 22A
Shallow Road Corridor in Chattanooga, TN
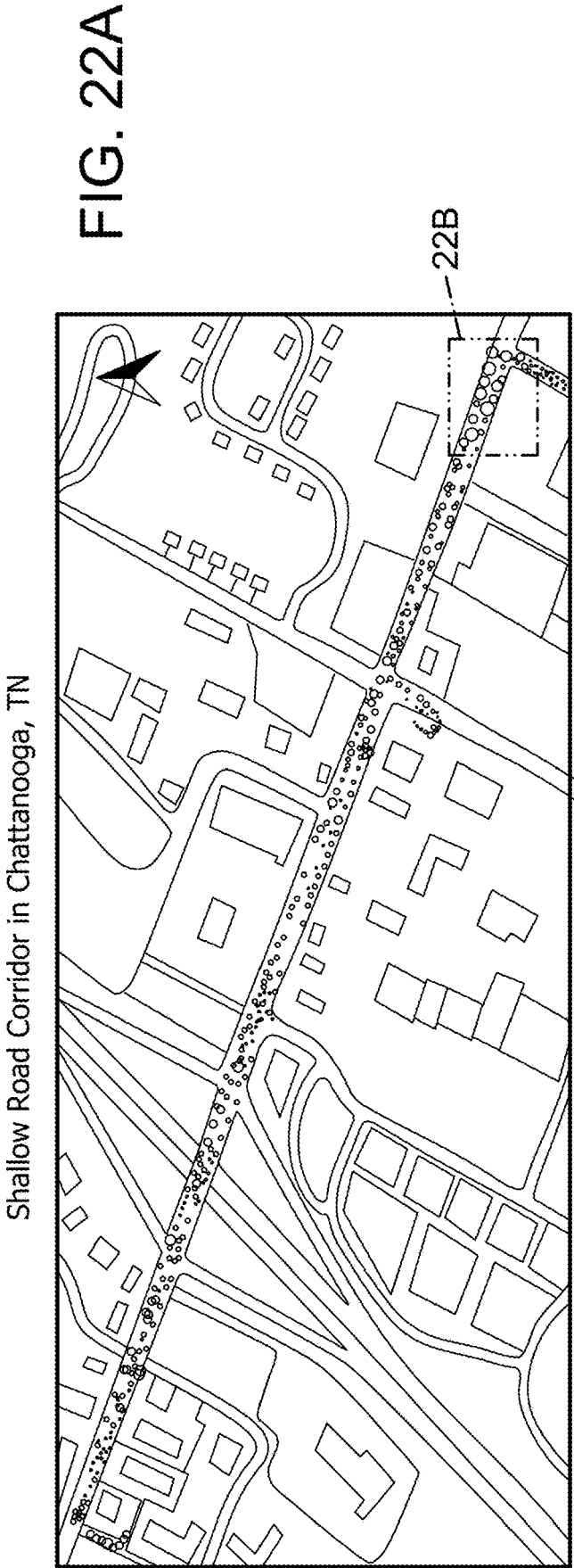
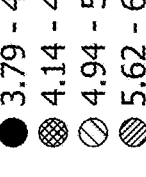
Accuracy Meter
● 3.79 - 4.14
⊗ 4.14 - 4.94
◐ 4.94 - 5.62
◑ 5.62 - 6.59
⊙ 6.59 - 12.22
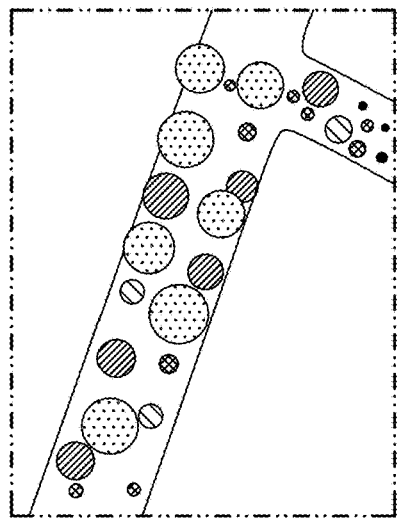
FIG. 22B

2700

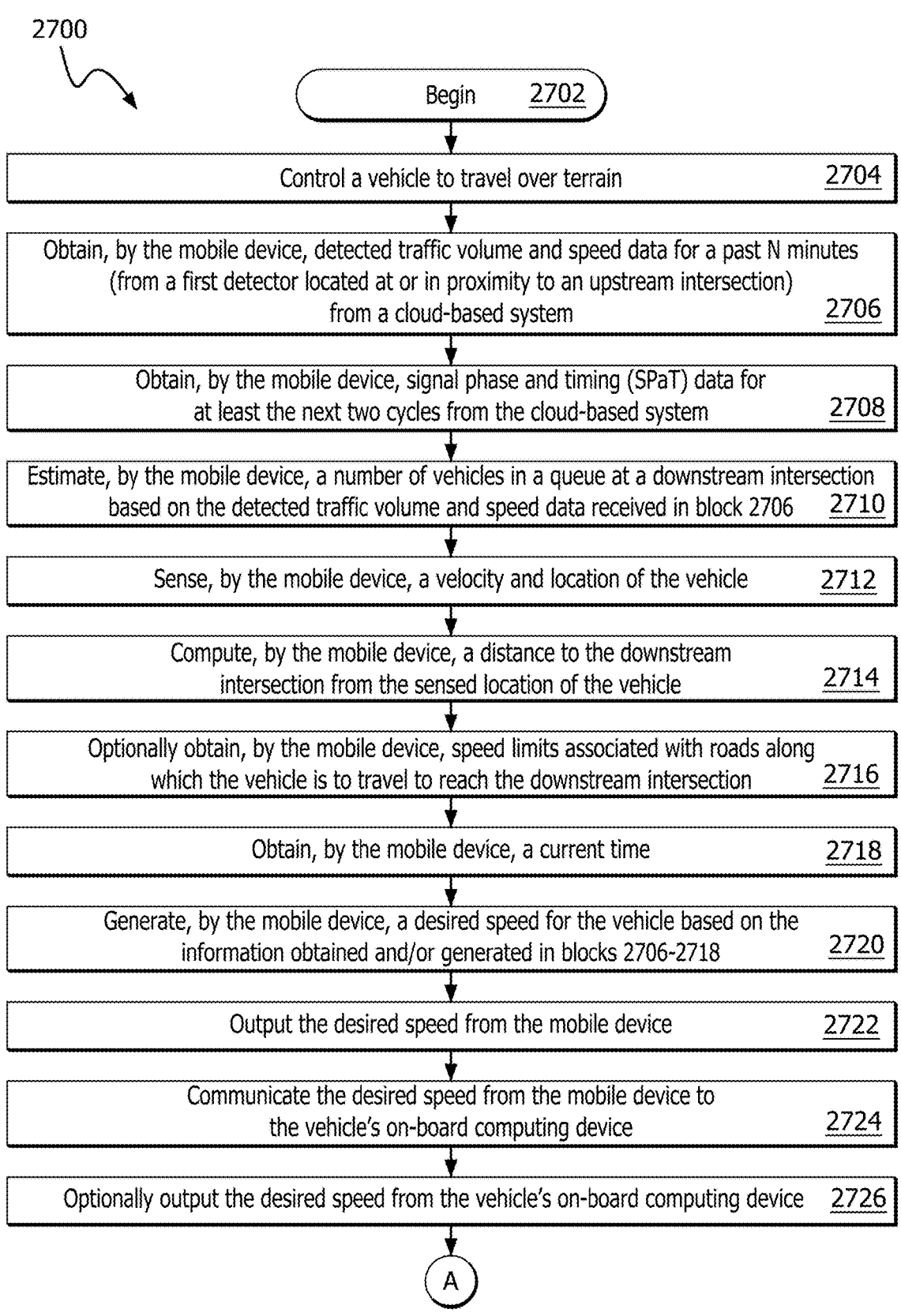

Begin     2702

Control a vehicle to travel over terrain     2704

Obtain, by the mobile device, detected traffic volume and speed data for a past N minutes (from a first detector located at or in proximity to an upstream intersection) from a cloud-based system     2706

Obtain, by the mobile device, signal phase and timing (SPaT) data for at least the next two cycles from the cloud-based system     2708

Estimate, by the mobile device, a number of vehicles in a queue at a downstream intersection based on the detected traffic volume and speed data received in block 2706     2710

Sense, by the mobile device, a velocity and location of the vehicle     2712

Compute, by the mobile device, a distance to the downstream intersection from the sensed location of the vehicle     2714

Optionally obtain, by the mobile device, speed limits associated with roads along which the vehicle is to travel to reach the downstream intersection     2716

Obtain, by the mobile device, a current time     2718

Generate, by the mobile device, a desired speed for the vehicle based on the information obtained and/or generated in blocks 2706-2718     2720

Output the desired speed from the mobile device     2722

Communicate the desired speed from the mobile device to the vehicle's on-board computing device     2724

Optionally output the desired speed from the vehicle's on-board computing device     2726

Fundamental diagram showing the typical relationship between traffic density and flow.

A Simple roadmanship strategy: distance-based minimum speed limit.

Schematic space-time diagram for the feasible target velocity

3300

3900

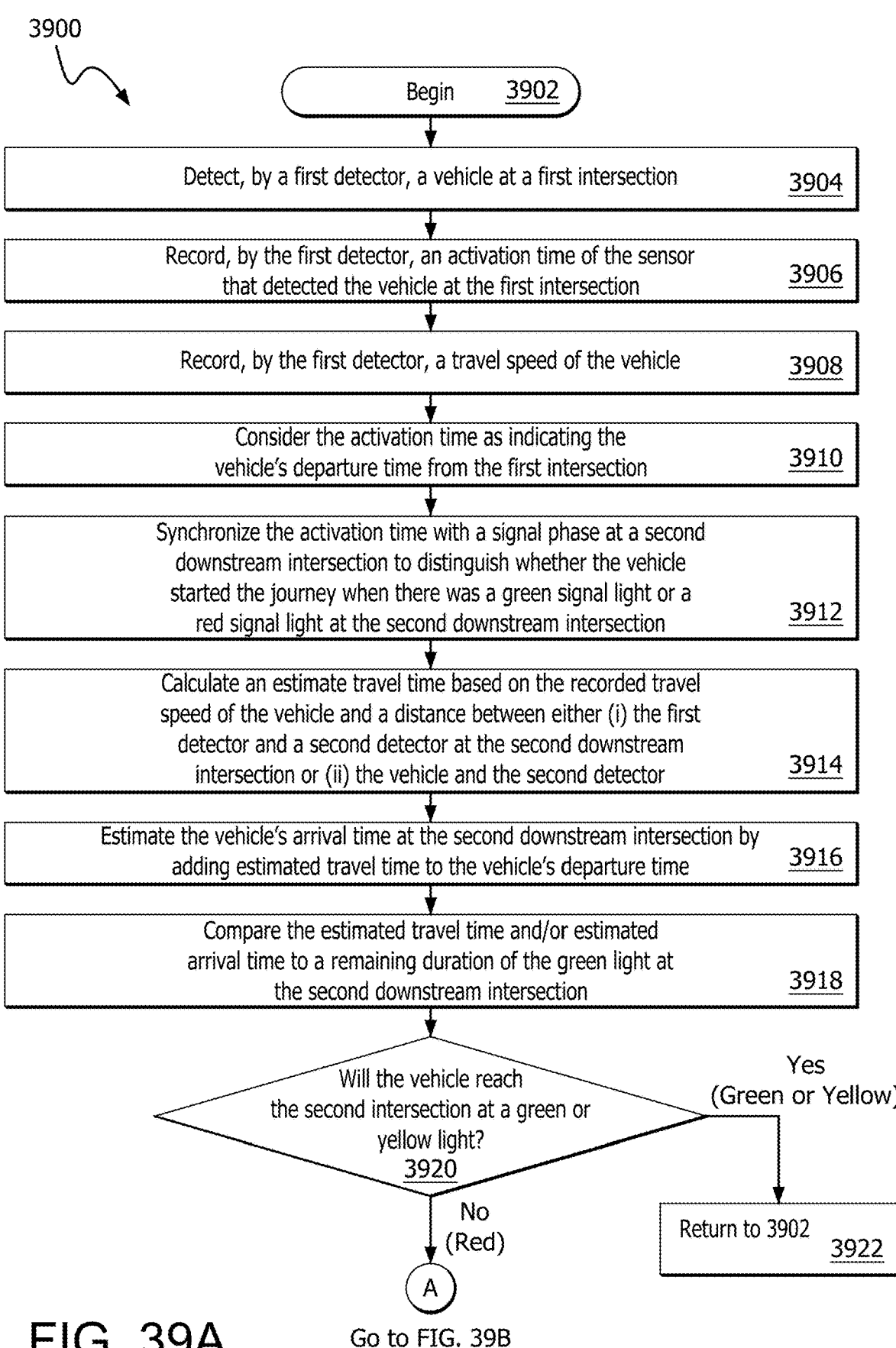

Begin    3902

Detect, by a first detector, a vehicle at a first intersection    3904

Record, by the first detector, an activation time of the sensor that detected the vehicle at the first intersection    3906

Record, by the first detector, a travel speed of the vehicle    3908

Consider the activation time as indicating the vehicle's departure time from the first intersection    3910

Synchronize the activation time with a signal phase at a second downstream intersection to distinguish whether the vehicle started the journey when there was a green signal light or a red signal light at the second downstream intersection    3912

Calculate an estimate travel time based on the recorded travel speed of the vehicle and a distance between either (i) the first detector and a second detector at the second downstream intersection or (ii) the vehicle and the second detector    3914

Estimate the vehicle's arrival time at the second downstream intersection by adding estimated travel time to the vehicle's departure time    3916

Compare the estimated travel time and/or estimated arrival time to a remaining duration of the green light at the second downstream intersection    3918

Will the vehicle reach the second intersection at a green or yellow light?    3920

Yes (Green or Yellow)

No (Red)

Return to 3902    3922

From FIG. 39A

Optionally perform operations to modify speed and/or
trajectory of the vehicle to prevent, avoid, or reduce
the probability or likelihood of stopping at a red light
at the second downstream intersection          <u>3924</u>

Optionally control traffic lights for the N next
downstream intersections to reduce vehicle
stops due to red lights thereat and/or to
improve traffic flow there through          <u>3926</u>

End or perform other
operations (e.g., return to 3902)
<u>3928</u>

ECO-PILOT-ENERGY-EFFICIENT VEHICLE SPEED ADVISORY THROUGH VEHICLE-TO-INFRASTRUCTURE COMMUNICATIONS

CROSS-REFERENCE TO RELATED APPLICATION(S)

The present application claims priority to and the benefit of U.S. Provisional Patent Application Ser. No. 63/544,962 which was filed on Oct. 20, 2023. The content of this Provisional Patent Application is incorporated by reference in its entirety.

STATEMENT REGARDING FEDERALLY SPONSORED RESEARCH AND DEVELOPMENT

The technologies described herein were developed with government support under Contract No. DE-AC05-00OR22725 awarded by the U.S. Department of Energy. The government has certain rights in the described technologies.

BACKGROUND

Description of the Related Art

The stop-and-go traffic pattern on urban roads often results in excessive energy consumption because of unnecessary vehicle braking, idling, and accelerations. With the widespread and increased use of automobiles, this traffic pattern creates many negative impacts (e.g., delayed travel time, air pollution, and additional carbon emission) on the sustainability of our cities.

SUMMARY

The present disclosure concerns implementing systems and methods for controlling the speed of a vehicle traveling over a terrain. The methods comprise: predicting, by a mobile device, a queue length defined by a number of vehicles in a queue at a downstream intersection based on a traffic volume and vehicle speeds that were detected during a past period of time by a detector located at or near an upstream intersection; sensing, by sensors of the mobile device, the velocity of the vehicle and a location of the vehicle; computing, by the mobile device, a distance to a downstream intersection from the sensed location of the vehicle; generating, by the mobile device, a desired speed for the vehicle based on (i) the traffic volume and vehicle speeds, (ii) signal phase and timing data for at least next two cycles, (iii) the predicted queue length at the downstream intersection, (iv) the sensed velocity and location of the vehicle, (v) the computed distance to the downstream intersection, and (vi) a current time; and using the desired speed to facilitate control of the speed of the vehicle while the vehicle is traveling over the terrain.

The present disclosure also concerns a non-transitory computer-readable medium that stores instructions that is configured to, when executed by at least one computing device, cause the at least one computing device to perform operations comprising: predicting a queue length defined by a number of vehicles in a queue at a downstream intersection based on a traffic volume and vehicle speeds that were detected during a past period of time by a detector located at or near an upstream intersection; sensing a velocity of the vehicle and a location of the vehicle; computing a distance to a downstream intersection from the sensed location of the vehicle; generating a desired speed for the vehicle based on (i) the traffic volume and vehicle speeds, (ii) signal phase and timing data for at least a next two cycles, (iii) the predicted queue length at the downstream intersection, (iv) the sensed velocity and location of the vehicle, (v) the computed distance to the downstream intersection, and (vi) a current time; and using the desired speed to facilitate control of the speed of the vehicle while the vehicle is traveling over the terrain.

The present disclosure also concerns implementing systems and methods for controlling traffic flow on road. The methods comprise: obtaining, by a processor, traffic related information comprising a total number of vehicles that caused an activation of a sensor of a first detector located at a first intersection of a plurality of intersections; generating, by the processor, a predicted traffic volume at one or more downstream intersections based on the traffic related information; generating, by the processor, the traffic light timing for at least two next cycles based on the predicted traffic volume; and controlling, by the processor, the traffic light of the one or more downstream intersections in accordance with the traffic light timing to reduce a probability or likelihood that the vehicle will stop at a red light thereat The present disclosure further concerns a non-transitory computer-readable medium that stores instructions that is configured to, when executed by at least one computing device, cause the at least one computing device to perform operations comprising: obtain traffic related information comprising a total number of vehicles that caused an activation of a sensor of a first detector located at a first intersection of a plurality of intersections; generate a predicted traffic volume at one or more downstream second intersections based on the traffic related information; generate the traffic light timing for at least two next cycles based on the predicted traffic volume; and control the traffic light of the one or more downstream second intersections in accordance with the traffic light timing to reduce a probability or likelihood that the vehicle will stop at a red light thereat.

BRIEF DESCRIPTION OF THE DRAWINGS

The present solution will be described with reference to the following drawing figures, in which like numerals represent like items throughout the figures.

FIG. 7 provides a table showing results of a route-based energy evaluation.

FIG. 8 provides a table showing a system-level energy evaluation.

FIG. 11 provides an illustration of a cyberinfrastructure.

FIG. 18 provides an illustration of a laboratory experiment.

FIGS. 21A-21I (collectively referred to as "FIG. 21") provides an illustration that is useful for understanding communication delay tests.

FIGS. 22A-22C (collectively referred to as "FIG. 22") provides an illustration that is useful for understanding an uncertainty analysis of raw mobile global positioning system (GPS) measurements within a field test.

FIGS. 27A-27B (collectively referred to as "FIG. 27") provides a flow diagram of an illustrative method implementing the present solution.

FIGS. 39A-39B (collectively referred to herein as "FIG. 39") provides a flow diagram of an illustrative method for controlling traffic lights in accordance with the present solution.

DETAILED DESCRIPTION

The rapid pace of urbanization has led to the widespread and increased use of automobiles, which have become a significant source of energy consumption and greenhouse gas emissions worldwide. In urban areas, stop-and-go driving patterns result in additional energy consumption due to unnecessary vehicle braking, idling, and accelerations back to free flow speed. This problem is particularly prevalent at city intersections, where stop-and-go traffic consumes nearly 50% of the vehicle energy for acceleration. Reducing the braking and accelerations associated with congested traffic conditions may lower vehicle energy consumption by up to 40% in urban areas.

Several past studies focused on minimizing each vehicle's acceleration and/or deceleration and its associated transient engine operation to reduce energy waste and fuel consumption through the optimization of signal controls at individual signalized intersections. Conventional speed optimization and advisory applications that use vehicle-to-infrastructure (V2I) communication were developed for electric and/or autonomous vehicles or driving simulators as build-in software. A scalable and deployable V2I-based mobile application that provides speed advisory does not exist.

The advancement in modern mobile devices and cyberinfrastructure (CI) has allowed smartphone applications to play critical roles in past intelligent transportation systems for sensing real-time mobile information and facilitating drivers' situational awareness. Recently, the emerging Internet of Things (IoT) and mobile edge computing paradigm have further extended mobile devices' capability to enable more advanced and intelligent features towards the vision of smart mobility management. A mobile application is described herein for optimizing traffic flows at signal-controlled intersections to mitigate stop-and-go traffic and provide guidance for efficient vehicle speed trajectories. Reducing stop-and-go traffic and determining speed profiles that anticipate signal changes to minimize braking can significantly reduce traffic congestion, unnecessary fuel consumption, and vehicle emissions in major urban traffic corridors.

Figure 1:
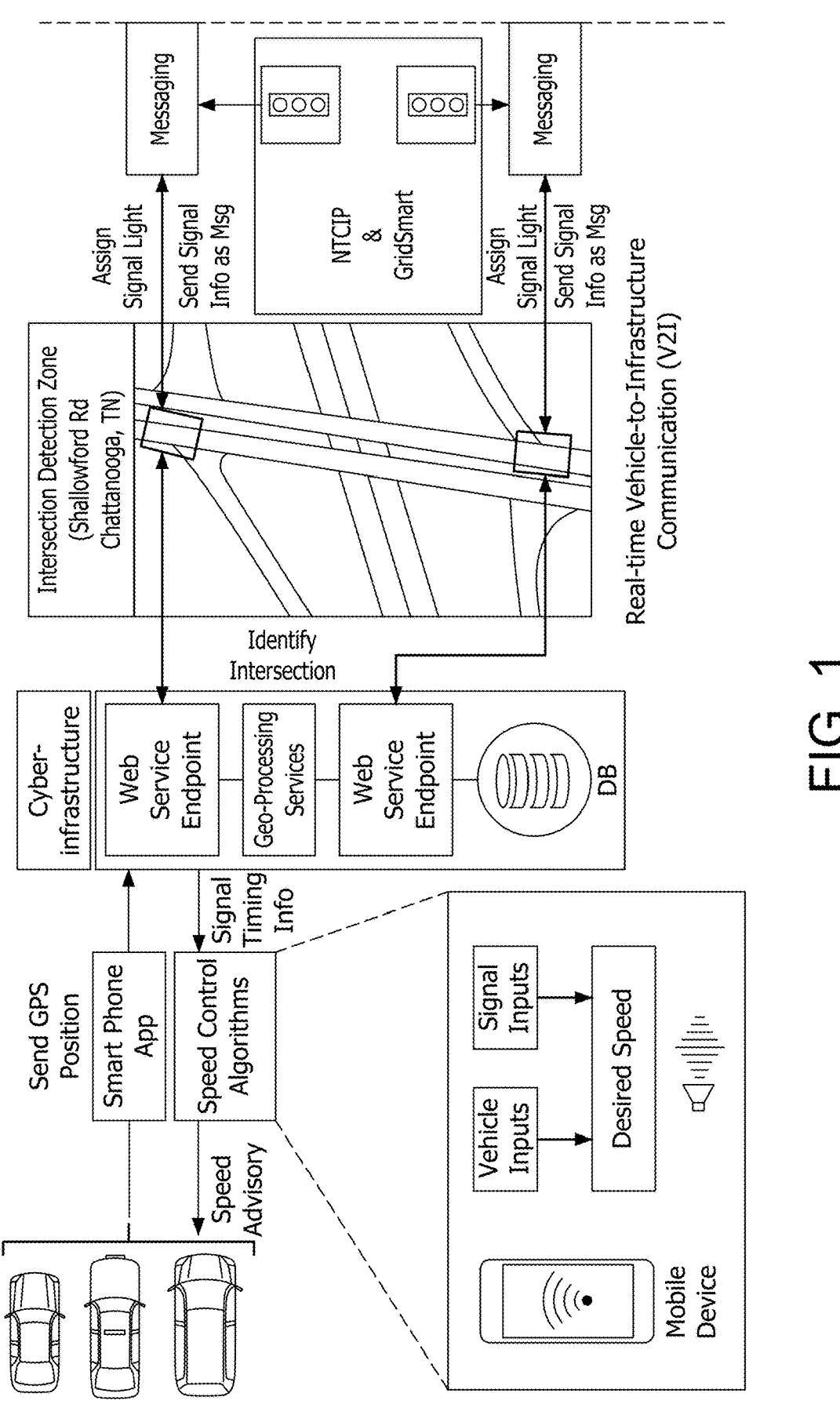
FIG. 1 provides an illustration of an application design and architecture.

The present solution integrates an intelligent speed control algorithm into a GIS-enabled mobile application to optimize the driving speed of individual vehicles, as shown in FIG. 1. The integration aims to ensure a smooth wireless connection between individual vehicles and nearby traffic signal controllers, receiving both the vehicle and signal-phasing information to an speed control algorithm to optimize the vehicle's driving speed. An automated pipeline is developed to automatically generate detection zones at individual lane levels using generic road network centerlines and traffic camera information. The present solution first detects approaching vehicles near a traffic intersection using a geofencing technique applied to intersectional detection zones. Afterward, the present solution creates two-way real-time V2I communications between the signal controller and each approaching connected vehicle using the publish-subscribe messaging service enabled through a cloud-based CI. The CI is responsible for collecting real-time traffic signal timing information (e.g., the green window for individual traffic phases) at each intersection through IoT-connected traffic signal controllers. Then, the CI distributes the corresponding signal timing information for the intersection to the approaching vehicles via the V2I communication. Using both the signal timing and mobile-sensed vehicle driving information (e.g., velocity, acceleration, and distance to stop bars), the speed control algorithm can calculate an optimal vehicle speed trajectory that employs coasting whenever possible for decelerations to reduce energy consumption and smooth traffic flow.

The present solution can serve as a wireless medium to deliver cyber-physical control for mobility optimization. The underlying CI can provide a cloud-based computing environment to acquire ad-hoc data from regular and Connected and Autonomous Vehicles (CAVs) to facilitate research studies for exploring intersectional traffic dynamics and optimizing signal control.

The present solution may comprise a software application that can provide real-time driving speed advisory to help drivers reduce excessive fuel consumption in urban traffic corridors. The software application establishes real-time communication between individual vehicles and IoT-connected traffic signal controllers to enable a real-time speed optimization algorithm. The algorithm can advise an optimal driving speed to allow an individual vehicle to pass multiple connected signalized intersections without the need for hard braking and acceleration.

Our major contribution is developing a mobile computing framework that enables low-latency V2I communication and real-time vehicle speed optimization using timely signal timing information acquired at individual traffic intersections. The software application is compatible with a wide range of smartphones, tablets, and major operating systems (e.g., Android and IOS).

The present solution is a scalable and deployable solution that connects individual vehicles to the signal timing information at signalized intersections to provide energy-efficient vehicle speed advisory in real time. The speed advisory aims to minimize the number of stops and the duration of vehicles' acceleration and breaking activity. The present solution can be provided to drivers of any kind of vehicle as a smartphone app and is designed to help individual vehicles reduce up to 20% of excessive energy consumption that is associated with the stop-and-go traffic pattern.

The present solution can be used in fields such as transportation, information technology (IT), communications and/or electronics. More specifically, the disclosed technologies can be integrated with Apple Maps or Waze, then they can be deployed through an on-board unit.

The present solution comprises an eco-approach on signalized arterials that aims to avoid unnecessary stop-and-go behavior (e.g., braking, idling, and acceleration), which can significantly reduce energy consumption. The present solution relies on the assumption that accurate signal phase and timing (SPaT) information is readily available, which is only true for conventional fixed-time signals. SPaT information is known in the field. However, most existing corridors are operated under actuated control or adaptive signal control. The existing solutions may focus on the ego vehicle and the preceding vehicle while ignoring the vehicles that are following the ego vehicle. In a mixed traffic environment, a CAV's generated energy-optimal speed profile may cause a safety hazard for the human-driven vehicles (HDVs) that are traveling behind the CAV.

Figure 2:
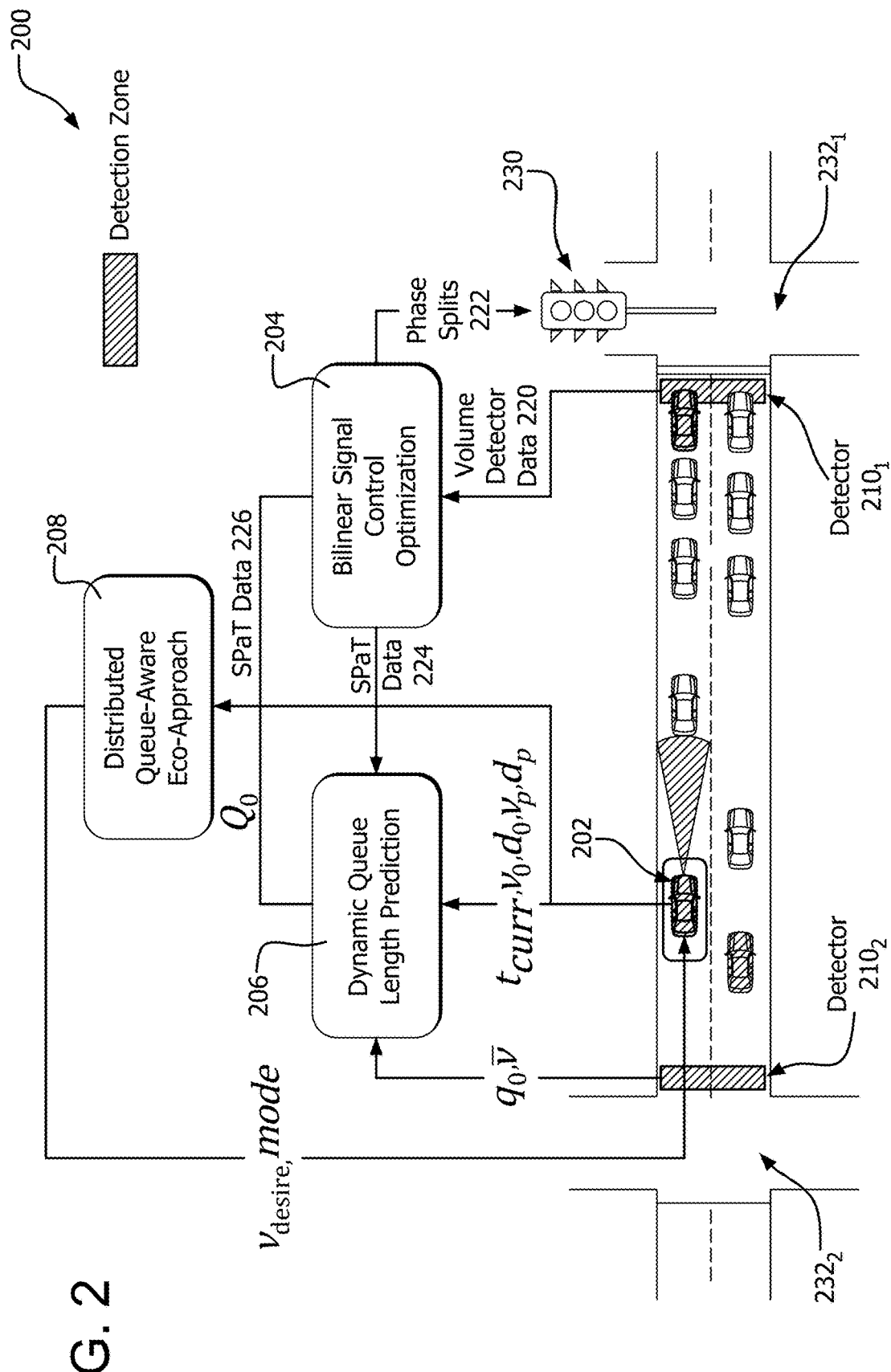
FIG. 2 provides an illustration that is useful for understanding how vehicle's speed may be controlled and/or traffic lights may be controlled in accordance with a novel technique.
Figure 3A:
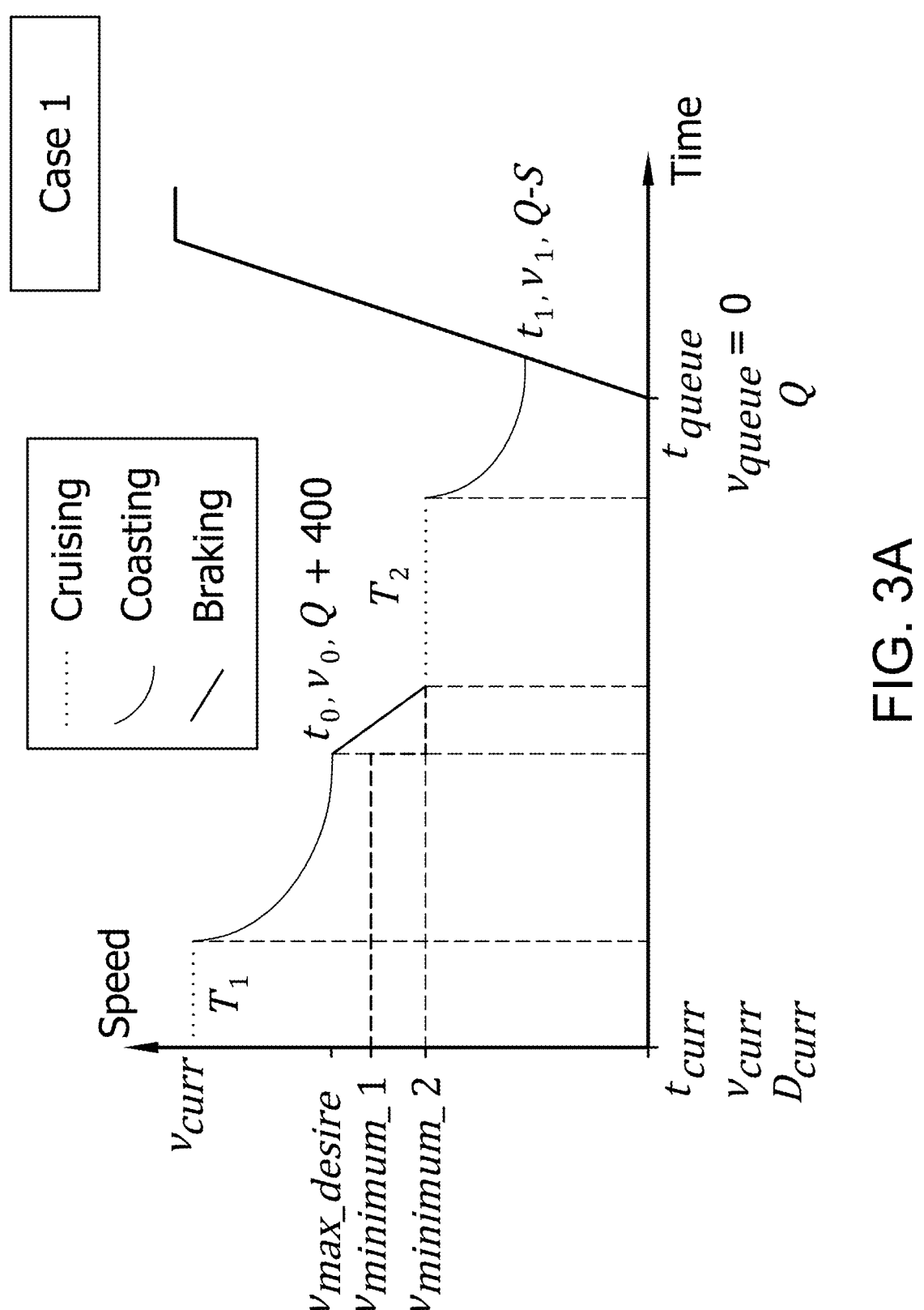
FIGS. 3A-3D (collectively referred to as "FIG. 3") provides graphs that is useful for understanding a distributed queue-aware eco-approach.
Figure 3B:
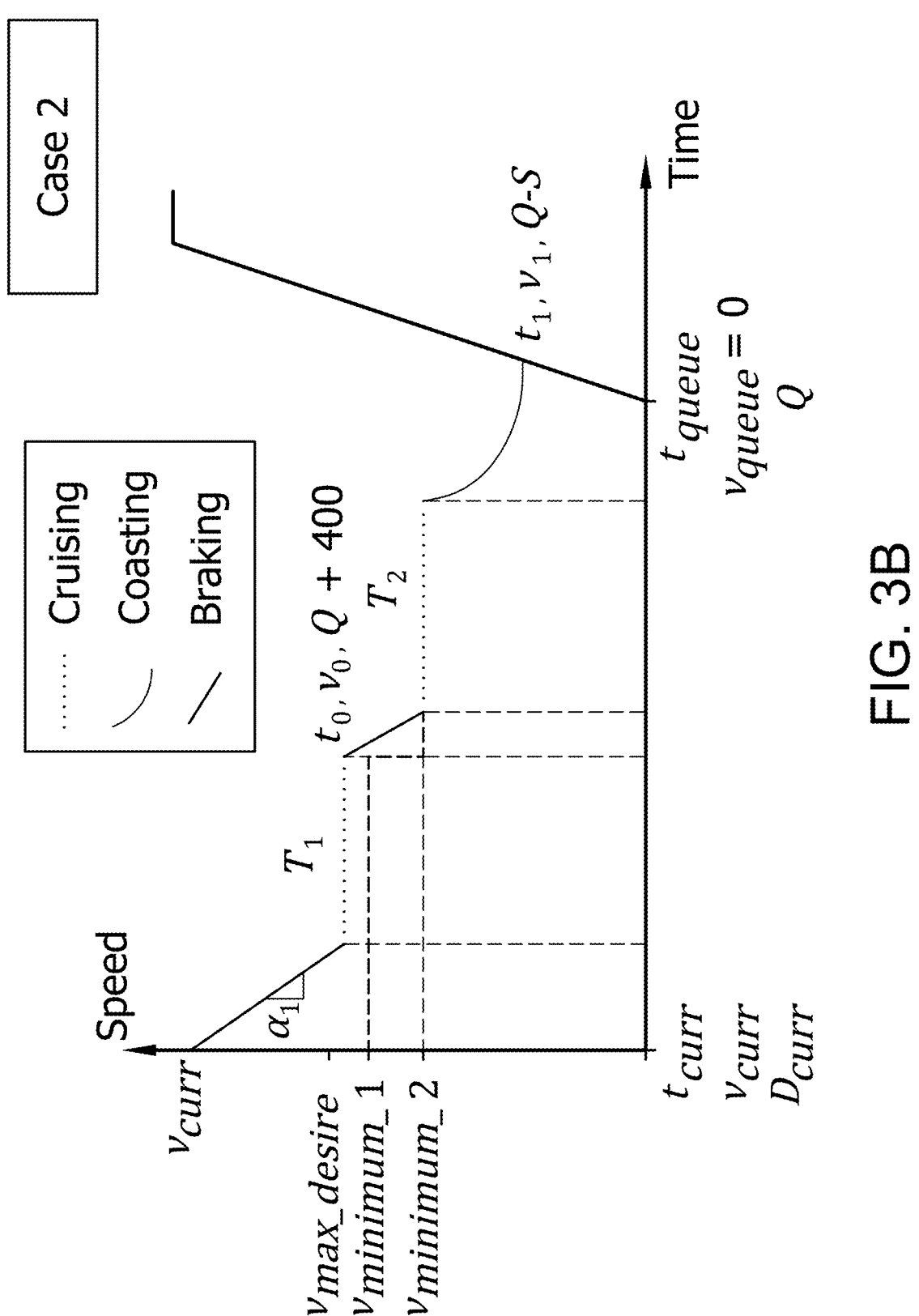
Figure 3C:
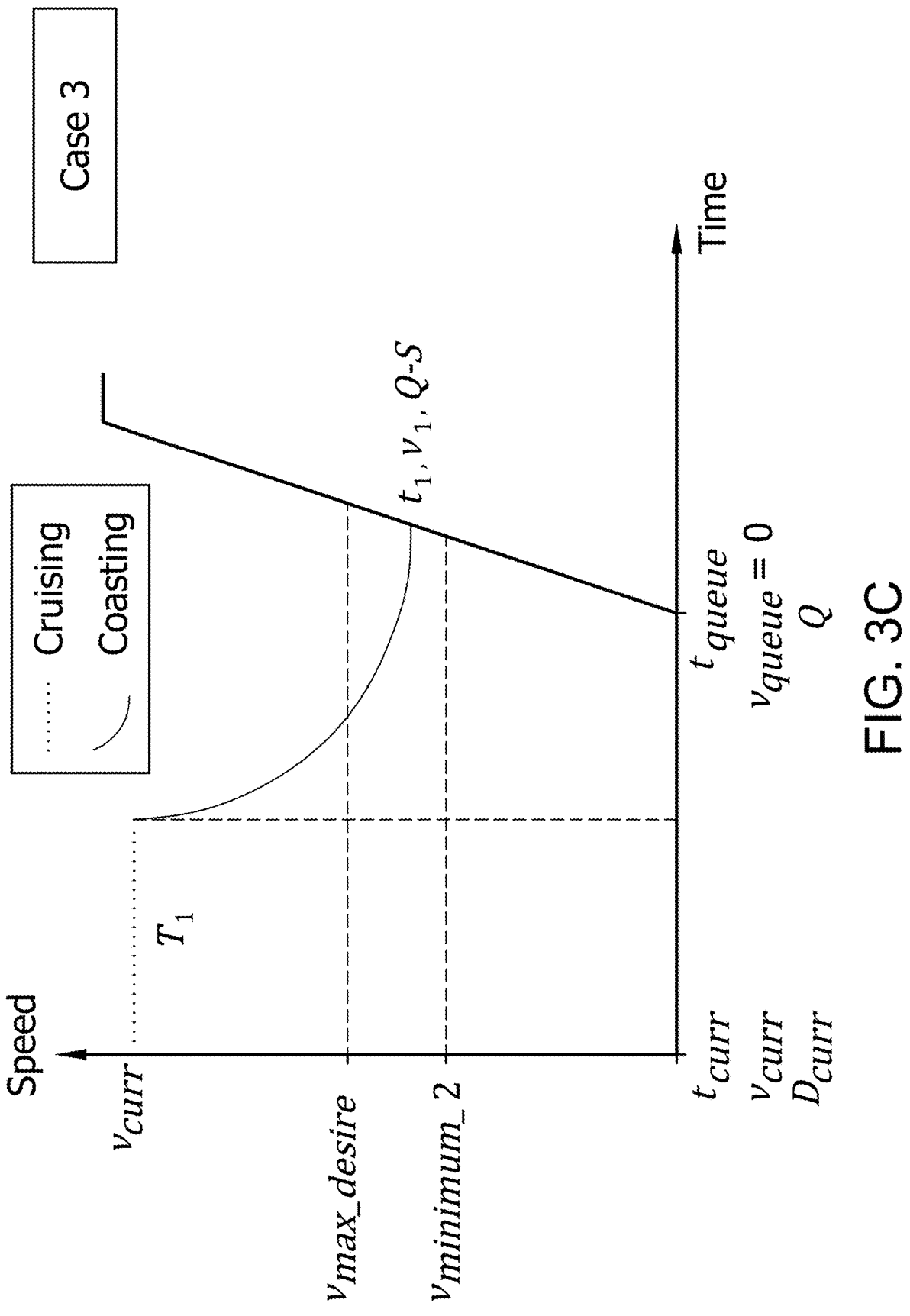
Figure 3D:
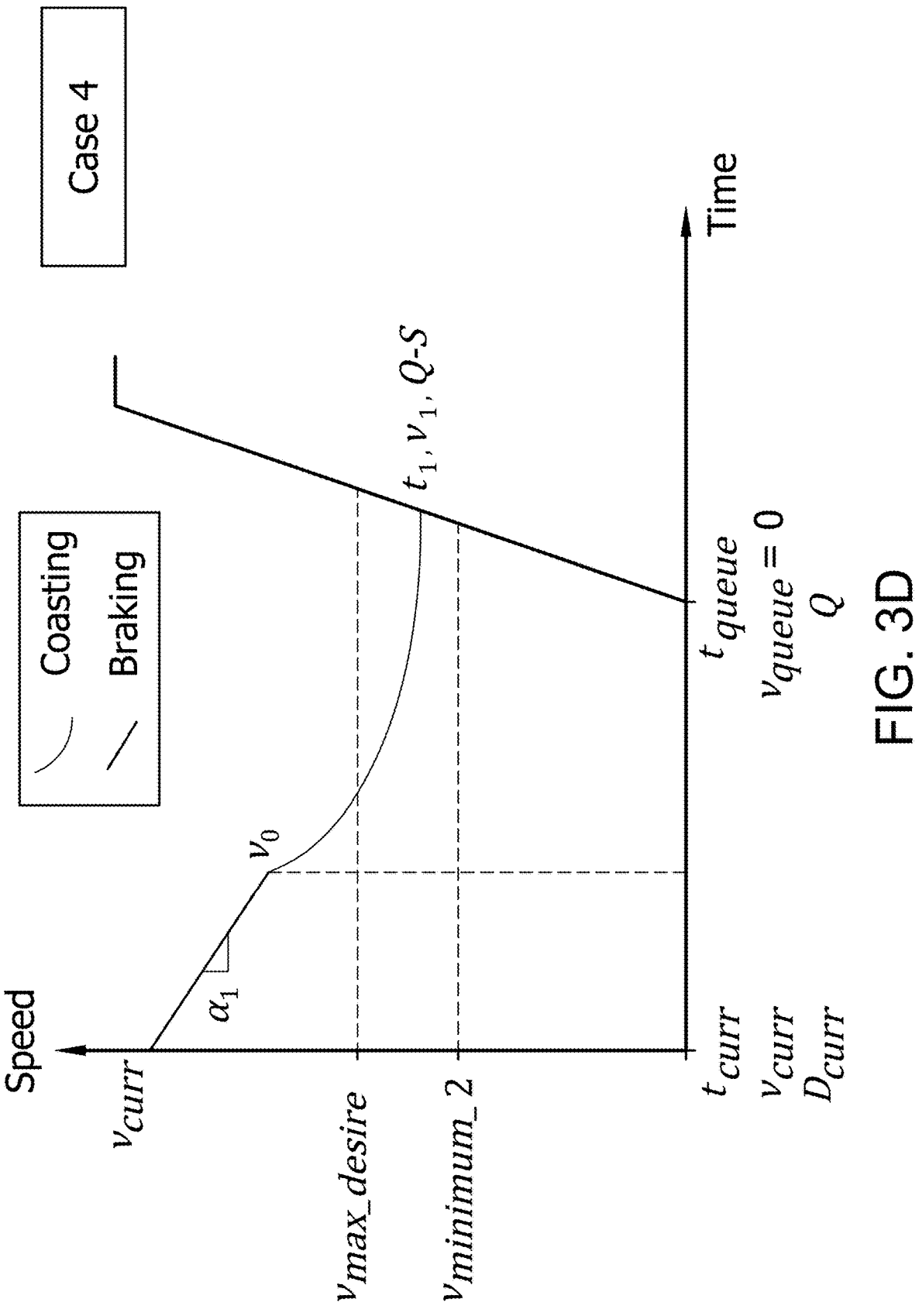

Referring now to FIG. 2, there is provided an illustration of a system 200 implementing the present solution. System 200 comprises a vehicle 202 with a plurality of modules 204, 206, 208. Module 204 comprises a bilinear signal control optimization module configured to receive data 220 indicating a traffic volume detected by a downstream detector $210_1$; and generate SPAT data 222 for the next two cycles based on the received volume detector data 220 during a current cycle. Detector 210 is located at or in proximity to a downstream intersection $232_1$. The SPaT data 222 can include, but is not limited to, signal phasing and associated time information describing a series of messages that are part of a cooperative intelligent transport system. SPaT data 222 can be used to ensure that the traffic lights 230 at downstream intersection(s) $232_1$ are properly timed for directing traffic through geographical areas. Operations of the bilinear signal control optimization module 204 may be defined by the following mathematical equations (1)-(4) which express a traffic network as a discrete-time input-output model.

$$\hat{y}(k+1) = Ay(k) + Bu(k) + (Cu(k)) \odot y(k) \qquad (1)$$

$$u^*(k+1) = \arg\max_{v(k+1)} \sum \hat{y}(k+1) \qquad (2)$$

$$\hat{y}(k+2) = A\hat{y}(k+1) + Bu(k+1) + (Cu(k+1)) \odot \hat{y}(k+1) \qquad (3)$$

$$u^*(k+2) = \arg\max_{v(k+2)} \sum \hat{y}(k+2) \qquad (4)$$

where $\hat{y}(k+1)$ represents traffic volume increment at timestep $k+1$, $y(k)$ represents traffic volume increment at kth timestep, $u(k)$ represents phase duration increment at kth timestep, $u^*(k=1)$ represents the optimal signal timing at timestep $k+1$, $\hat{y}(k+2)$ represents traffic volume increment at timestep $k+2$, and $u^*(k+2)$ represents the optimal signal timing at timestep $k+2$, A, B, and C are the system parameters that can be estimated online using normalized least squared algorithm.

Module 206 comprises a dynamic queue length prediction module configured to: take inputs from an upstream detector $210_2$ (e.g., traffic flow rate $q_0$ and/or flow velocity $\bar{v}$), inputs from vehicle 202 (e.g., a current time $t_{curr}$, current speed $v_0$, distance to stop bar $d_0$, preceding vehicle's speed $v_p$, and gap distance to preceding vehicle $d_p$), and inputs from the bilinear signal control optimization module 204 (e.g., SPAT data 224); and generate a dynamic prediction of an upcoming queue length $Q_O$ for vehicle 202. Detector $210_2$ is located at or in proximity to an upstream intersection $232_2$. Operations of the dynamic queue length prediction module 206 will be discussed in detail below. However, at this time, it should be noted that the operations of module 206 may be at least partially defined by the following mathematical equations (5) and (6).

$$Q_0 = \left(V_{AC}/(v_0 + V_{AC})\right)(d_0 - v_0(t_r - t)) \qquad (5)$$

$$v_{AC} = \frac{q_0}{\rho_0 - \rho_j} = \frac{q_0}{\frac{q_0}{\bar{v}} - \rho_j} = \frac{1}{\frac{1}{\bar{v}} - \frac{\rho_j}{q_0}} \qquad (6)$$

where $d_0$ represents distances to downstream intersections, $v_{AC}$ represents queuing shockwave speed, $v_0$ represents ego vehicle's current speed, $\bar{v}$ represents upstream traffic flow speed, t represents the current timestep, $t_r$ represents start time of the current red phase, $q_0$ represents the upstream traffic flow rate, $\rho_0$ represents the upstream traffic flow density, $\rho_j$ represents maximum traffic density.

Module 208 comprises a distributed queue-aware eco-approach module configured to generate a desired speed $v_{desire}$ based on inputs $Q_o$ from the dynamic queue length prediction module 206, inputs from the bilinear signal control optimization module 204 (e.g., SPaT data 226), and inputs from vehicle 202 (e.g., a current time $t_{curr}$, current speed $v_0$, distance to stop bar do, preceding vehicle speed $v_p$, and gap distance to preceding vehicle $d_p$. FIG. 3 provides graphs that are useful for understanding operations of the distributed queue-aware eco-approach module 208.

Figure 4:
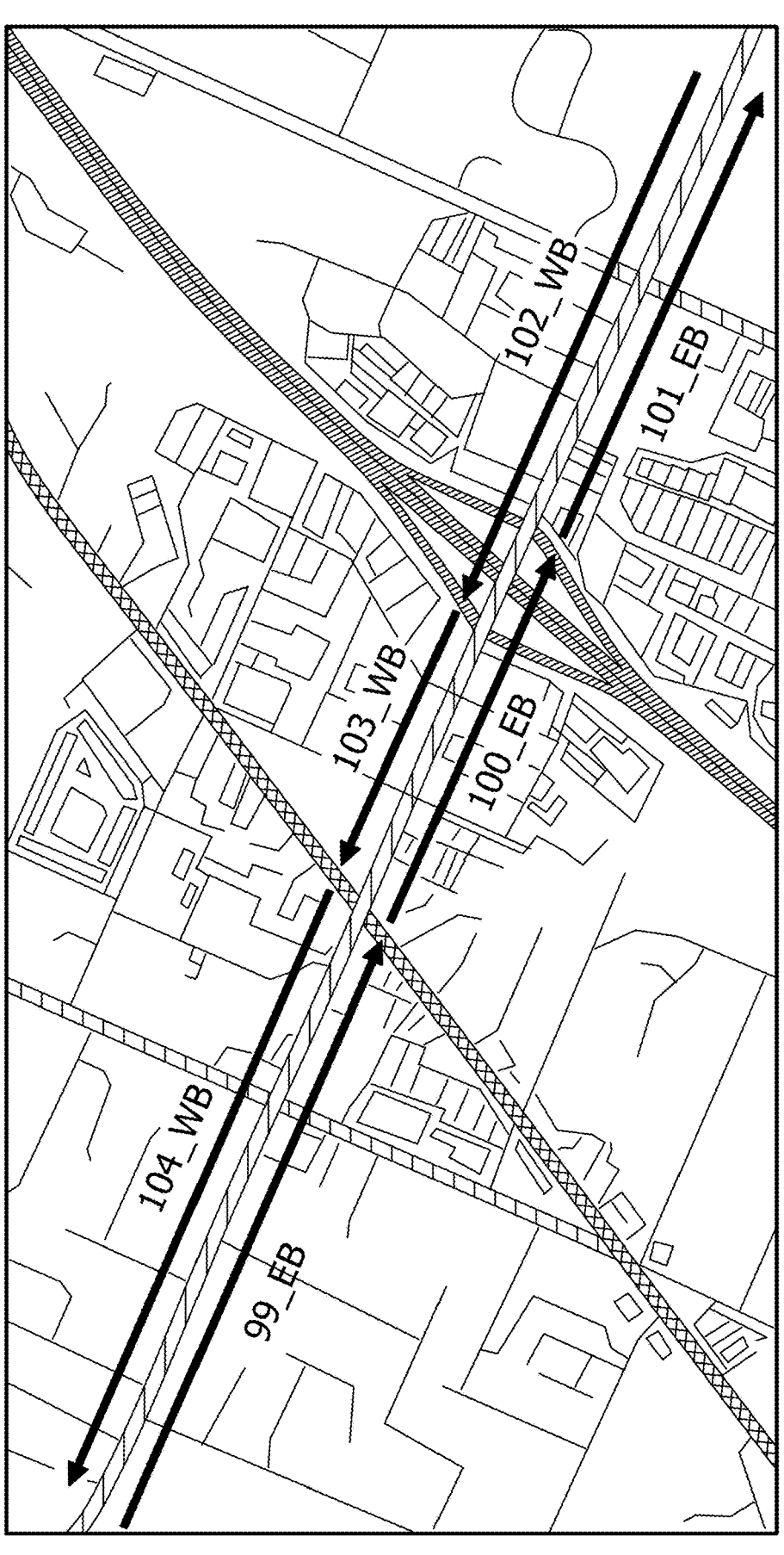
FIG. 4 provides an illustration showing a road map used in a simulation.
Figure 5:
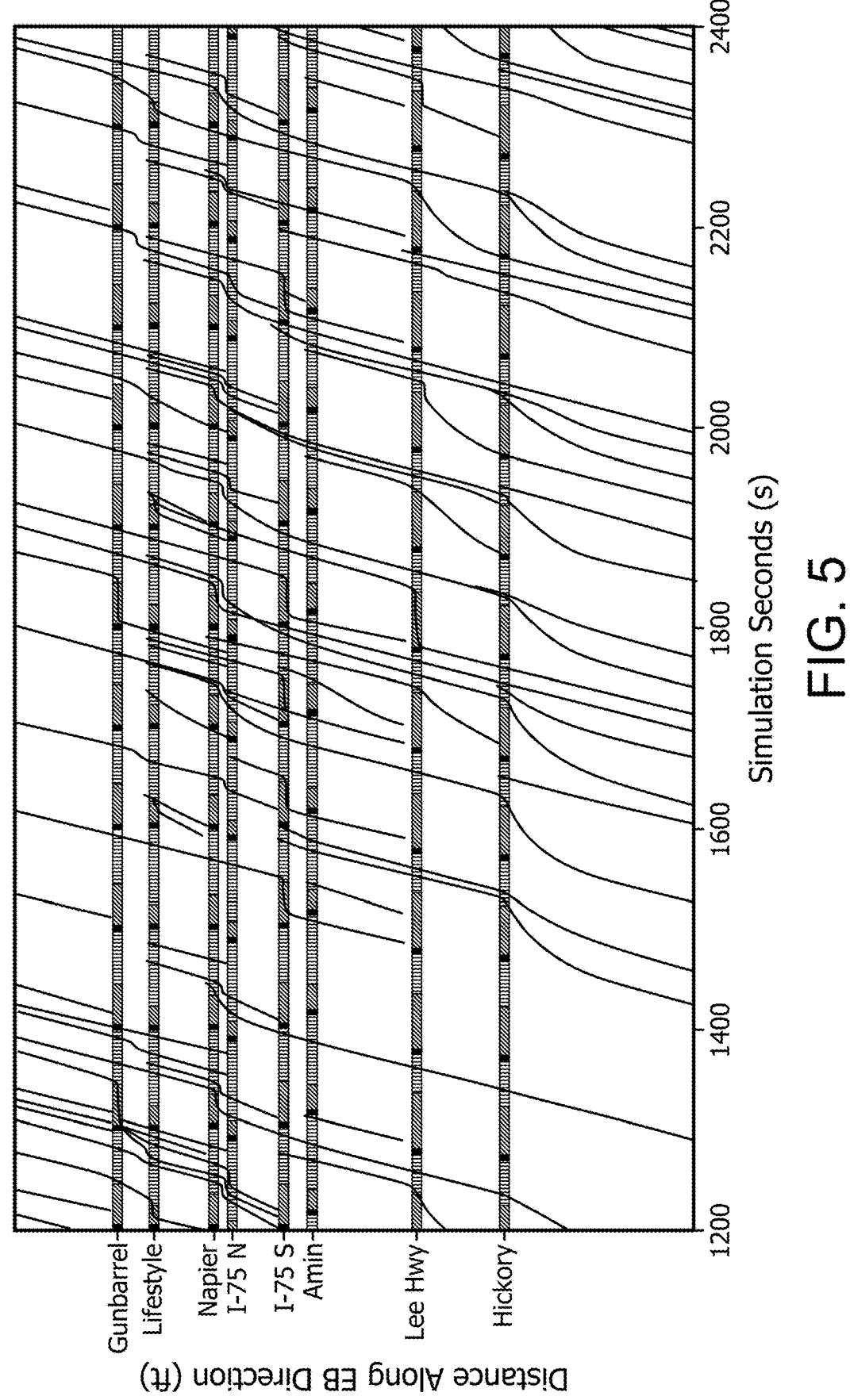
FIG. 5 provides a space-time diagram for a simulation scenario.
Figure 6:
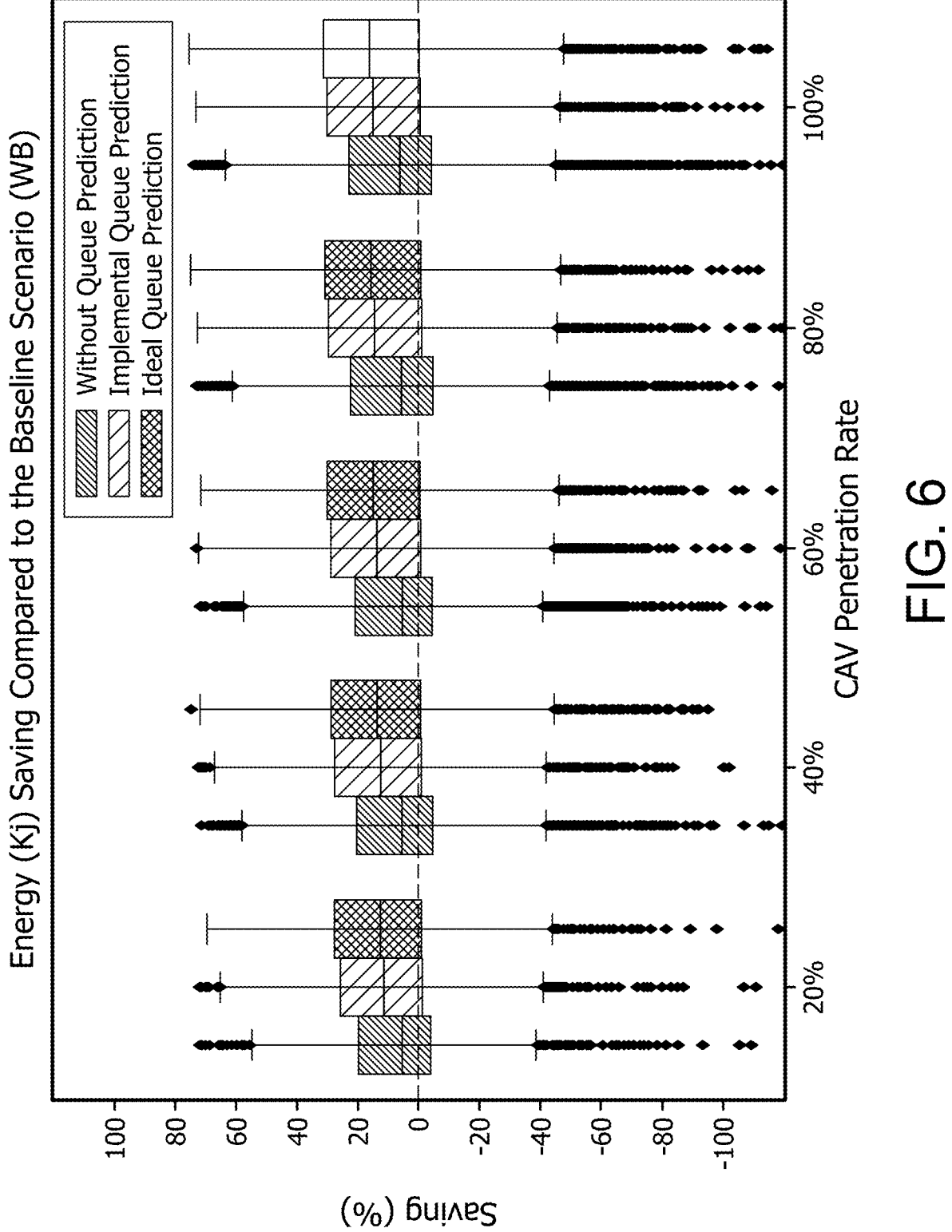
FIG. 6 provides a graph showing energy savings compared to a baseline scenario.

A simulation was performed using system 300. Illustrations are provided in FIGS. 4-5 that are useful for understanding the simulation. Results of a route-based energy evaluation are shown in FIG. 7. The results indicate that the 100% CAV scenario with the ideal queue length prediction can achieve up to 11.65% energy savings in the eastbound direction, while the same scenario can achieve up to 20.76% energy savings in the westbound direction. As shown in FIGS. 7-8, the consideration of queue prediction can significantly increase the energy savings, and the implementable queue prediction performs nearly as well as the ideal queue prediction. As shown in FIG. 8, the system-level energy evaluation results imply that at low CAV MPR (e.g., 20%), even though the CAVs can still achieve up to 17.09% energy savings compared to the matched HDVs, while the energy saving of the overall transportation system is quite limited (up to 5.9%).

The stop-and-go traffic pattern on urban roads often results in excessive energy consumption because of unnecessary vehicle braking, idling, and accelerations. With the widespread and increased use of automobiles, this traffic pattern creates many negative impacts (e.g., delayed travel time, air pollution, and additional carbon emission) on the sustainability of our cities. Taking advantage of the recent emerging IoT and edge computing paradigms, a mobile edge computing framework is described herein that integrates the capability of real time vehicle-to-infrastructure communication and intelligent speed optimization algorithms into a mobile application to optimize individual vehicles' driving speed at signalized intersections. The optimization can mitigate the stop-and-go traffic pattern and its undesirable consequences in urban transportation systems. The framework consists of (1) a cyberinfrastructure enabled dynamic messaging system for retrieving and delivering real time traffic and signal phase and timing information from IoT connected signal controllers and sensors, (2) a real time speed optimization algorithm for generating intelligent speed advisory using vehicle's information (e.g., GPS and driving directions from mobile sensing) and corresponding signal and traffic information, and (3) an ad-hoc mobile computing environment that converts drivers' smartphones into edge devices to host the speed optimization algorithms for enabling intelligent advisory on the vehicle's driving speed within signalized corridors. A design and implementation of this framework is described herein. The feasibility, usefulness, and energy saving benefits of the disclosed framework has been demonstrated. A prototyping has been made of the mobile application on urban transportation systems through traffic simulation, real vehicle laboratory experiments, an evaluative survey, and field communication tests. It is worth noting that the simulation-based energy evaluation results show that the usage of the disclosed mobile app can achieve up to 24% energy savings at 100% market penetration rate.

In an urban transportation system, stop-and-go traffic refers to the vehicle movement pattern involving repeated deceleration-acceleration cycles and vehicle idling, known as traffic oscillation. This pattern often results from the rapid increase in automobile use that is reaching the saturation point of urban transportation infrastructure. Unlike the free flow condition on highways, where most vehicles travel at a steady speed, the stop-and-go traffic pattern often causes interrupted and congested flow conditions with heavy traffic volume, bumper-to-bumper driving, and low speed in urban traffic corridors. These flow conditions are characterized by frequent vehicle acceleration and deceleration events and are responsible for many negative impacts on both the transportation system and urban environment in many cities. These impacts include delayed commuting time, unnecessary fuel consumption, and excessive on-road emissions of carbon and other pollutants in many cities. A few studies have identified stop-and-go driving as a major contributor to traffic congestion, and it is estimated that the traffic congestion caused by the stop-and-go traffic pattern can incur an additional economic cost of up to $124 billion per year across the United States. In addition, frequent stop-and-go traffic patterns are associated with significantly higher crash risk.

Past studies have demonstrated that nearly 50% of vehicle energy is consumed for accelerating the vehicle back to free flow speed at urban intersections. Subsequently, reducing the braking and accelerating associated with stop-and-go patterns may reduce vehicle fuel consumption and emissions in urban areas. Based on the emerging IoT-connected infrastructure and connected vehicle technologies, many studies have tried to improve traffic flow at signalized intersections through either infrastructure management or vehicle control. As examples, several studies developed optimization algorithms to optimize signal timing parameters, such as the cycle length and phase splits, to reduce the travel delay at intersections. Other studies developed vehicle speed optimization algorithms that use real-time signal timing information to optimize individual vehicles' arrival time, engine power, and brake force to minimize their waiting time and fuel consumption.

Because the effectiveness of these optimization strategies has been proven through traffic simulations, laboratory experiments and field tests, there is an urgent technical need to implement and scale up these optimization strategies (e.g., driving speed advisory) as an intelligent transportation service to every vehicle in the real world urban transportation system. Despite the effectiveness of many existing Information and Communications Technologies that promote vehicle-to-vehicle (V2V), vehicle-to-infrastructure (V2I), and vehicle-to-everything (V2X) communication, the deployment and scalability of these technologies are often limited by their hardware requirements. Many existing connected vehicle applications that rely on dedicated short-range communications (DSRC) or C-V2X protocol require the installation of specialized onboard units (OBU), which are not easy and scalable for existing conventional vehicles.

Although these dedicated communication protocols are critical for safety-related applications to satisfy the ultra-low latency requirement, they are not necessary for energy efficiency-related applications. Meanwhile, the penetration rate of OBUs among all vehicles would still be very low in the near future given that more and more transportation infrastructure (e.g., signal controllers and traffic detectors) is being real time connected to cyberinfrastructure and cyber-physical systems in real-time. To better use the existing connected real time infrastructure data without OBUs, a low-cost deployable and scalable mobile edge computing framework is needed.

Related Work

Recent advancements in wireless networking, mobile computing, and sensing technologies have transformed smart-phones into IoT-connected platforms to enable crowd-sourcing, augmented reality, and geospatial computing for a variety of research and educational applications. Equipped with a number of built-in sensors that measure geo-location, acceleration, orientation, and angular velocity, smartphones can provide the essential hardware for a variety of mobile applications (i.e., smartphone apps) to support the smart management of urban mobility and transportation systems. As smartphone penetration increases significantly across the world, mobile apps are becoming a critical onboard client in developing the Internet of vehicles (IoV) network. These applications have played essential roles in ad-hoc sensing and guidance and information sharing, facilitating human-computer interaction, and supporting transportation digital twins in the recent ITS development. From the technical perspective, many of these mobile apps can track and analyze the spatial and temporal distribution of human mobility (e.g., pedestrian, bike, and vehicle), collect and share travel-related information (e.g., traffic conditions, route calculation, and parking availability), and support transportation asset management. Following the vision of the US Department of Transportation's (DOT) Dynamic Mobility Applications (DMA) Program, many studies have developed mobile apps to connect vehicles to the network and deliver intelligent transportation services to individual users. A previous study also combined mobile edge computing with reinforcement learning techniques to facilitate intelligent online computation offloading in mobile networks, which can minimize the energy consumption of wireless devices.

In the mobility sensing sector, the literature presented the design and development of a mobile platform that integrates various wearable devices to facilitate communication, coordination, and collaboration among different actors (e.g., freight drivers, customers, and courier distributions) in urban logistic operations. Other literature introduced a user-friendly, open-source Android smartphone application to collect travel behavior data. The application was developed as an effort to enable advanced traveler information systems. It combines GPS-based sensing with advanced statistical and machine learning techniques to automate the detection and identification of daily activity and travel data (e.g., travel mode, position, and route). The application also incorporates survey techniques to allow users to input contextual information regarding their travel activities and episodes. Other literature developed a mobile application to connect pedestrians to transportation infrastructure and nearby connected vehicles as a component of the Multi-Modal Intelligent Traffic Signal System. The application is designed to help visually impaired pedestrians safely navigate crosswalks at signalized intersections, providing auditory and haptic feedback to allow users to send a call for service, align with the cross-walk, and learn about the traffic light countdown. Other literature used a mobile application to incentivize trained divers to report road conditions to local transportation management agencies, which complements information gathered by field crews. The application was developed as part of the Utah DOT Weather Responsive Traveler Information System. DOT's Applications for the Environment: Real Time Information Synthesis program also proposed the use of smartphones to support connected eco-driving through gamified/incentives-based mobile applications. The application allows a vehicular system to sense its operating condition and communicate information about the vehicle's performance directly to the driver using the dashboard or wirelessly connecting to a smartphone. The communication can send drivers eco-driving recommendations and posttrip feedback on their driving behavior. The feedback aims to help drivers to adapt their driving behavior to the vehicle's characteristics to promote energy-efficient driving techniques.

In mobility management sectors, many mobile apps are developed to optimize urban traffic and transportation systems, with the goal of optimizing infrastructure use and traffic safety. Literature developed an application to enable "smart parking" in an urban environment. The application can assign and reserve optimal parking spots for a vehicle based on its combined proximity to destination and parking costs and ensure the efficient allocation of the overall parking capacity through Mixed Integer Linear Program optimization. Other literature created a mobile application to provide drivers with speed limit advice and warnings. The application was developed as an advisory Intelligent Speed Assistance application to reduce drivers' speeding behavior and improve traffic safety in the urban environment.

In the Cellular V2X (C-V2X) sector, a smartphone application that debuted as "TravelSafely" was developed commercially to connect vehicles, pedestrians, and cyclists to IoT-enabled traffic signal lights. The application connects smartphones to a network of traffic intersections, school beacons, motorists, cyclists, and pedestrians and provides audible warnings to alert drivers and pedestrians to potentially dangerous road conditions, as well as countdowns to signal light changes.

Knowledge Gaps

Despite the success and usefulness of these previous studies, mobile applications that are developed for reducing energy consumption and emissions at signalized intersections are still rare. Although a few studies have tested various traffic optimization strategies to optimize vehicles' driving speed at signalized intersections to reduce the stop-and-go traffic pattern, these tests were conducted mainly in traffic simulation environments or on connected autonomous vehicles. Many of these optimization strategies require V2I and V2V communication capabilities to produce timely and accurate speed advisories based on the surrounding traffic conditions and signal light status. In this context, there is a need for a smartphone-based mobile application that can perform the following: connect traditional vehicles with the IoT-enabled transportation infrastructure; gather real-time traffic data and monitor traffic conditions on the road network; and deploy and deliver traffic optimization algorithms to real-world vehicles to generate speed advisories using real-time traffic and signal phase and timing (SPaT) information.

The disclosed application creates an opportunity to conduct field tests of different optimization strategies created through real-world vehicles in an urban environment. The application also serves as a way to deliver large-scale scientific outputs to city residents, enabling more optimized and efficient urban mobility.

In addition, most of the existing mobile applications are developed as crowdsourcing, sensing, and information platforms without ad-hoc computing capability. Currently, mobile applications that are developed as a V2I communication client of a cyber-physical system for holistic traffic optimization, which considers the upcoming green windows and overall traffic conditions at multiple intersections, are still rare. Because the execution of vehicle speed optimization algorithms for a large number of vehicles can be a data and computation-intensive task using the traditional server-client paradigm, there is a technological need to develop a mobile computing strategy that can distribute the computation load from the sever to a variety of edge devices deployed on individual vehicles and IoT connected infrastructure.

Contributions

The present solution comprises a mobile edge computing framework that leverages the capacity of modern wireless networks, as well as the computing power of cloud-based cyberinfrastructure and modern edge devices (e.g., smartphones and tablets), to deliver complex traffic optimization strategies through the concept of the IoV network and cyber-physical system. The mobile edge computing framework adopts a multitier architectural pattern to seamlessly integrate a dynamic messaging system (DMS) that broadcasts signal timing information with a mobile application deployed as an onboard unit in individual vehicles to provide real-time intelligent speed assistance to help drivers reduce their stop-and-go driving pattern. The mobile application then enables an ad-hoc computing environment to execute the Distributed Queue-aware Eco-Approach Strategies (DQ-EAS) using the combined information (e.g., vehicle, traffic, and signal conditions) retrieved from the DSM and sensed using the smartphone's sensors to advise an optimized energy-efficient driving speed.

The present approach and methodology differ from previous studies and DMA developments in the following ways. The present approach creates a cyber-physical integration between the vehicles, infrastructure, and a distributed mobile edge computing environment in which the vehicle speed optimization algorithm is deployed in real-time. The present approach implements a cloud-based cyber-infrastructure to optimize data assembly from the IoT connect traffic infrastructure and data delivery to the mobile application through V2I communication using localization, map-matching, and geo-fencing techniques, as well as the asynchronous messaging protocol. The present approach uses a mobile edge computing paradigm to distribute the data processing and computing load of the vehicle speed optimization algorithm through the smartphone, which functions as a mobile edge computing device in individual vehicles. The present approach employs an adaptive software suite and architecture to integrate a traffic optimization algorithm into cross-platform mobile applications compatible with iOS and Android devices and web browser environments. The modular system design also allows the integration of other traffic optimization algorithms into the mobile edge computing framework.

Framework Design

Figure 14A:
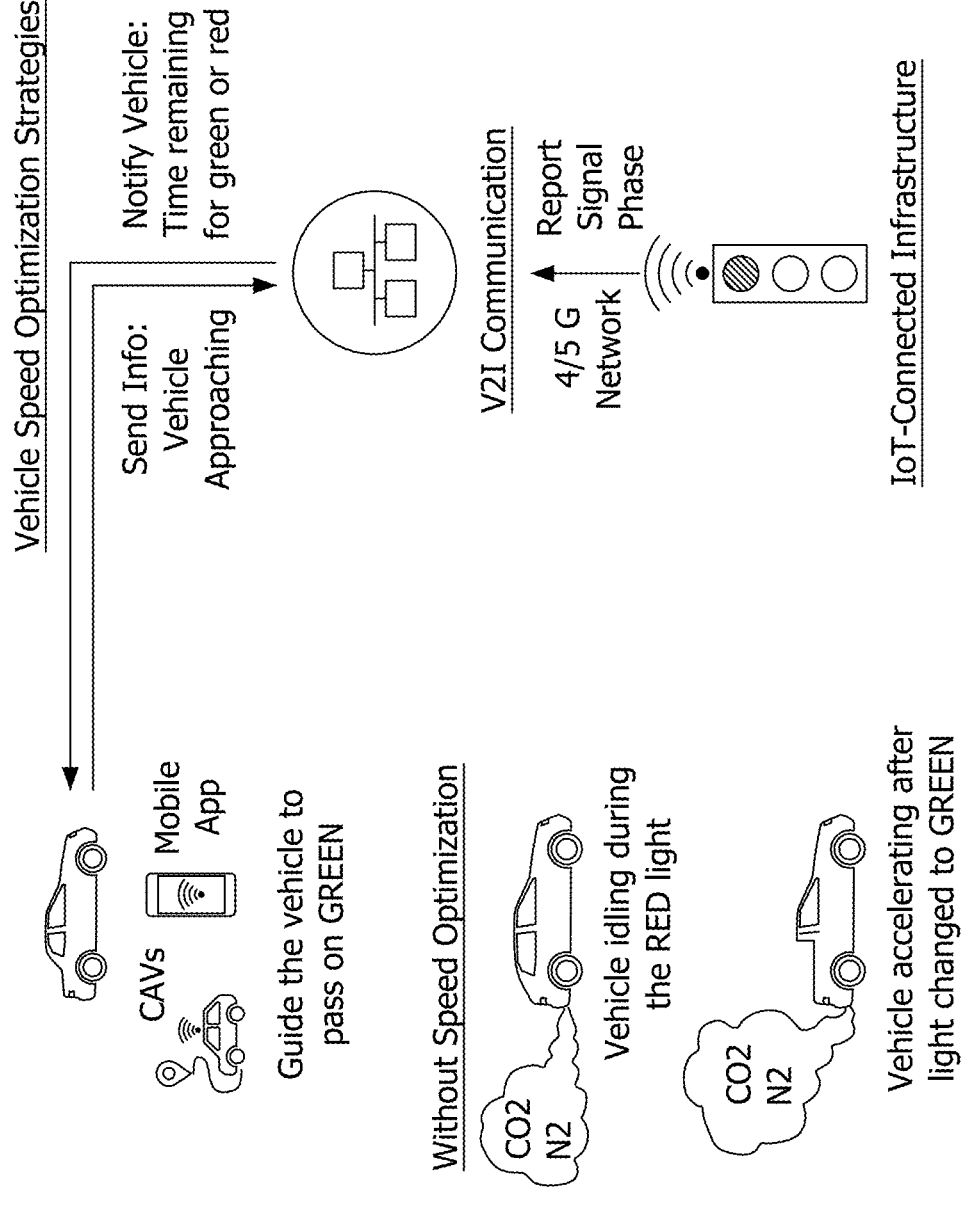
FIGS. 14A-14B (collectively referred to herein as "FIG. 14") provides an illustration of a framework design and rationale for a traffic optimization strategy.
Figure 14B:
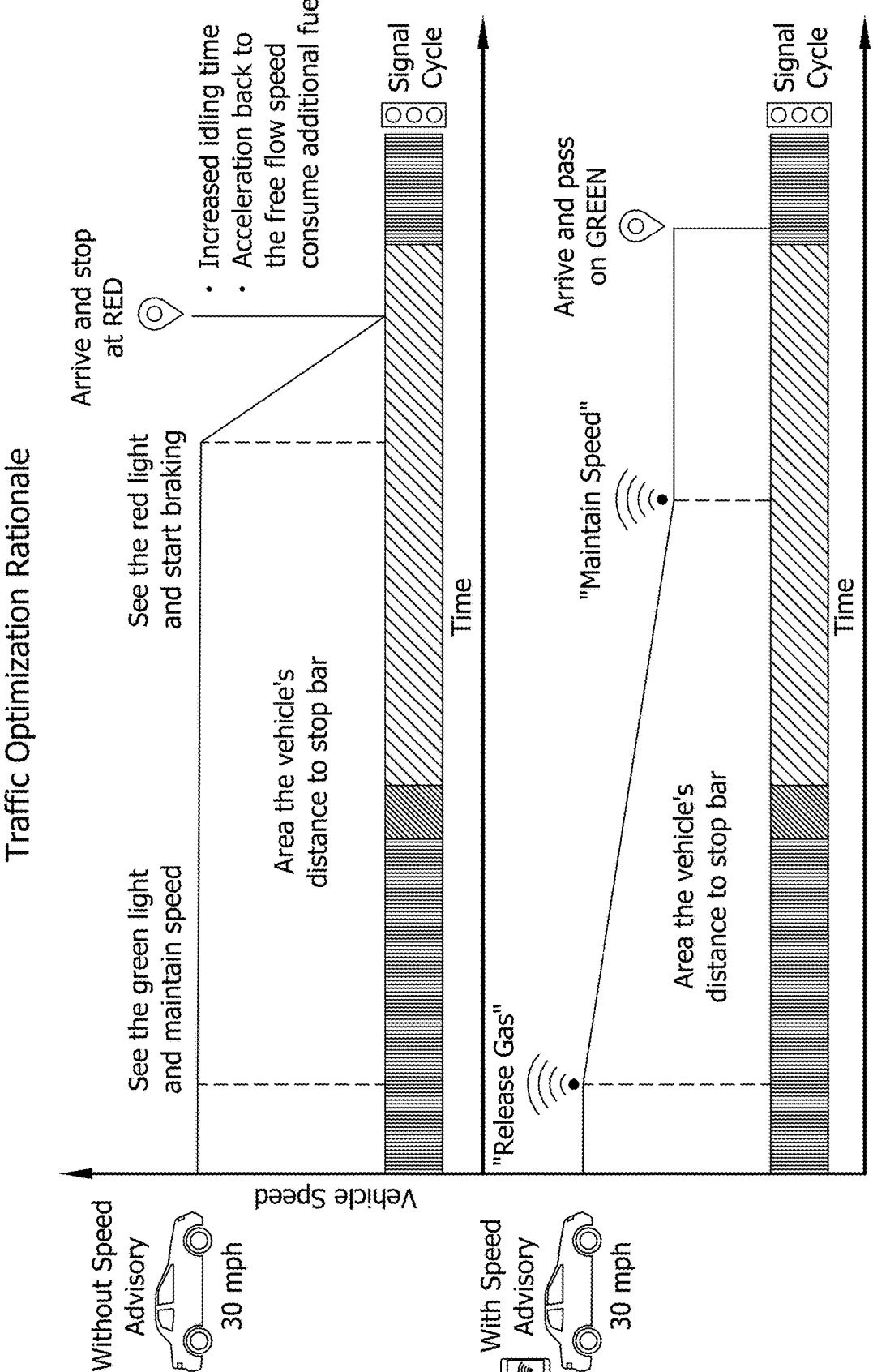

At the methodological level, a novel workflow has been derived that uses the concept of cyber-physical control to promote eco-driving behaviors of physical vehicles at multiple urban intersections by delivering optimization strategies to driver smartphones using the cellular network. The workflow entails three major components that include: (1) onboard speed optimization strategy; (2) V2I communication; and (3) IoT-connected transportation infrastructure (such as signal controllers and roadside cameras). The overall framework design and rationale of the traffic optimization strategy is depicted in FIG. 14.

The speed optimization strategy is deployed on the mobile application within the vehicle to provide drivers with real-time speed advisories. The framework is designed to provide a generalizable mobile computing environment to host different optimization strategies. Herein, the DQ-EAS algorithm is used as the speed optimization strategy to prove the concept of the mobile computing framework. However, the present solution is not limited in this regard. Other algorithms may be used as the speed optimization strategy. During the DQ-EAS algorithm's operation, the mobile application is connected to the cellular network and uses the smartphone's sensors to estimate the vehicle's driving condition. The mobile application also retrieves traffic conditions and signal timing information at the approaching intersection through the V2I communication via the cellular network.

After the required information is retrieved, the speed optimization algorithm is executed in real-time within the mobile application to generate intelligent speed advisories at a 1 Hz. Using both the signal timing and mobile sensed vehicle driving conditions (e.g., velocity, acceleration, and distance to stop bars), the speed control algorithm can determine an optimal vehicle speed trajectory that employs coasting whenever possible for deceleration to reduce energy consumption and smooth traffic flow. Details regarding the DQ-EAS algorithm, as well as its input requirements, are explained below. Additionally, the mobile application is responsible for the identification of the exact downstream signal controller that is on the vehicle's route. A geoprocessing pipeline can automate the generation of the intersection layout and detection zones based on individual lanes. The pipeline can also map individual vehicles within a specific detection zone to its corresponding signal controller and phase through geo-fencing techniques.

V2I communication is enabled through our DMS, which is deployed on a cloud-based cyberinfrastructure. The DMS is responsible for direct communication with the mobile application. It retrieves signal timing information (e.g., the green window for individual signal phases) and traffic data (e.g., speed and volume) from the IoT-connected infrastructure. After information retrieval and integration, the DMS creates a broadcast channel for each signalized intersection. When an approaching vehicle is mapped to a specific intersection, its onboard mobile application may be automatically connected to the targeted signal broadcast channel and receive the most updated signal timing and traffic information. The DMS may adopt the publish-subscribe communication paradigm to ensure real-time two-way communication between the vehicle and cyberinfrastructure.

The IoT-connected infrastructure component entails signal controllers and roadside cameras deployed at each urban intersection. These transportation infrastructures are connected to an edge server following the National Transportation Communications for Intelligent Transportation System Protocol (NTCIP) standard. In the framework, the DMS may be connected to the NTCIP edge server for traffic and signal information discovery, management, and retrieval.

Based on the conceptual design, the disclosed mobile computing framework uses a list of technical requirements to ensure smooth and reliable V2I communications for providing accurate and optimized speed advisory. The technical requirements are as follows.

Vehicle localization: The mobile application should have the spatial analytical capability to detect vehicles near signalized intersections using geographic data collected from the smartphone sensors. The application should be able to map vehicles to their corresponding lane groups and signal controllers.

Ad-hoc computing capability: The mobile computing framework should be able to balance the computation load between the server and edge devices. On the edge device, the mobile application should be able to ingest the real-time input data and execute the speed control algorithm at a 1-second resolution.

System interoperability: The application should adopt industry standards and conventions on system design to ensure its modularity and to enable interfacing with other smart city and mobility applications (e.g., digital twins, web apps, and domain models).

Low communication latency: The V2I communication should have a low delay that allows real-time execution of the speed optimization algorithm at a 1-second resolution.

Cybersecurity aspect: The V2I communication between the mobile app and DMS should be protected to avoid privacy leakage and cyberattacks on the transportation infrastructure (traffic light controllers and cameras).

User interaction to ensure safe driving: The mobile application should adopt intuitive and explicit user interaction techniques to create timely and easy-to-understand communication between the speed advisory and the driver. The communication should be in both visual and audio forms to avoid distracting the driver.

Figure 15:
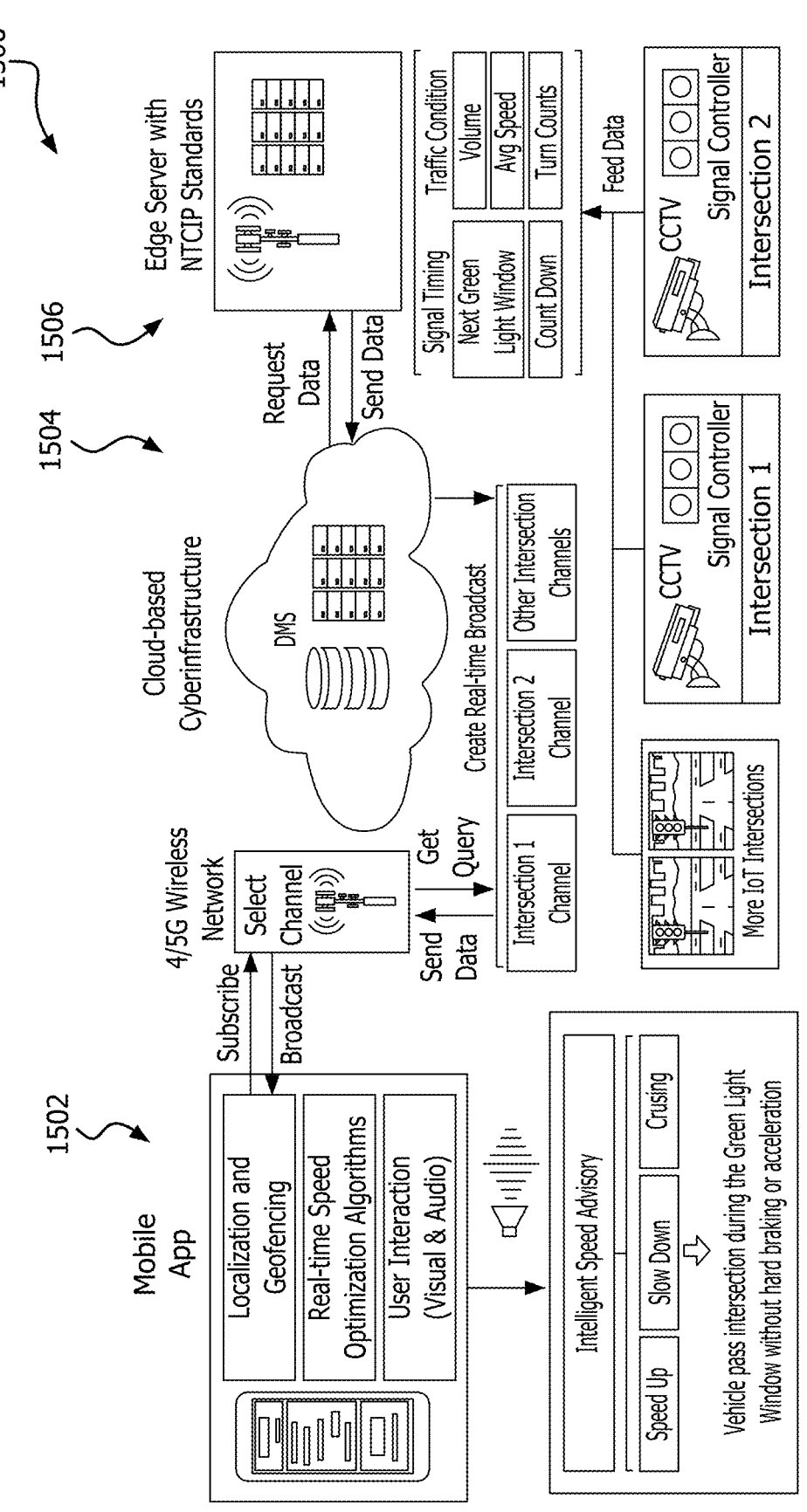
FIG. 15 provides an illustration of a mobile computing framework.

The mobile computing framework may have a multitier designed based on the above-mentioned technical requirements. An illustrative mobile computing framework 1500 is depicted in FIG. 15. There are four tiers defined in the mobile computing framework 1500: (1) a mobile edge tier 1502, (2) a cloud-based cyberinfrastructure tier 1504, and (3) NTCIP edge server tiers 1506. These tiers distribute data storage and computation load at different levels to enable simultaneous speed advisory on multiple vehicles in urban corridors.

Speed Optimization on Mobile Application

The mobile application is deployed on the driver's edge devices and is responsible for generating real-time speed advisories and informing drivers of the results. There are three major components in the mobile app: (1) localization, map matching, and geofencing; (2) speed optimization algorithms; (3) user interaction; and (4) mobile application implementation.

Localization, Map Matching, and Geofencing (LMG) Component

The LMG component helps the mobile application determine the vehicle's geographic location using mobile device sensors and apply geofencing techniques to connect the vehicle with the corresponding signal controller. Vehicle location sensing is activated when the mobile application's speed advisory function is enabled under an approved location-sharing permission from the mobile device. The mobile device can include, but is not limited to, a smart phone. The location sensing acquires the vehicle's geographic location from the mobile device's GPS and the driving direction detected through the gyroscope sensor. The location and driver direction are sensed at the 1-second interval and used as the input to the geofencing technique. Given the potential uncertainty in the mobile device's GPS sensor, the vehicle location measurements are refined using map-matching algorithms, which can snap GPS coordinates to the nearest road network based on the proximity and the vehicle's driving direction. The GPS data refinement starts with retrieving the route and directions from an online navigation Application Programming Interface (API), which is embedded into the pipeline and takes destination inputs from the driver. The navigation result entails trajectory data that portrays the accurate geometry of the road and is applied in the map matching algorithm to snap the vehicle's GPS locations to the road geometry. The refined GPS coordinates may improve the accuracy of the localization, and the performance of the GPS refinement is further discussed below.

The geofencing technique defines the lane configuration and spatial layouts at each signalized intersection. The lane configuration describes the lane number and type (e.g., left-protected turns, straight, and right turns) in each driving direction (e.g., northbound or eastbound) at individual intersections. This lane-specific information can be either manually defined or automatically retrieved from the metadata provided by traffic sensors and cameras deployed at the intersection. The lane configuration may be derived from the metadata of the GRIDSMART traffic camera systems, which are available in many cities in the United States.

Figure 16:
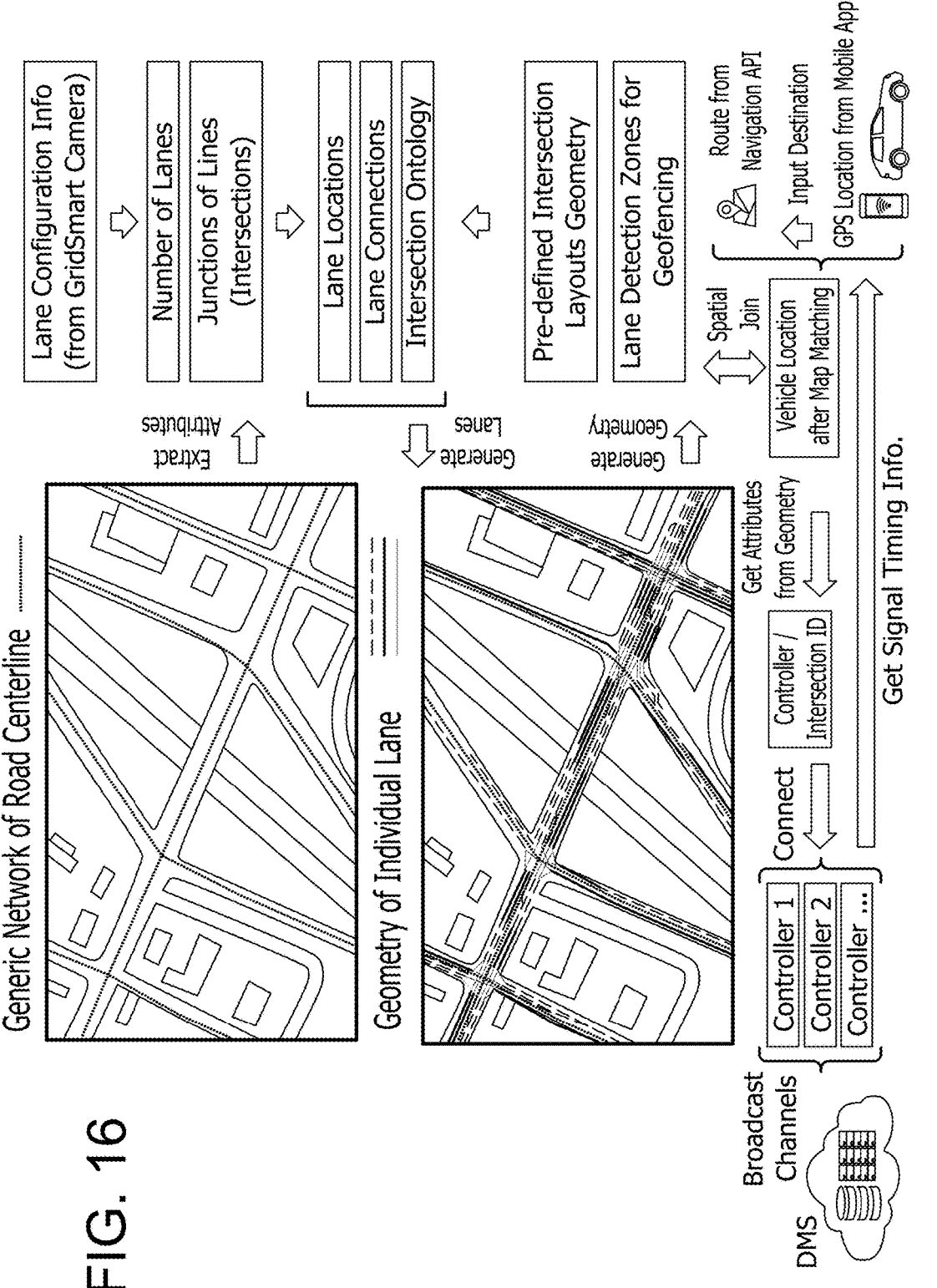
FIG. 16 provides an illustration of an automated geoprocessing pipeline.

On top of the lane information, the spatial extents of individual lanes can be delineated by developing an automated geo-processing pipeline. The pipeline design is illustrated in FIG. 16. The pipeline takes three inputs: (1) lane configuration, (2) a generic network of road centerlines as a GIS shapefile, and (3) predefined intersection lane geometry based on the design manual.

By extracting basic intersection attributes from the road centerline data, the pipeline may determine the number of lanes and their locations on roads that connect intersections. The pipeline then merges this road information with the lane configuration data to define transition areas between the road and the intersections (e.g., the start of a highway ramp or right-protected turn). Within the intersection area, the pipeline combines lane configurations and lane location data with predefined intersection lane geometry data to dynamically generate intersection layouts (e.g., location of the stop bar and connectivity between lanes in different driving directions). The generation is guided by intersection ontology that is created based on traffic rules and transportation asset design guidelines (e.g., the width of a lane location of a stop bar). Through the aforementioned procedures, the pipeline may generate the geometry of individual lanes at an intersection, which may later be used to generate the spatial extent of each lane. The lane spatial extent provides the basic boundary for the geofencing techniques, which may detect vehicles entering. The detection is made when a vehicle's refined GPS location overlaps with the detection zone, and its driving direction, which is measured through the mobile gyroscope sensors, matches the direction of the zone.

After an approaching vehicle is detected through the geofencing techniques, the pipeline maps the vehicle to the corresponding intersection ID and lane ID. The mapping is triggered based on the vehicle's entering of a detection zone and its driving direction. These IDs are connected to the ID of the signal controller that is responsible for the signal timing of the lane to which the vehicle is driving. The mobile application may seamlessly connect to the correct broadcast channel to receive the real-time SPAT information, which serves as a primary input for the speed control algorithms.

The geo-processing pipeline is implemented using the Node.js and Turf.js libraries to ensure that the pipeline can be executed both on the server side and the client side. Creation of the lane detection zone may be executed on the server side through the cloud-based cyberinfrastructure. The geofencing and detection of vehicle may be executed on the mobile application. The mobile application may be developed using React Native, a JavaScript-based native mobile application framework. The implementations can fulfill the first design requirement for enabling vehicle localization.

Speed Control Algorithm

The mobile application comprises a mobile computing module through which speed optimization algorithms are deployed and connected with the geo-processing pipeline and V2I communication features. The speed optimization algorithms include but are not limited to the DQ-EAS algorithm. When deployed on the mobile application, the speed optimization algorithm takes a list of inputs that are measured or derived from the mobile device's sensors and received from the signal controller and camera sensors through the DMS. The speed optimization algorithm may be executed at every second interval and requires these inputs. The inputs measured through the mobile sensors are used to describe the vehicle's driving conditions. These inputs can include, but are not limited to, the vehicle's geographic location, the vehicle's acceleration, and the orientation of the electronic device. The derived input is the vehicle's driving speed, which can be calculated using its geographic location and acceleration. In the mobile application, acceleration measurements may be used to validate the driving speed derived from the GPS, as both measurements are collected at a 1 Hz.

The inputs acquired from the DMS describe the signal timing and traffic conditions at the intersection. They may be retrieved from the signal controller, the roadside camera, and/or other device(s). Inputs collected from the signal controller can include, but are not limited to, the current signal state, the remaining time of the current state, and/or the green window in the next signal cycle. The inputs from the camera can include, but are not limited to, information describing the average traffic volume and/or speed at an upstream intersection.

Figure 10:
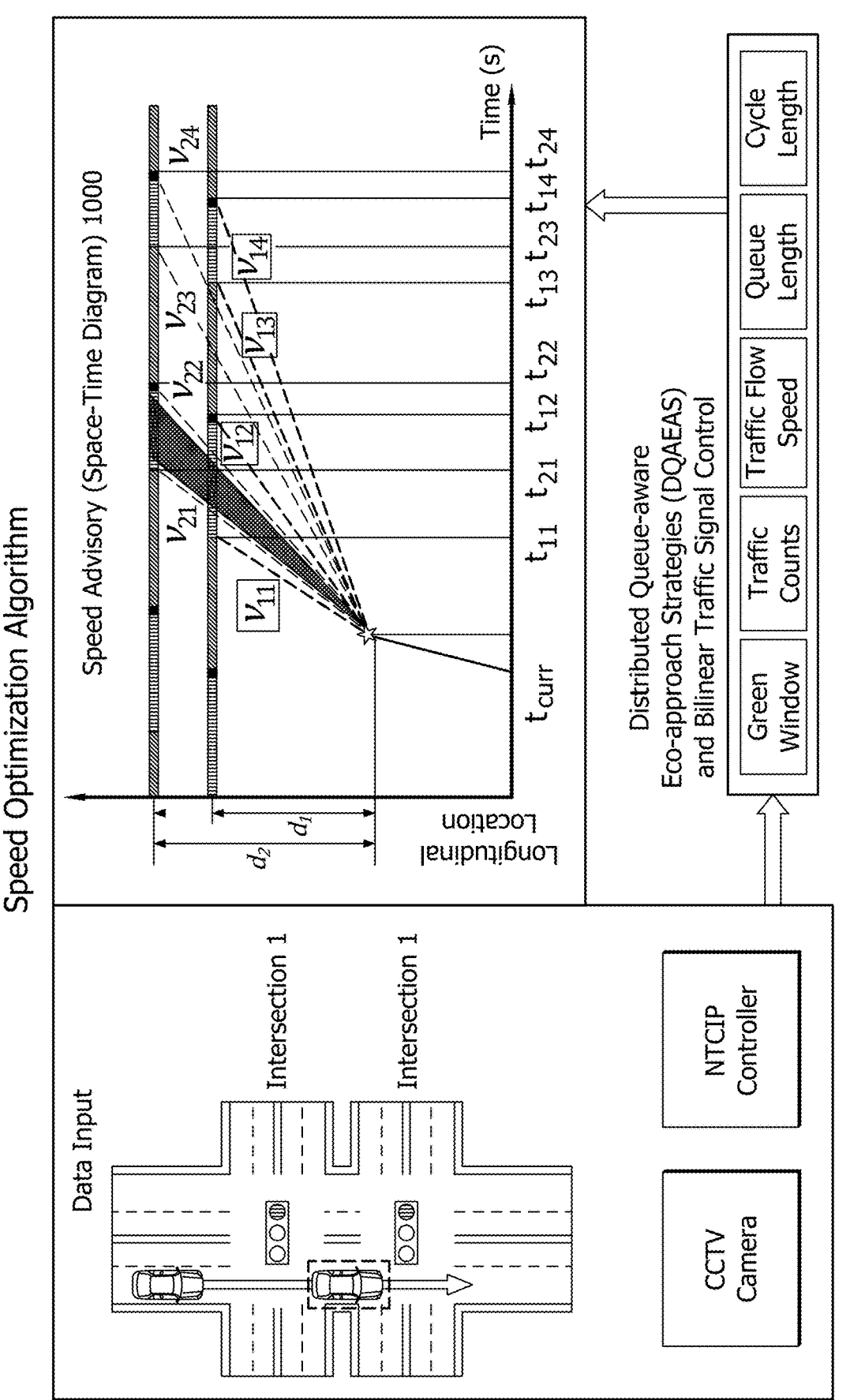
FIG. 10 provides an illustration that is useful for understanding a speed optimization algorithm used in conjunction with the system shown in FIG. 9.
Figure 12:
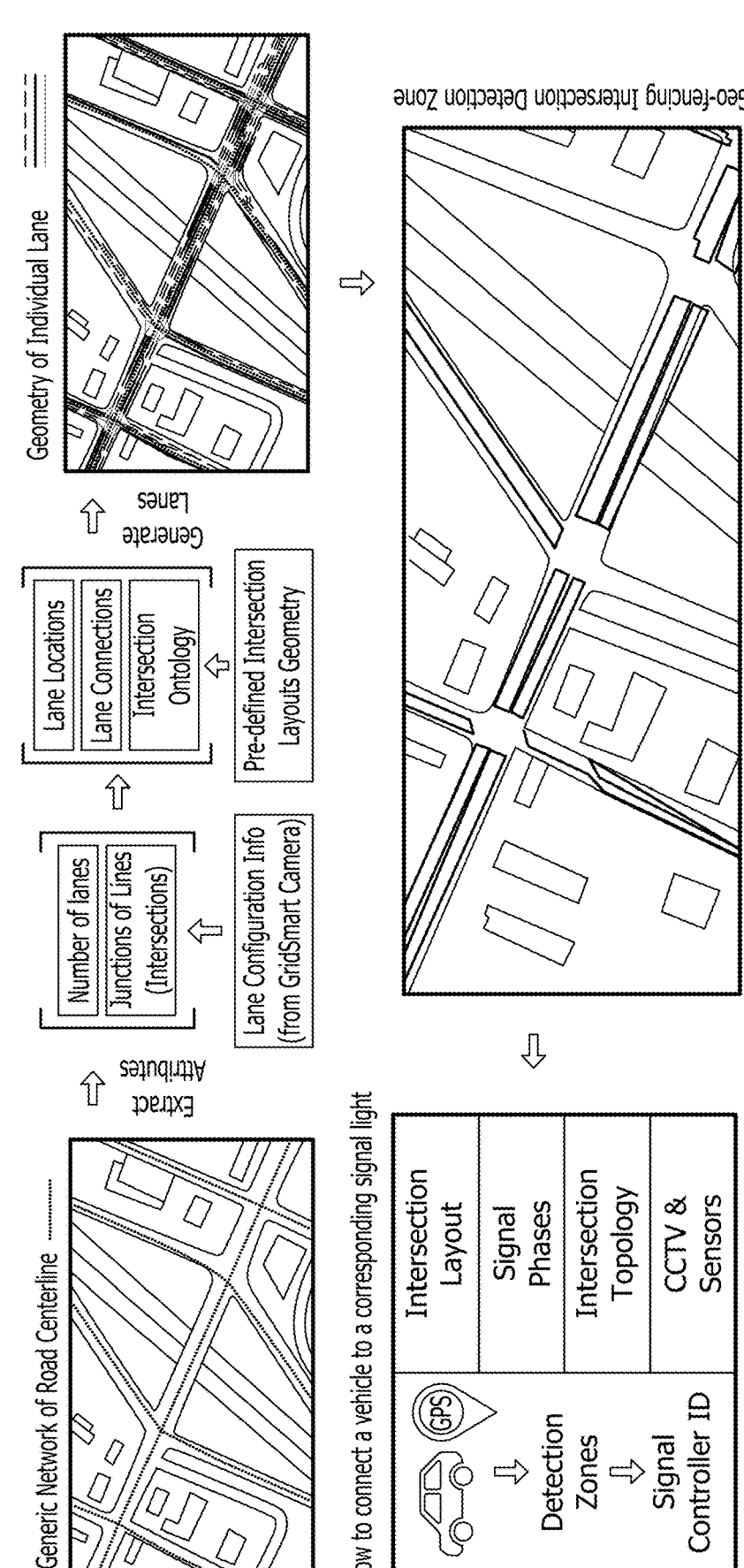
FIG. 12 provides an illustration of a geographic information service (GIS) and geoprocessing used in conjunction with the system shown in FIG. 9.
Figure 13:
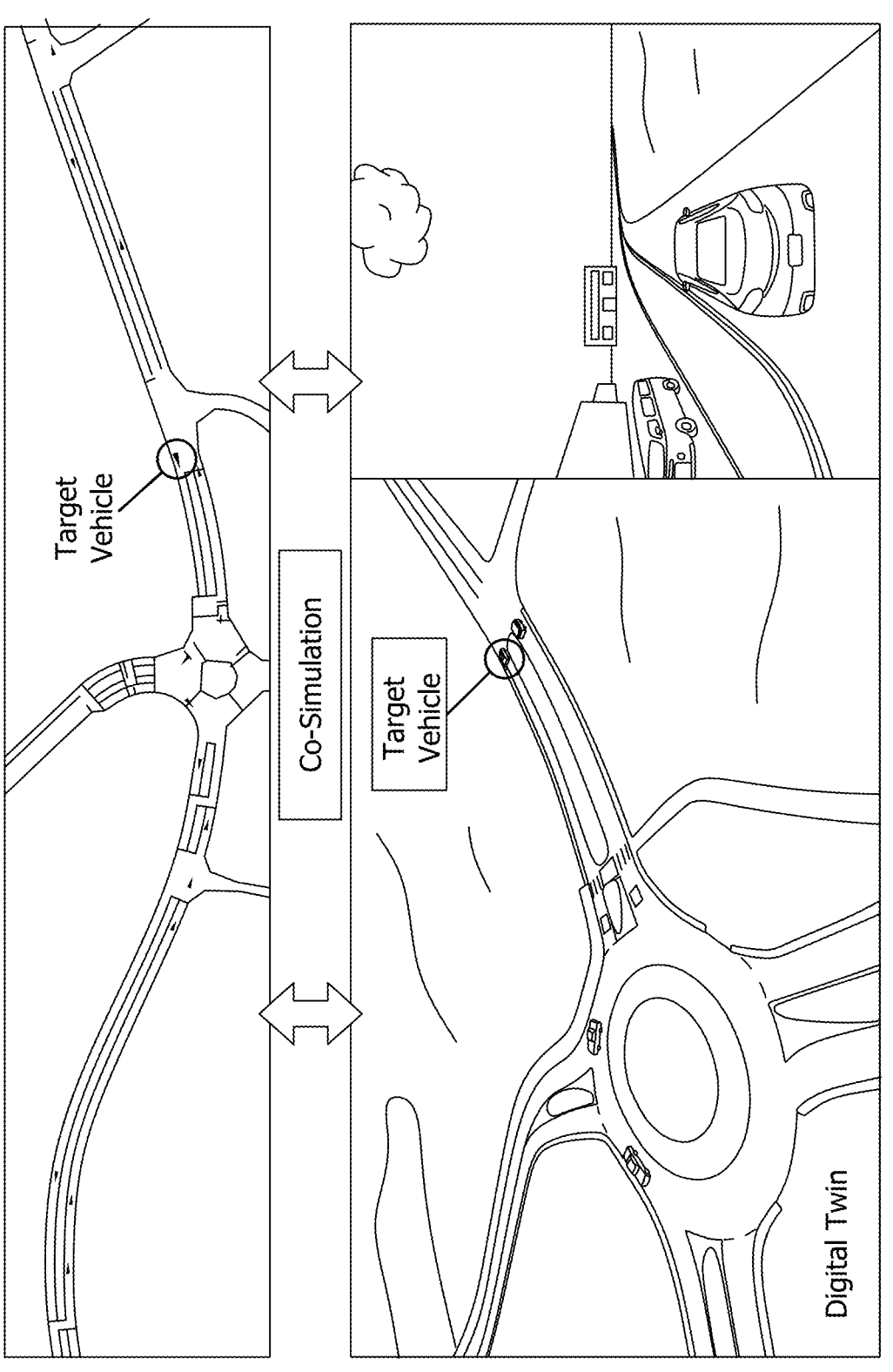
FIG. 13 provides an illustration demonstrating various simulation technologies.

The present solution may have the following four aspects: (1) queue length prediction algorithms which may be incorporated using a Lighthill-Whitham-Richards shockwave model; (2) distributed coasting profiling for each vehicle based on its own characteristics (A, B, C, M); (3) roadmanship consideration in the eco-approach strategies; and/or (4) hierarchical velocity planning including an algorithm to determine the range of target velocities and a computationally efficient heuristic coasting oriented velocity planning algorithm, which is real-time implementable. FIG. 10 provides a space-time diagram 1000 showing a high-level green window determination algorithm in the DQ-EAS.

As shown in the space-time diagram 1000 of FIG. 10, the feasible target velocities for the two downstream intersections during two upcoming cycles are computed as shown by the following mathematical equations (7)-(12).

$$C_{11} = \left[ \frac{d_1}{t_{12} - t_{curr}}, \frac{d_1}{t_{11} - t_{curr}} \right] \cap [0, v_{max}] \tag{7}$$

$$C_{12} = \left[ \frac{d_1}{t_{14} - t_{curr}}, \frac{d_1}{t_{13} - t_{curr}} \right] \cap [0, v_{max}] \tag{8}$$

$$C_{21} = \left[ \frac{d_2}{t_{22} - t_{curr}}, \frac{d_2}{t_{21} - t_{curr}} \right] \cap [0, v_{max}] \tag{9}$$

$$C_{22} = \left[ \frac{d_2}{t_{24} - t_{curr}}, \frac{d_2}{t_{23} - t_{curr}} \right] \cap [0, v_{max}] \tag{10}$$

$$C = [(C_{11} \cap C_{21}) \cup (C_{11} \cap C_{22}), \tag{11}$$

if exist $C_{11}$, else if $C_{11}$ exist $C_{12} \cap C_{22}$, $\tag{12}$ else if $C_{12} \cap C_{22}$ exist $C_{12}$, otherwise]

In above mathematical equations 1-10, $d_1$ and $d_2$ represent the distance to the first and second downstream intersections, respectively. $t_1=[t_{11}, t_{12}, t_{13}, t_{14}]$ and $t_2=[t_{21}, t_{22}, t_{23}, t_{24}]$ represent the green window for the two downstream intersections, respectively. Note that the dynamic queue length prediction is implemented for the first down-stream intersection where the $d_1$ and $t_1$ consider the queue accumulating and discharging process. $t_{curr}$ indicates the current time. $v_{min}$ and $v_{max}$ are the minimum and maximum speed limits. In the simulation, 3.1 mph was used (the minimum speed that a vehicle is not considered in the queue) as $v_{min}$, and the corridor's speed limit of 40 mph was used as $v_{max}$. The present solution is not limited in this regard. Other values for $v_{min}$ and $v_{max}$ can be used in accordance with a given application. $C_{11}$ and $C_{12}$ define the lower and upper limits of feasible target velocity for the vehicle to go through the first downstream intersection during the upcoming two green windows, respectively. Similarly, $C_{21}$ and $C_{22}$ define the lower and upper limits of feasible target velocity for the vehicle to go through the second downstream intersection during the green window. $C=[v_{min\_desire}, v_{max\_desire}]$ is the range of the determined target velocities, which will be an input for the following velocity optimization algorithm.

User Interactions

Figure 17:
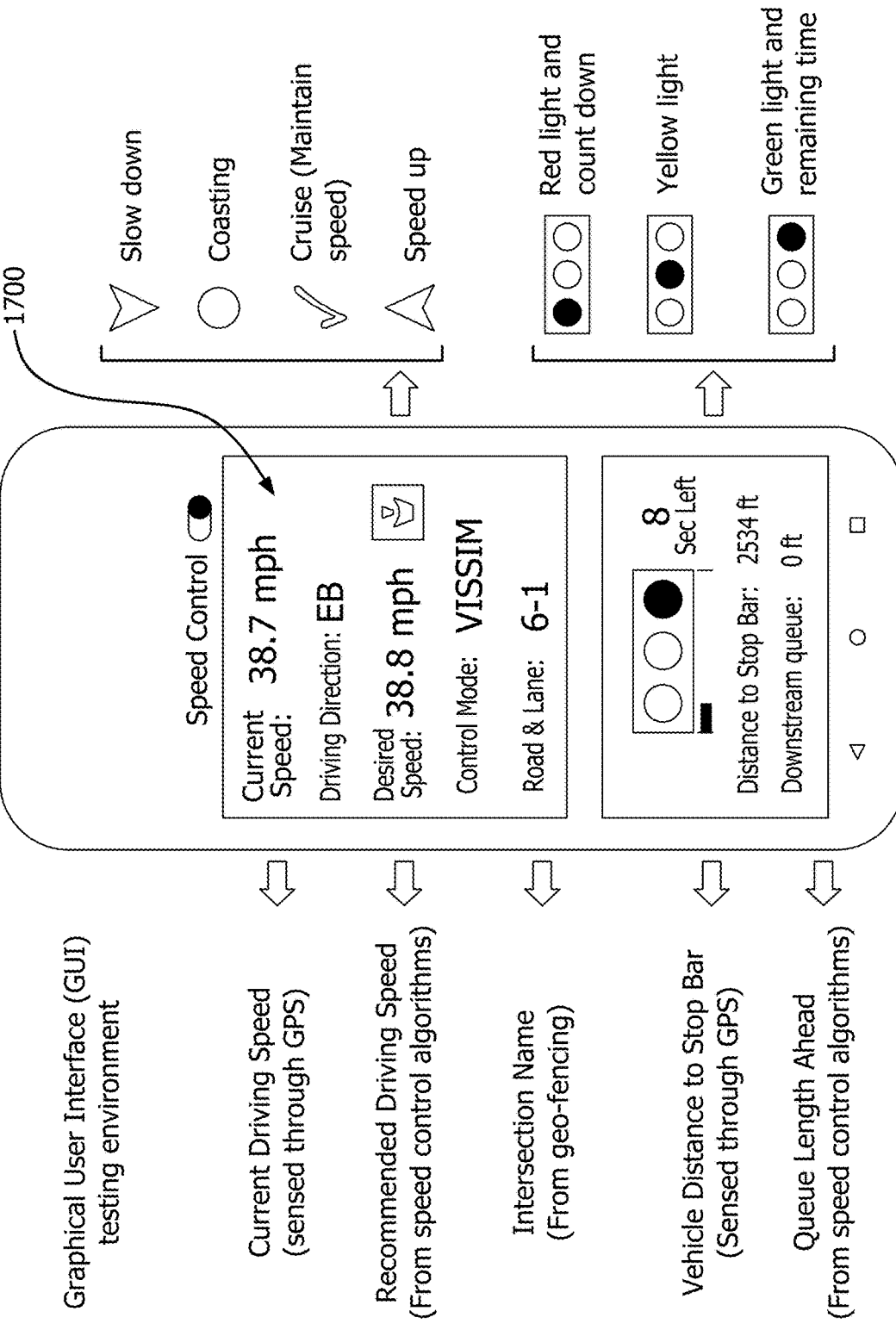
FIG. 17 provides an illustration a mobile communication device.

The present solution aims to make the interaction between the driver and mobile device effective while keeping it minimal enough to avoid potential distractions during driving. Both visual and audio-based communication techniques are applied to mobile application to inform drivers of the most updated speed advisories. The visual-based communication is enabled through a graphical user interface (GUI). An illustrative GUI 1700 is shown in FIG. 17. The GUI 1700 displays both the vehicle's driving condition and speed advisory results. The vehicle's driving condition includes, but is not limited to, the vehicle's current driving speed (which may be estimated using GPS) and the intersection and road name that is identified using the geo-fencing technique. The speed advisory results may be displayed using the traffic light visualization and a color-coded timeline for the countdown. Two other parameters that may be displayed in the GUI include the vehicle's distance to the stop bar and a queue length estimated by the speed control algorithms. The countdown represents the remaining time of the current signal state (e.g., green, red, and yellow). The audio interaction may be enabled through voice assistance, which may speak out the speed advisory to the driver.

The driver can use a single button to switch on and off the speed advisory. Once the speed advisory is activated, all the processes—which conduct geo-fencing, receive signal messages, and calculate speed advisory—may be fully automated and may not require any inputs or interactions from the driver.

Mobile Application

The mobile application may be implemented using React Native, an interoperable software framework that uses JavaScript and the web browser-based React framework for developing native mobile applications that can run on multiple platforms (e.g., Android and/or iOS). The mobile sensing, detection zone identification, and V2I communication features may be implemented through the React Native framework. The sensing compatibility of the mobile app may implemented using the React Native Sensors and Expo Sensor library, enabling both the GPS sensor, accelerometer for vehicle acceleration measurement, and gyroscope to determine the vehicle's driving direction.

The geo-fencing technique may be implemented using Turf.js, a JavaScript library that can perform spatial analytics and be integrated into the mobile application framework. The lane detection zones may be partitioned by regions and sent by the DMS through HTTP requests based on the vehicle's geographic location. The geometry of these detection zones may be received by the mobile application as a GeoJSON file, which can be directly inputted to Turf.js.

The V2I communication of the mobile application may be enabled through a client-side WebSocket library based on Node.js, which can connect the application to the corresponding DMS signal broadcast channel (deployed on the cloud) based on the intersection and controller ID identified through the geo-fencing technique.

The sensing and V2I communication features may be created to provide inputs for the speed control algorithm. The speed control algorithm may be deployed in a modular computing environment rendered through the React Native framework. The mobile computing environment may be generic and adaptive, and/or may host speed and signal optimization algorithms that may be written in client-side programming languages (e.g., JavaScript and/or Type-scripts). In the mobile application, the DQ-EAS algorithm may be implemented using Python and converted to JavaScript to be integrated into the mobile application. Many other speed control algorithms can be integrated into the mobile application and connected to the application's V2I and mobile sensing feature in a similar manner.

The React Native Expo framework may be employed for fast deployment and testing of the mobile application. The framework can bootstrap the developmental code of the mobile application and send it to any testing device with the Expo mobile application through a proxy network. The code of the mobile application may be compiled on the testing devices for testing and experimental purposes.

Cloud Based Cyberinfrastructure

The present solution comprises a DMS to enable real-time V2I communication. The DMS may be developed using a cloud-based server application that can create long-running connections between a mobile client and a server. Examples of these connections include WebSockets and MQTT (IoT), which are communication protocols based on publish-subscribe patterns. The advantage of these patterns is their capability to create a real-time two-way messaging channel through a continuous connection. The DMS may be able to create multiple messaging channels that are directly connected to the edge servers that provide signal timing information from traffic light controllers. Each channel may be assigned to a single signal controller, which controls the signal timing in a specific lane at the intersection. The ID of the messaging channel may be mapped to the ID of the controller, which is associated with the name of its controlling intersection and lane. Once the mobile application has identified the lane and controller ID for the vehicle ID which is approaching through the geo-fencing technique, the mobile application uses the controller ID to subscribe to the corresponding channel. This subscription allows the vehicle to receive the signal timing information that is directly sent through the corresponding edge server. The subscription to the channel may be kept while the vehicle is traveling through the lane detection zone to allow the mobile application to continuously receive signal timing updates. The subscription may be closed when the vehicle leaves the lane detection zone or enters another detection zone.

The DMS may be implemented using the Python Django framework with a Channels extension library. The Django framework is a free and open-source Python framework that adopts the Model-view-controller software design pattern to facilitate the development of an adaptive and maintainable web application. The Django framework may be used to enable asynchronous and real-time communication that provides the mobile application with the most up-to-date traffic and signal information through API endpoints and Web-Sockets. Through RESTful APIs, the DMS can send the detection zone geometries and navigation routes to the mobile application based on the vehicle's location, providing essential inputs to the localization component. The Channels library allows the Django framework to set up long-running connections (e.g., WebSockets and MQTT (IoT)) that are suitable for creating real-time chat and broadcast applications.

Figure 19:
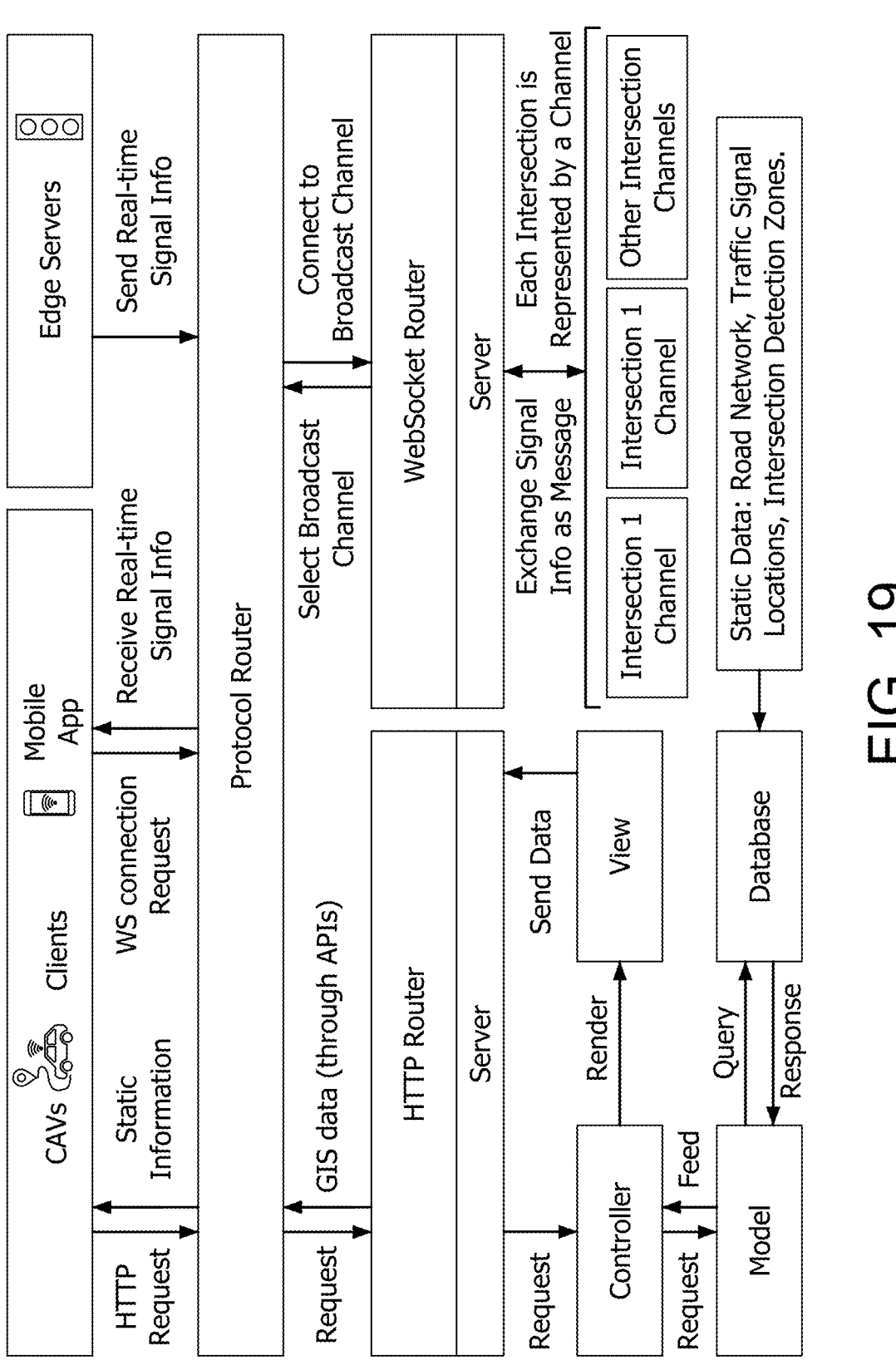
FIG. 19 provides an illustration of a data management system.

The V2I communication may be enabled through the Channels library using its protocol and web WebSockets routers. These routers may determine the types of communication (e.g., a one-time RESTful request or long-running connections) and create API endpoints that may be accessed by internet-connected devices (e.g., smartphones and connected vehicles) through a uniform resource identifier and its components (e.g., scheme, port, and query). The overall design of the DMS is illustrated in FIG. 19.

Edge Server

Edge servers are powerful computing and data processing devices physically located near the system or application where data is generated and/or stored. In the computing framework, edge servers may be the computers that are directly connected to the traffic signal controllers through the NTCIP. The edge servers may be maintained and managed at the local Department of Transportation. The edge servers may directly subscribe to the broadcast channel enabled through the DMS, allowing the mobile application to receive the most updated signal timing information with minimum latency. The edge server may be implemented using the Python Flask framework and/or may be directly connected to the traffic controllers that are deployed at traffic intersections. The edge servers may be managed by the local Department of Transportation and may be used to process and manage traffic signal data locally.

The connection between the DMS and the edge server may be configured to be single-directional so that the traffic optimization algorithms can receive information from the controller but not directly alter the signal phases at traffic controllers. This setting aims to protect transportation infrastructure from cyberattacks.

Results

A series of tests were derived through a simulation driven Computational and Automated Vehicle Environment (CAVE) lab driving experiment to a field communication test to evaluate the feasibility and performance of the mobile computing framework from various aspects. These aspects include (1) the usefulness of the mobile application, (2) the energy-saving benefits from the speed advisory algorithms in a simulated urban environment, and (3) the latency of V2I communication in real urban environments.

CAVE Lab Experiment and Evaluative Survey

A driving experiment was conducted to test the mobile application using CAVE lab, which is a virtual physical proving ground that was developed to evaluate intelligent mobility solutions and acquire real vehicle performance data through an integrated virtual and physical environment. In this environment, a real-world physical vehicle is deployed on advanced steerable hub dynamometers and placed in front of an immersive display that presents virtual on-road scenarios rendered through a vehicle virtual environment simulator with background traffic co-simulated by traffic microsimulation software. Many existing vehicle virtual environment simulators (e.g., CARLA and IPG CarMaker) can be connected to the CAVE Lab through a flexible Real-Sim interface to visually render a 3D realistic on-road scenario. In the experiment, the VISSIM traffic simulation software was used to define the behaviors of other dynamic traffic objects (e.g., traffic lights and other vehicles). To increase the realism of the virtual driving scenarios, the dynamometer can emulate the vehicle's driving conditions and provide actual vehicle response as feedback to VISSIM. The behaviors of background traffic objects should be different when interacting with the testing vehicle driven in the CAVE Lab with or without the mobile application. The actual CAVE Lab environment and experiment configuration are illustrated in the left image of FIG. 18.

In this setting, the CAVE environment provides an efficient way to allow testing of the mobile application's performance through the test drive in a physical vehicle. Meanwhile, the actual energy consumption of the test vehicle under the speed guidance of the mobile application can be measured. Energy impacts of all simulated background traffic in the VISSIM simulation can also be estimated. In the experiment, a Samsung Galaxy S21 was used with a 4G mobile network to host the mobile application. The experimental process is depicted in the right image of FIG. 18. VISSIM scenarios developed to mirror the Shallowford Road traffic corridor in Chattanooga have been used to render the virtual test drive during the experiment. The experiment successfully demonstrated the feasibility of the mobile application.

Qualitative Evaluation and Survey Questions

To evaluate the usefulness of the mobile application, a panel of twelve observers including both experts and non-experts to speculate on the driving experiment conducted in the CAVE environment. Among the panelists, six observers were transportation and urban scientists. The remaining observers did not have any transportation-related technical backgrounds. An evaluative survey was sent to the invited observers after the experiment to (1) collect qualitative feedback on the usefulness of the mobile application's interface and its visual and audio speed advisory, (2) learn whether there are any concerns related to the use of the mobile application and its speed advisory features, and (3) identify potential improvements for daily use in large urban areas.

After the test drive, the observers were invited to answer the following survey questions. Do you think the mobile application is useful for sustainable transportation? Are the visual and audio assistance for the speed advisory easy to understand and interpret? Is the application intuitive and easy to operate? Do you think the application has any concerns? Do you have any suggestions for future improvements?

The results of these questions are discussed below. The survey was conducted as a preliminary evaluation of the feasibility and usefulness of the mobile application along with its speed advisory features.

Survey Questions: Do you think the mobile application is useful for sustainable transportation? Are the visual and audio assistance for the speed advisory easy to understand and interpret?

All observers commented positively on these questions and agreed on the usefulness of the mobile application. As for detailed comments for the second one of these two questions, observer three mentioned, "For visual, I suggest to keep only the speed info and make them larger. All other info is not critical for driving safety." Observer seven pointed out that "Audio speed advisory was good. It should be integrated with google maps audio or other audio navigation."

Survey Question: Is the Application Intuitive and Easy to Operate?

Among all twelve observers, ten observers commented positively on this question regarding the intuitiveness of the mobile application. Two observers were not sure about the easiness of using the mobile application. Detailed comments are as follows: "The instruction from the app is easy to follow," from observer three; "The app looks intuitive. I think it should be easy to close the app or turn the audio off for the app while driving," from observer 8; "I think so. It simply did its own thing," from observer eleven.

Survey Question: Do You Think the Application has any Concerns?

Among all twelve observers, eight observers addressed their concerns regarding the use of the mobile application. These concerns can be summarized as follows: audio speed advisories might interrupt other audio channels (e.g., Google Maps navigation audio, podcast, music, and phone calls); the audio speed advisory might be disturbing to other passengers in the car with the driver; and the mobile application should consider unplanned traffic events (e.g., roadwork and incidents), as well as the speed of neighboring vehicles.

The mobile application already addresses some of these concerns, as its speed advisory generated from the speed optimization algorithm considers the surrounding traffic volume and flow using cameras and sensors deployed at the traffic inter-sections.

Survey Question 5: Do You have any Suggestions for Future Improvements?

Many observers provided their opinions and experiences regarding the improvement of the mobile application. Major suggestions from the observers are as follows.

Observer 1: "The app may include an option to be integrated with the vehicle's cruise control."

Observer 2: "The control decision process should leverage vehicle sensing technologies, especially for vehicles equipped with cameras, radars, lidar."

Observers 3 and 6 proposed that the app "should use Head Up Display (HUD), instead of cellphone screen, as display."

Observer 7: "The app should be integrated into Apple-CarPlay/Android Auto and/or like Ghost screen."

Most observers' suggestions are related to the user interaction aspects of the mobile application. The focus was on the real-time speed control and implementation of the V2I-based speed optimization strategy on smartphones. Suggestions from observers one and two are more related to the implementation of the speed control strategies on autonomous vehicles, in which the speed advisories can be directly connected to the vehicles' sensor and driving system. The mobile application presented here was developed to deliver intelligent V2I-based speed optimization to traditional vehicles, which are human-driven automobiles without advanced cruising systems and sensors.

Despite multiple concerns and suggestions for improving the user experience of the mobile application, the evaluative survey has proven the usefulness of the mobile application from the perspective of would-be drivers. Based on the existing framework of the current mobile app, more user-friendly features can be added in the future to improve the intuitiveness.

Simulated Energy Benefits

Figure 20:
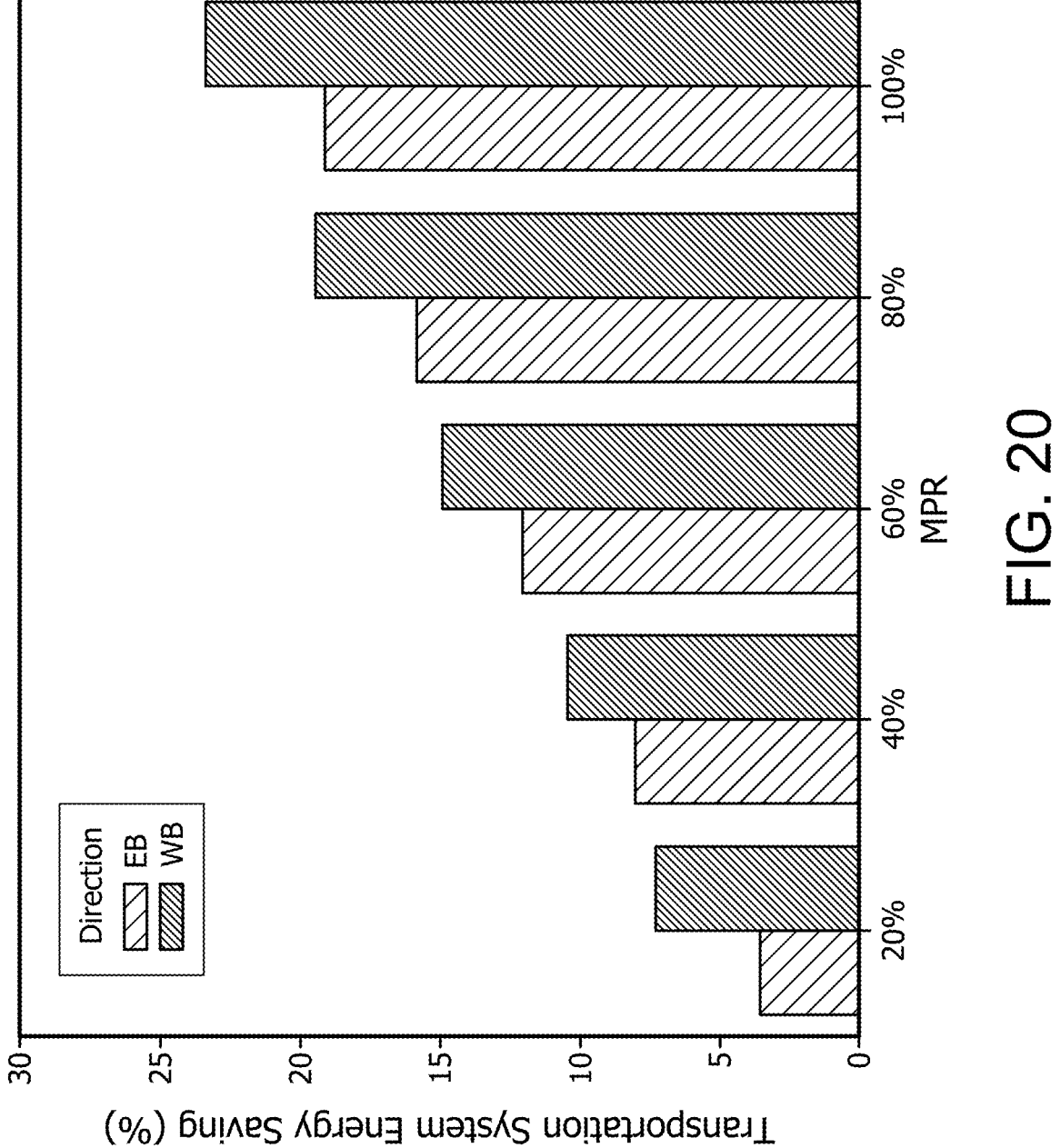
FIG. 20 provides a graph showing energy savings of a transportation system.
Figure 21A:
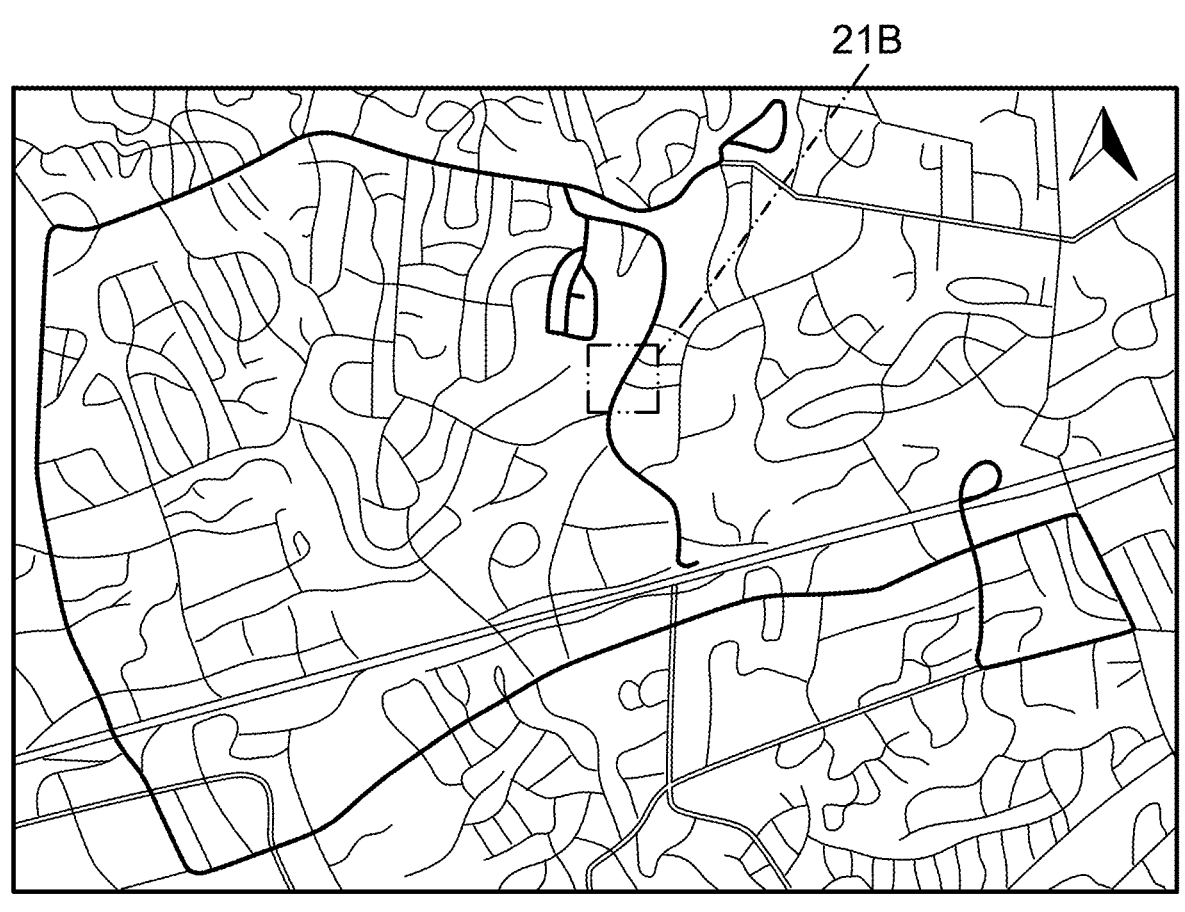
Figure 21B:
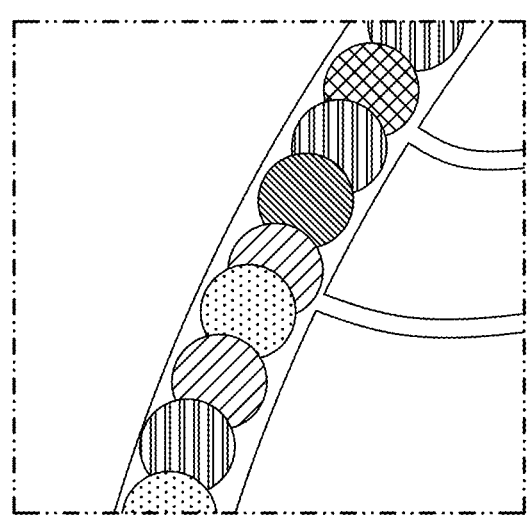
Figure 21C:
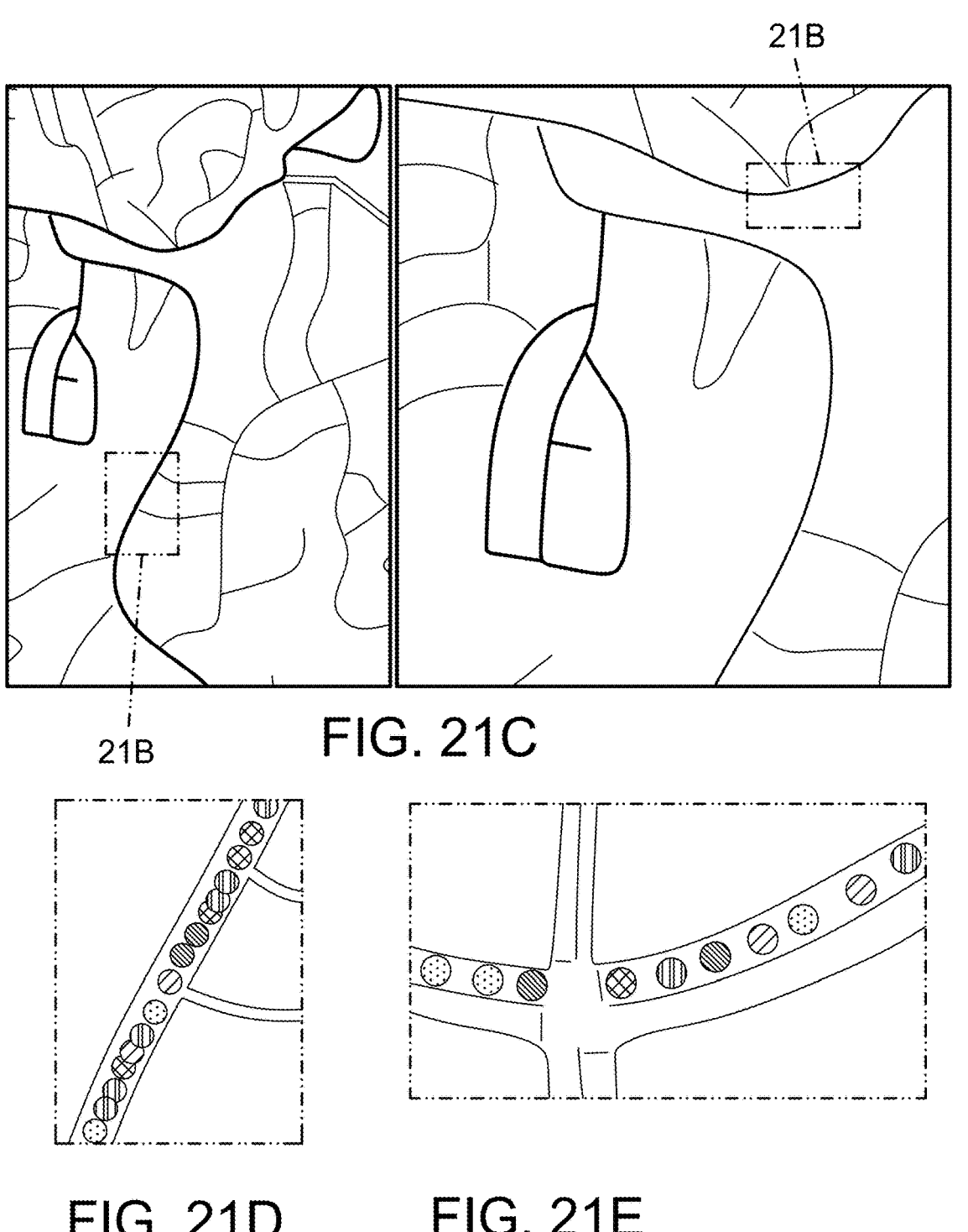
Figures 21H, 21I:
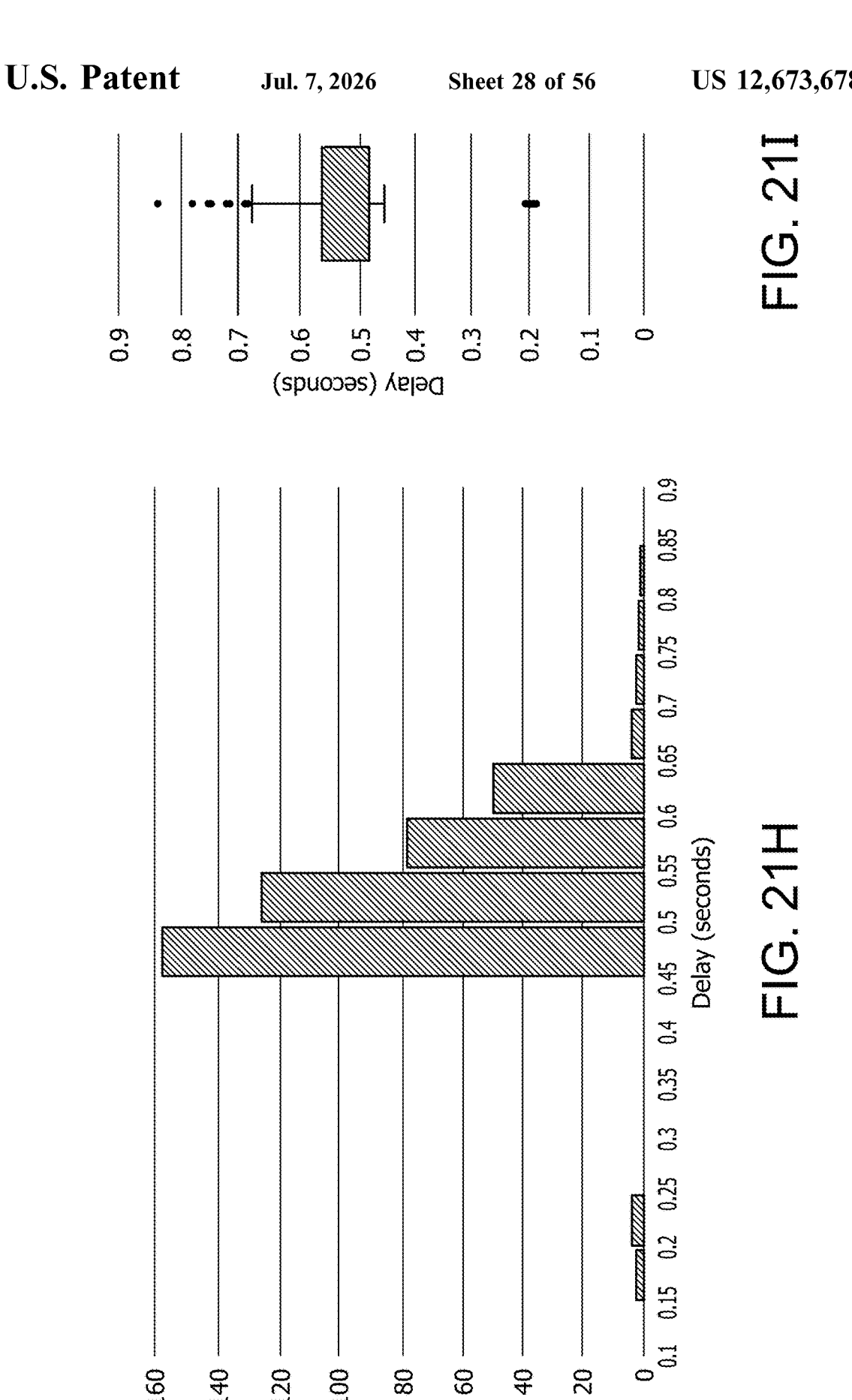

A series of traffic simulation experiments have been conducted through VISSIM to evaluate the energy-saving benefit of mobile applications systematically. For simplicity, it is assumed in the simulation that the vehicle with the mobile application will exactly follow the speed guidance, i.e., 100% compliance. In the real world, however, driver compliance behavior will vary by many factors, e.g., driver and traffic flow characteristics. A more realistic driver compliance behavior modeling may be integrated into the simulation. FIG. 20 summarizes the system level energy savings of all vehicles traveling on the EB and WB directions of Shallowford Road, Chattanooga, compared with the baseline scenario under different market penetration rates (MPRs) of the mobile application usage. Changes in the traffic dynamics after the disclosed speed advisory algorithm is introduced into the traffic corridor are often reflected as reducing the stop-and-go driving behaviors in individual vehicles and mitigating traffic congestion at multiple signalized intersections. FIG. 20 shows that the 100% MPR scenario has the highest energy savings on both eastbound traffic (20%) and westbound traffic (24%). The difference between EB and WB might be explained by the fact that WB traffic is congested, and the speed advisory is more effective in congested conditions as more stops may be avoided. It is worth pointing out that at low MPR (e.g., 20%), although the vehicles with the mobile application might still achieve high energy savings, the energy saving of the overall transportation system is quite limited (up to 7%). These results indicate that improving the MPR of the mobile application (or other speed optimization technologies) would be more beneficial than improving the algorithm itself, which also verifies the importance of the disclosed mobile edge computing framework.

Field Communication and Localization Test

A field test was conducted to measure the communication delay between the mobile application and the DMS by driving a real-world vehicle in an urban environment. The test aimed to demonstrate the reliability and feasibility of the real-time traffic signal information delivery from the IoT-connected transportation infrastructure to the individual vehicle that uses the mobile application. A number of field tests have been conducted on urban roads in both Anderson and Knox counties in Tennessee. These tests were performed under a 4G mobile network with a download speed of 115-128 Mbps and upload speed of 19.3 Mbps using two Android smartphones, including a Samsung Galaxy S21 (advanced settings) and a Samsung Galaxy A21 (basic hardware). In addition, a localization test was conducted on the Shallowford Road corridor in Chattanooga, Tennessee, to quantify the accuracy of mobile phone-based localization.

Communication Latency

During these field tests, a number of emulated traffic signal controllers were configured on edge servers following the same design of the computing framework. These controllers were then connected to the DMS to create their broadcasting channels and started to stream signal timing and traffic information at a 1-second interval within their channel. On the vehicle end, the mobile app was activated and started to subscribe to different DMS channels and receive signal timing and traffic information from different emulated controllers. Once this information was received, the mobile application executed the speed optimization algorithms, which took less than 0.05 seconds to provide speed advisory results. Afterward, the mobile application calculated the communication delay by subtracting the information received time (using the smartphone's local time) from the information's sent time that is coded in the message by the emulated controller. The sent time is determined using the edge server when an emulated controller broadcasts the information to a DMS channel. The smartphone's local time and the edge server's time setting were synchronized with the Internet time to ensure timing consistency. The delay of each message received from the DMS is mapped to their received location using the smartphone's GPS measurements.

Figure 9:
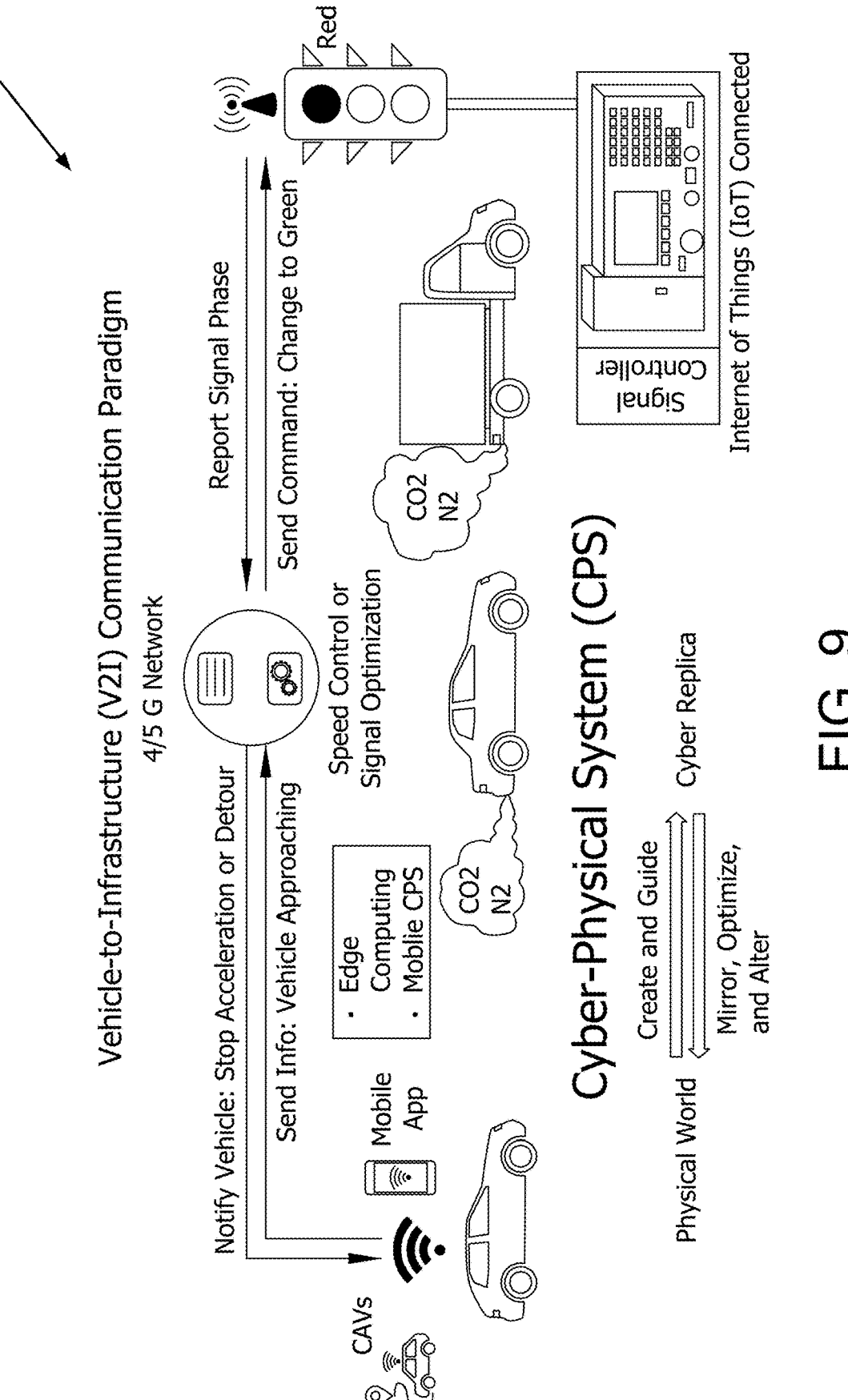
FIG. 9 provides an illustration showing a vehicle-to-vehicle infrastructure communication paradigm.

All the tests demonstrated that the delay between the mobile application and the emulated signal controllers is no more than 0.9 seconds, which fulfills a design requirement. One of the communication tests included a twenty-mile drive. The spatial mapping of the 2,002 GPS points that calculated the communication delay is illustrated in the left side image and graph of FIG. 21. The result demonstrated that most communications were completed within 0.8 seconds. The result was subset into an urban residential community near the intersection between the Cavet Station Greenway and MiddleBrook Pike using 426 GPS points (as depicted in FIG. 9b). The result of the subarea is similar to that of the entire twenty-mile drive. Based on the result, a confidence was gained that all of the 2,002 V2I communication tests have fulfilled the design requirement, which ensures that the speed advisory may receive necessary input within one second to provide real-time speed advisory at a 1-second interval. Various fall safe strategies have been developed to cope with the situation when the communication exceeds one second. These strategies include creating a local counter that uses previously received signal timing information to locally calculate the remaining time of the current signal state and its associated green window.

Vehicle Localization Accuracy

Figure 22C:
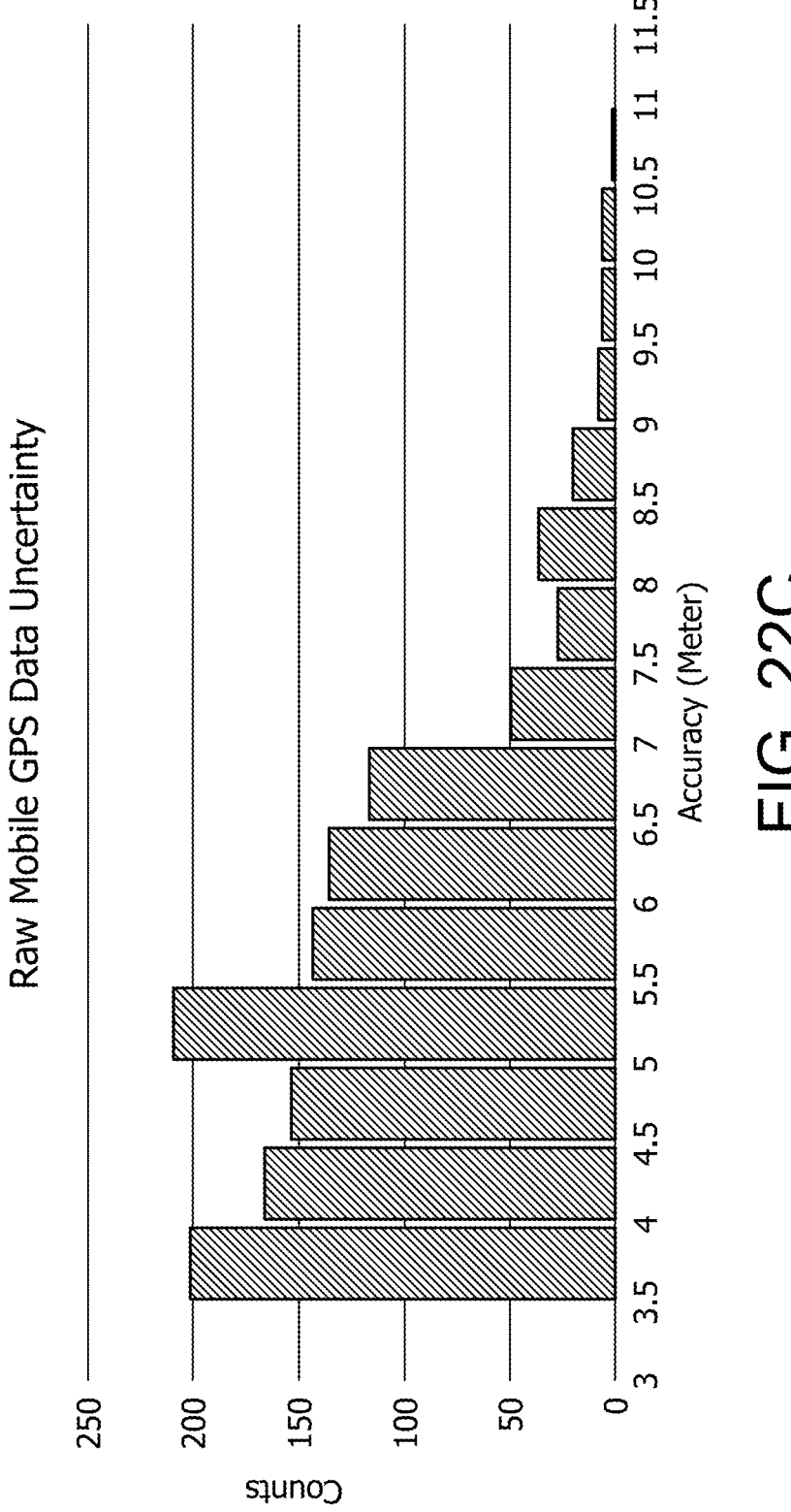

The mobile application used the React Native Geolocation library to sense the vehicle's location using the smartphone's GPS. A field test was conducted within the Shallowford Road traffic corridor in Chattanooga, Tennessee, to quantify the uncertainty in the smartphone's GPS measurement. Based on the sampling of 1,284 points, it was discovered that the raw mobile sensed GPS coordinates have an accuracy ranging from three and a half meters to eleven meters, with a median of five and two tenth meters. The distribution of the GPS point accuracy is depicted in FIG. 22. The accuracy estimation may be enabled through the React Native Geolocation library in real-time and can be used to filter GPS measurements with an accuracy of only within six meters. Because the GPS accuracy would affect the accuracy in the localization of the vehicle, map matching methods were employed that use the road network geometry received from online navigation APIs to match and snap the smartphone GPS measurements to the vehicle's navigation route. This process can significantly reduce uncertainty in the GPS and vehicle speed measurement using smartphone sensors. Modern smartphones also provide enhanced geolocation capabilities, which adopt the combined features of Google location service, Android location service, and WiFi and Bluetooth scanning to improve the accuracy of the GPS measurement.

Data Packet Drops and Potential Fail Safe

During the field communication tests, there was not an encounter of any situations that involved data packet drops and network interruption. During the localization test using the same setup, there was also no network connection issues. A continuous network outage that is longer than one minute may impact the mobile application, which may prevent the mobile speed optimization algorithm from acquiring real-time signal and traffic information. During a communication outage, the mobile application informs the driver about the lost connection. An intermittent network interruption that prevents the mobile application from retrieving real-time signal information at one-second intervals may create less impact on the speed optimization algorithm, as the mobile application may derive the traffic signal countdown (time remaining for the current phase) at the same intersection using the previously retrieved information from the V2I communication.

A potential solution to minimize the impact of the intermittent data packet drops on the speed optimization application is integrating a traffic flow emulator into the mobile application. The emulator may interpolate and project accurate traffic information using traffic sensor data received from a previous timestamp to cover the data input for the speed optimization algorithm during a temporal or intermittent wireless communication interruption.

A mobile edge computing framework has been described to optimize traffic at signalized intersections using real-time V2I communication, vehicle speed optimization, and cyber-physical integration. Our framework includes a mobile app, a cyberinfrastructure-enabled DMS, and edge servers that allow the real-time delivery of signal timing information from traffic light controllers to individual vehicles. The mobile application hosts a speed optimization strategy (DQ-EAS) that uses real-time signal timing and traffic information to provide speed advisories to help drivers avoid the stop-and-go traffic pattern in urban traffic corridors. The speed advisory feature generates optimal driving speed every second and provides drivers with both visual and audio guidance to ensure the vehicle passes the signalized intersection during the green light as much as possible.

The mobile application has been examined and evaluated through a series of tests, which included a CAVE Lab driving experiment, a traffic simulation-based system-level energy evaluation, and a field communication delay and localization test. An evaluative survey was conducted to provide potential drivers' feedback from twelve observers of different backgrounds. These observers participated in the CAVE Lab driving experiment using the mobile app, and all commented positively on the usefulness of the mobile application. The simulation-based energy evaluation shows that the 100% MPR scenario can achieve up to 24% energy savings. It is also worth noting that at low MPR (e.g., 20%), although the vehicles with the mobile application might still achieve high energy savings, the energy saving of the overall transportation system is quite limited (up to 7%). These simulation results indicate that improving the MPR of the mobile application (or other speed optimization technologies) would be one of the top strategies for sustainable transportation, which also verifies the importance of the scalable mobile edge computing framework described herein. The communication latency test demonstrated that the delay between the mobile application and the emulated signal controllers through 4G cellular network is less than one second, which satisfies the design requirement for energy applications. In terms of localization accuracy, the raw mobile sensed GPS coordinates have an accuracy ranging from three and a half meters to eleven meters, with a median of five and two-tenth meters. With the help of map matching methods, which use the road network geometry received from online navigation APIs to match and snap the smartphone GPS measurements to the vehicle's navigation route, localization accuracy and reliability have been improved. Above all, these tests, together with the survey results, have successfully demonstrated the feasibility and benefit of the disclosed mobile computing framework for hosting real-time V2I-based speed advisories.

It can be concluded that the primary contributions of the disclosed technologies include: (1) presenting the design and implementation of a mobile edge computing framework that integrates the DQ-EAS algorithm with V2I communications to deliver intelligent speed advisories through smartphones and (2) performing a series of laboratory and field tests to prove the feasibility of the framework from both the technical and methodological aspects. The practical benefit of the disclosed technologies sheds light on using smartphone and mobile applications to facilitate the optimization of urban traffic and connecting traditional vehicles with intelligent transportation systems through IoT-connected devices.

A series of extensive and comprehensive on-road experiments can be conducted using the mobile app to evaluate the real-world energy benefit of the mobile application as well as the compliance behavior of drivers while using the mobile application. In addition, more formal usability and driving behavior tests can be conducted to improve the human-machine interaction between the driver and mobile app for a more intuitive speed advisory. Also, since the spatial coverage of the present approach relies on the availability of V2I traffic information through IoT-connected infrastructure, the disclosed mobile application can be connected to commercial V2I data providers, such as Traffic Technology Services Inc. Further, the scalability and interoperability of the disclosed mobile application can be further improved by implementing the present mobile computing approach into major navigation applications and vehicles' infotainment systems (e.g., iOS CarPlay and Android Auto).

Figure 23:
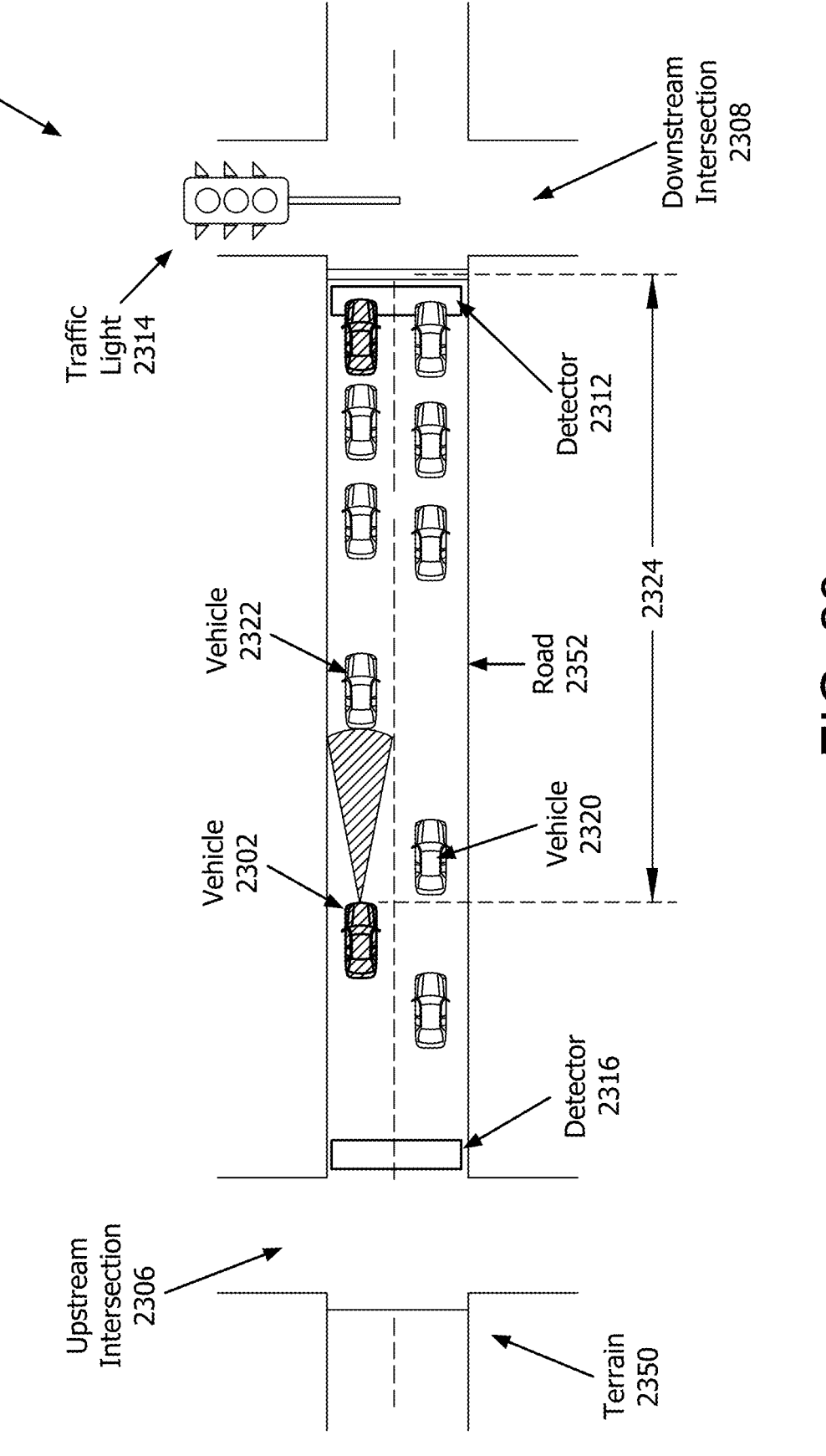
FIGS. 23-24 provide illustrations of a system implementing the present solution.

FIG. 23 provides an illustration of a system 2300 implementing the present solution. System 2300 comprises a vehicle 2302 traveling over a terrain 2350. The vehicle 2302 can include, but is not limited to, an electric bicycle, a motorcycle, a car, a truck, a drone, an unmanned ground vehicle, a robot, and/or other mobile platform. The vehicle 2302 may be controlled manually, autonomously, and/or semi-autonomously. The vehicle 2302 may have an occupant 2416 with a mobile communication device 2418. The mobile communication device 2418 can include, but is not limited to, a smart phone, a personal computer, a laptop computer, a smart watch, smart glasses, a cell-network-enabled tablet, and/or a personal digital assistant.

Other vehicle(s) 2320 may be traveling over the terrain as well. The terrain can include, but is not limited to, road(s) 2352. The road(s) 2352 may have intersection(s) 2306, 2308. Traffic light(s) 2314 may be provide at one or more of the intersection(s) 2308. A detector 2312, 2316 may also be provided at or in proximity to the intersection(s) 2306, 2308. Each detection is configured to detect the number of vehicles in a queue, the speed(s) of the vehicle(s), and/or other characteristics of the environment and/or object in the environment.

Figure 24:
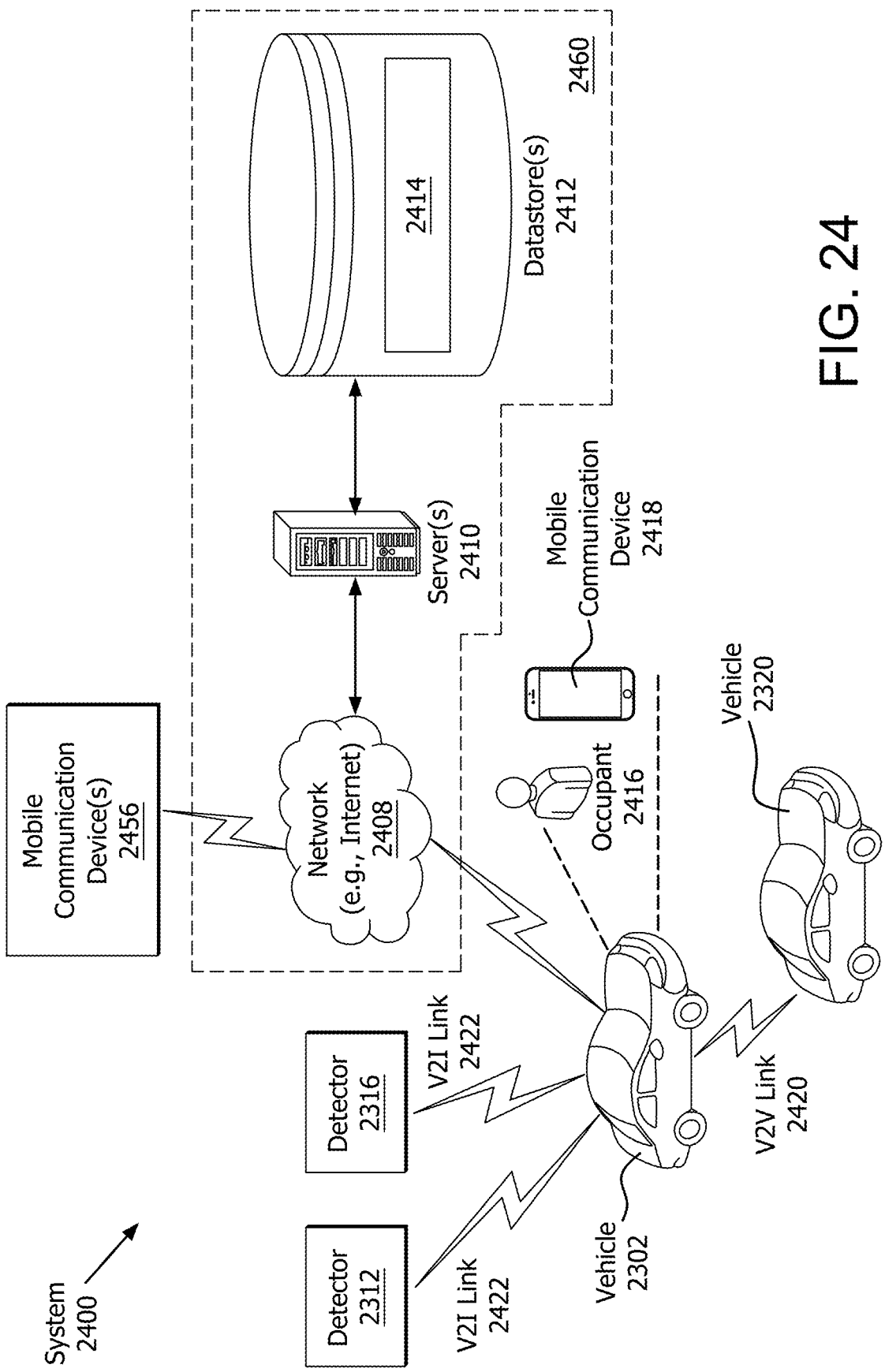

FIG. 24 provides an illustration of system 2400 implementing the present solution. System 2400 comprises vehicles 2302, 2320 which are communicatively coupled to each other via a V2V link 2420. Vehicle 2302 is also communicatively coupled to detector(s) 2312, 2316 via V2I links 2422. Vehicle 2302 is communicatively coupled to other remote devices via a network 2408 (e.g., the Internet, a cellular network, and/or a radio network). The remote devices can include, but are not limited to, mobile communication device(s) 2456 and/or server(s) 2410. The server 2410 is configured to access data 2414 stored in datastore(s) 2412.

Figure 25:
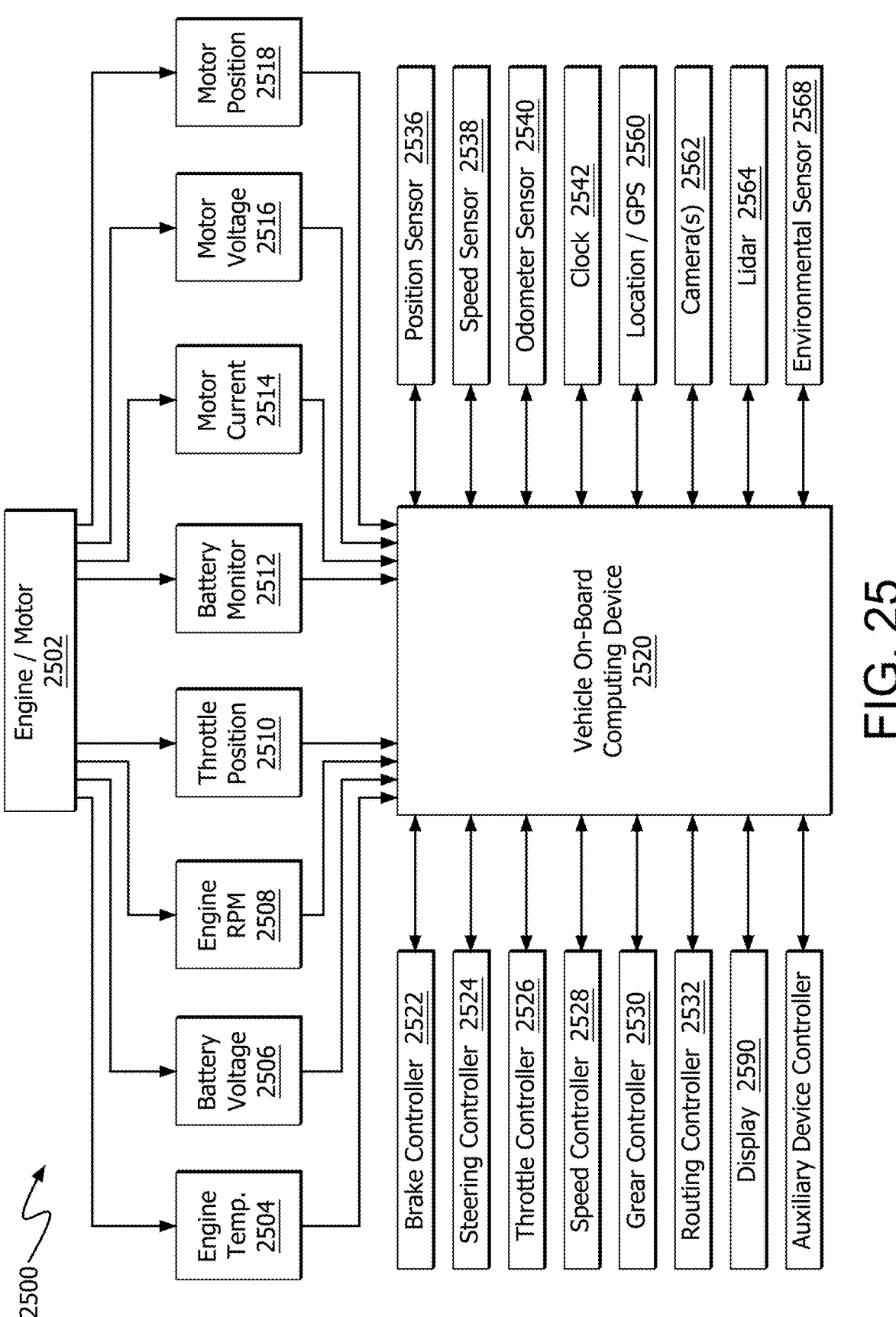
FIG. 25 provides an illustration of a system architecture for a mobile platform.

FIG. 25 provides an illustration of an illustrative system architecture for a mobile platform 2500. Vehicle(s) 2302, 2320 of FIGS. 23-24 can have the same or similar system architecture as that shown in FIG. 25. Thus, the following discussion of mobile platform 2500 is sufficient for understanding vehicle(s) 2302, 2320 of FIGS. 23-24.

Mobile platform 2500 includes an engine or motor 2502 and various sensors 2504-2518 for measuring various parameters of the mobile platform. The sensors may include, but are not limited to, an engine temperature sensor 2504, a battery voltage sensor 2506, an engine Rotations Per Minute (RPM) sensor 2508, a throttle position sensor 2510, a battery monitoring system 2512, a motor current sensor 2514, a motor voltage sensor 2516, and/or a motor position sensor (e.g., resolvers and encoders) 2518.

The mobile platform 2500 can also include, for example: a position sensor 2536 (e.g., an accelerometer, a gyroscope and/or an inertial measurement unit); a speed sensor 2538; and an odometer sensor 2540. The mobile platform 2500 may have a clock 2542 that the system uses to determine a time during operation.

The mobile platform 2500 may also include various sensors that operate to gather information about the environment in which the mobile platform is traveling. These sensors may include, for example: a location sensor 2548 (e.g., a Global Positioning System (GPS) device); image-based perception sensors such as one or more cameras 2562; and/or environmental sensors 2568 such as a precipitation sensor and/or ambient temperature sensor. The image-based perception sensors may enable the mobile platform to detect objects that are within a given distance range of the mobile platform 2500 in any direction, while the environmental sensors collect data about environmental conditions within the mobile platform's area of travel.

During operations, information is communicated from the sensors to the on-board computing device 2520. The on-board computing device 2520 can (i) cause the sensor information to be communicated from the mobile platform to an external device (e.g., detector(s) 2312, 2316 of FIG. 23, vehicle 2320 of FIGS. 23-24, server(s) 2410 of FIG. 24, and/or mobile communication device(s) 2418, 2456 of FIG. 24) and/or (ii) use the sensor information to control operations of the mobile platform. For example, the on-board computing device 2520 may control: braking via a brake controller 2522; direction via a steering controller 2524; speed and acceleration via a throttle controller 2526 (in a gas-powered vehicle) or a motor speed controller 2528 (such as a current level controller in an electric vehicle); a differential gear controller 2530 (in vehicles with transmissions); and/or other controllers. The on-board computing device 2520 may perform operations to cause the mobile platform 2500 to follow a given trajectory generated by a routing controller 2532 and/or perform a maneuver (e.g., brake, accelerate, or swerve) based on sensor data. Various information may be output via display 2590.

Figure 26:
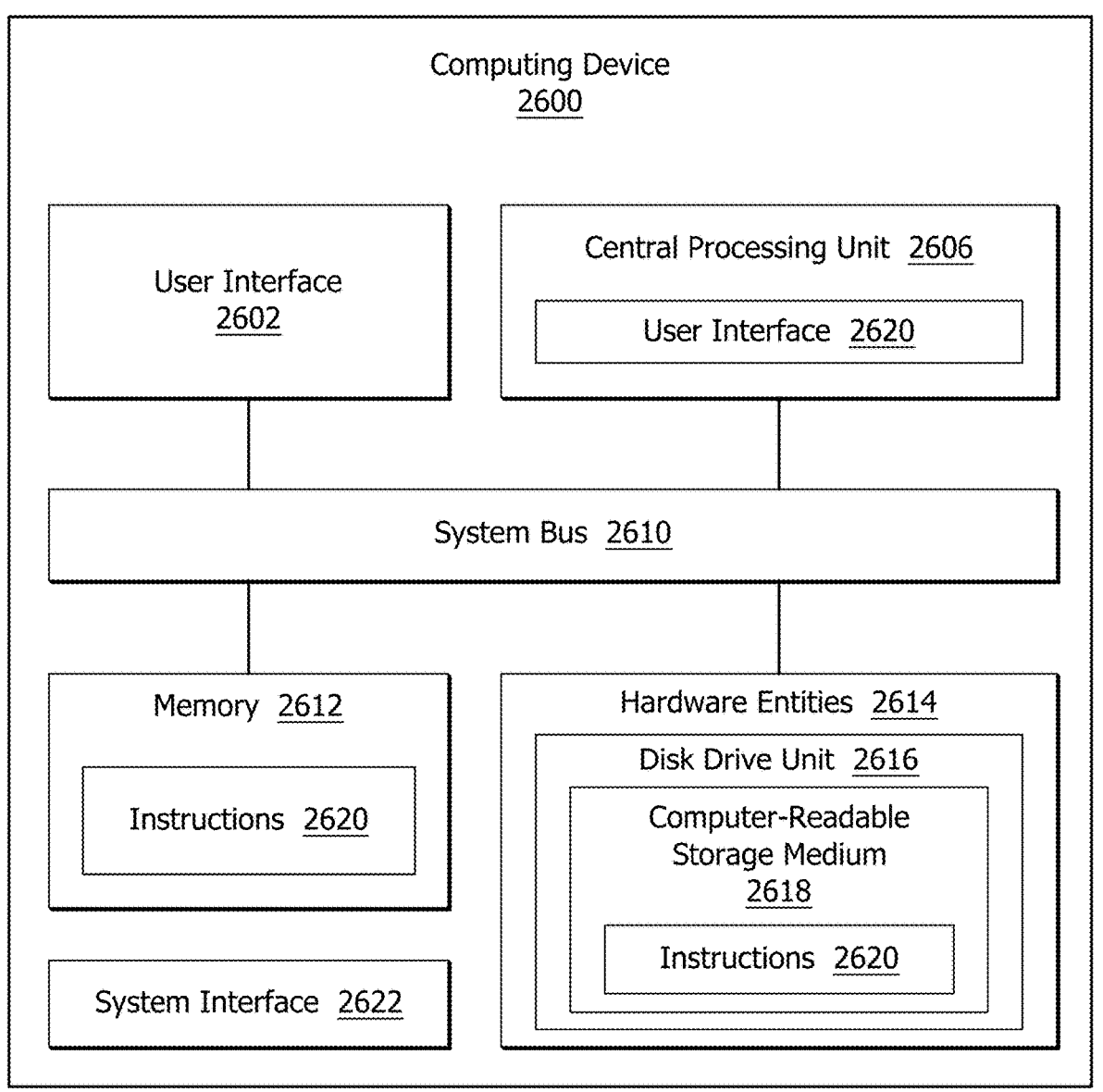
FIG. 26 provides a block diagram of a computing device.

FIG. 26 provides a block diagram of an illustrative embodiment of a computing device 2600. Modules 204-208 of FIG. 2 may be implemented in a computing device such as that shown in FIG. 26. Detectors 210₁, 210₂ of FIG. 2, detectors 2308, 2316 of FIGS. 23-24, mobile communication device(s) 2418, 2456 of FIG. 24, server(s) 2410 of FIG. 24, and/or vehicle on-board computing device 2520 of FIG. 25 can be the same as or similar to computing device 2600. As such, the discussion of computing device 2600 is sufficient for understanding each of the listed devices.

Computing device 2600 can include, but is not limited to, a notebook, a desktop computer, a laptop computer, a personal digital assistant, and a tablet PC. Some or all the components of the computing device 2600 can be implemented as hardware, software and/or a combination of hardware and software. The hardware includes, but is not limited to, one or more electronic circuits.

Computing device 2600 may include more or less components than those shown in FIG. 26. However, the components shown are sufficient to disclose an illustrative embodiment implementing the present invention. The hardware architecture of FIG. 26 represents one embodiment of a representative computing device configured to facilitate control of traffic flow along arterials in an efficient manner. As such, the computing device 2600 of FIG. 26 implements improved methods for controlling traffic flow along arterials in accordance with embodiments of the present solution.

As shown in FIG. 26, computing device 2600 includes a system interface 2622, a user interface 2602, a central processing unit (CPU) 2606, a system bus 2610, a memory 2612 connected to and accessible by other portions of computing device 2600 through system bus 2610, and hardware entities 2614 connected to the system bus 2610. At least some of the hardware entities 2614 perform actions involving access to and use of memory 2612, which can be a random access memory (RAM), a disk driver and/or a compact disc read-only memory (CD-ROM).

System interface 2622 allows the computing device 2600 to communicate directly or indirectly with external communication devices. If the computing device 2600 is communicating indirectly with the external communication device, then the computing device 2600 is sending and receiving communications through a common network (e.g., the Internet or Intranet).

Hardware entities 2614 can include a disk drive unit 2616 comprising a computer-readable storage medium 2618 on which is stored one or more sets of instructions 2620 (e.g., software code) configured to implement one or more of the methodologies, procedures, or functions described herein. The instructions 2620 can also reside, completely or at least partially, within the memory 2612 and/or within the CPU 2606 during execution thereof by the computing device 2600. The memory 2612 and the CPU 2606 also can constitute machine-readable media. The term "machine-readable media", as used here, refers to a single medium or multiple media (e.g., a centralized or distributed database, and/or associated caches and servers) that store the one or more sets of instructions 2620. The term "machine-readable media", as used here, also refers to any medium that is capable of storing, encoding, or carrying a set of instructions 2620 for execution by the computing device 2600 and that cause the computing device 2600 to perform any one or more of the methodologies of the present disclosure.

FIG. 27 provides a flow diagram of an illustrative method 2700 for controlling the speed of a vehicle (e.g., vehicle 2302 of FIGS. 23-24). This speed control may be dynamically performed, selectively performed, semi-autonomously performed, and/or autonomously performed. Method 2700 begins with 2702 and continues to block 2704 where a vehicle is controlled to travel over a terrain (e.g., terrain 2350 of FIG. 23). While the vehicle travels over the terrain, operations of blocks 2706-2720 are performed to determine a desired speed that ensures stopping of the vehicle is avoided or minimized. The operations of blocks 2706-2720 may be performed, for example, by a dynamic queue length prediction module (e.g., module 206 of FIG. 2) and/or a distributed queue-aware eco-approach module (e.g., module 208 of FIG. 2). These modules may be implemented in hardware and/or software of a mobile device (e.g., mobile communication device 2418 or 2456 of FIG. 24).

Block 2706 involves obtaining, by a mobile device (e.g., mobile communication device 2418 or 2456 of FIG. 24), detected traffic volume and vehicle speed(s) for the past N minutes from a cloud-based system (e.g., system 2460 of FIG. 24). N is any number greater than zero. For example, N is selected to be five in some applications. The traffic volume and vehicle speeds may be detected by a first detector (e.g., detector 2312 of FIG. 23) located at or in proximity to an upstream intersection (e.g., intersection 2350 of FIG. 23). The traffic volume comprises the number of vehicles passing a point on the terrain or road (e.g., road 2352 of FIG. 23) at a specific time. The vehicle speeds comprises the speeds of vehicles passing the point on the terrain or road at a specific time.

Block 2708 involves obtaining, by the mobile device, signal phase and timing (SPaT) data (e.g., SPAT data 224 of FIG. 2) for at least the next two cycles from the cloud-based system. SPAT data is well known. Any known or to-be-known SPAT data can be used here.

Block 2710 involves estimating, by the mobile device, the number of vehicles in a queue at a downstream intersection (e.g., intersection 2308 of FIG. 23) based on the detected traffic volume and vehicle speeds received in block 2706. The manner in which this estimation is made will be discussed in detail below.

Block 2712 involves performing operations by sensors of the mobile device to sense the velocity and location of the vehicle. The mobile device can include, but is not limited to, an accelerometer that can be used to sense the velocity of the mobile device while the mobile device is located in, on or otherwise proximate to the vehicle. This sensed velocity is considered by the mobile device to be the velocity of the vehicle. The mobile device can also include, but is not limited to, a GPS device configured to generate GPS coordinates specifying the location of the mobile device while the mobile device located in, on or otherwise proximate to the vehicle. The GPS coordinates are considered by the mobile device to be the sensed location of the vehicle.

Block 2714 involves computing, by the mobile device, a distance to the downstream intersection from the sensed location of the vehicle. A map of the terrain may be used to determine this distance. The map may include information specifying the geographic location(s) of intersection(s). The geographic location(s) can be expressed, for example, in GPS coordinates. Look-up table(s) (LUT(s)) may alternatively or additionally be used to determine this distance. Any known or to-be-known technique may be used here to determine a distance between two known geographic locations.

Block 2716 involves optionally obtaining, by the mobile device, speed limits associated with roads along which the vehicle travels to reach the downstream intersection. The speed limits may be obtained from the cloud-based system.

Block 2718 involves obtaining, by the mobile device, a current time. The current time can be obtained from an internal or external clock on the mobile device.

Block 2720 involves generating, by the mobile device, a desired speed for the vehicle based on the information obtained and/or generated in blocks 2706-2718. The manner in which the desired speed is generated will be discussed in detail below.

Once the desired speed is generated, method 2700 continues to block 2722 where the desired speed is output from the mobile device. The desired speed may be output visually on a display screen, output auditorily from a speaker, and/or output tactically via a vibrator or other means. The desired speed may also be communicated from the mobile device to the vehicle's on-board computing device (e.g., vehicle on-board computing device 2520 of FIG. 25) in block 2724. The desired speed may optionally be output visually, auditorily and/or tactically from the vehicle's on-board computing device as shown by block 2726. Next, method 2700 continues to block 2728 of FIG. 27B.

Figure 27B:
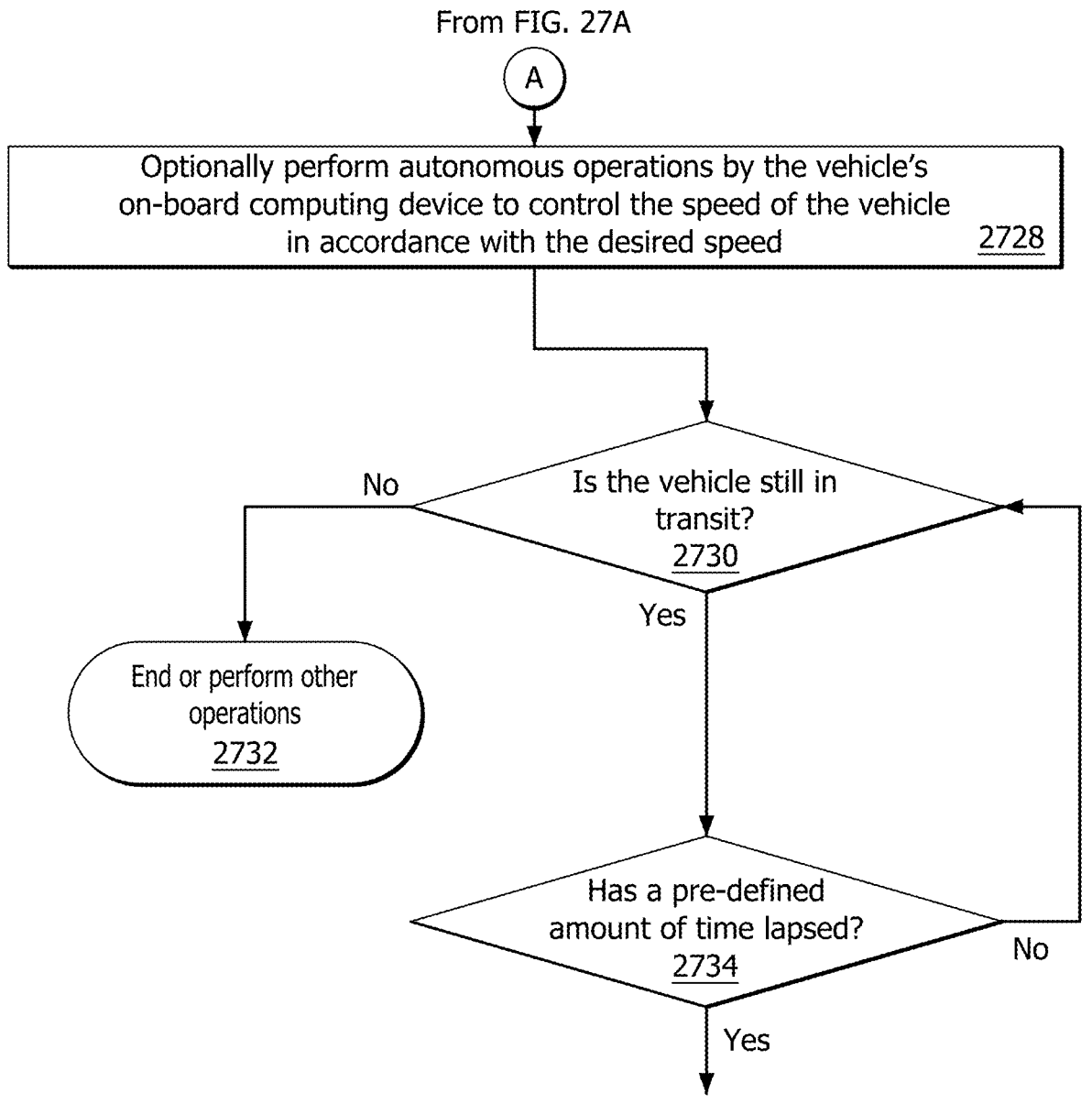

As shown in FIG. 27B, block 2728 involves optionally performing autonomous operations by the vehicle's on-board computing device to control the speed of the vehicle in accordance with the desired speed. The vehicle's on-board computing device may generate and send a command signal to a speed controller (e.g., speed controller 2528 of FIG. 28) to reduce or increase the speed of the vehicle. Any known or to-be-known technique for reducing or increasing a vehicle's speed can be used here.

Next in block 2730, the mobile device detects whether the vehicle is still in transit. Motion sensor(s) and/or location sensor(s) of the mobile device can be used to detect the motion of the mobile device which is considered as an indication of vehicle motion. For example, GPS coordinates may be obtained at two consecutive times. The mobile device may conclude that the vehicle is still in transit when two or more sets of GPS coordinates indicate that the geographic location of the mobile device has changed. The present solution is not limited to the particulars of this example. If not [2732:NO], then method 2700 continues to block 2732 where it ends or other operations are performed (e.g., return to block 2702 of FIG. 27A).

If so [2732:YES], then method 2700 continues to block 2734 where the mobile device determines whether a pre-determined or pre-specified amount of time has elapsed. If not [2734:NO], then method 2700 returns to block 2730. Otherwise [2734:YES], method 2700 returns to block 2706 of FIG. 27A.

Dynamic Queue Length Prediction or Estimation of the Number of Vehicles in a Queue The following operations may be performed in block 206 of FIG. 2 and/or block 2710 of FIG. 27.

Figure 28:
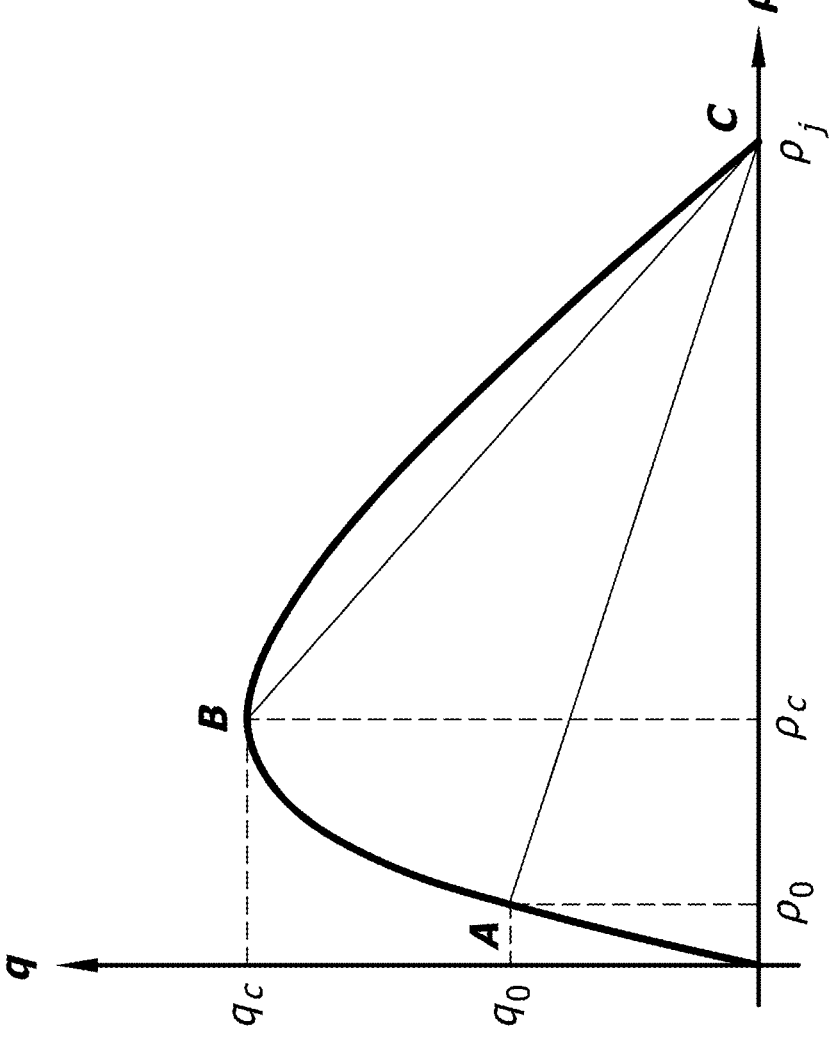
FIG. 28 provides a graph showing a relationship between traffic density and flow.

Lighthill-Whitham-Richards (LWR) Shockwave Theory: An LWR shockwave model may be used to predict the queue length based on real-world data. The real-world data may be obtained from GRIDSMART camera-based detectors. The LWR shockwave model may be expressed by the following mathematical equation (13).

$$\frac{\partial \rho(s, t)}{\partial t} + \frac{\partial q(s, t)}{\partial s} = 0 \tag{13}$$

where $\rho(s, t)$ and $q(s, t)$ represent the traffic density and flow, respectively, at location s and time t. Traffic density is measured as the number of vehicles per mile per lane, and flow is measured as the number of vehicles per hour per lane. This model, also called the fundamental diagram, illustrates the relationship between flow and density (FIG. 28). In general, traffic flow is a concave function of traffic density.

Figure 29:
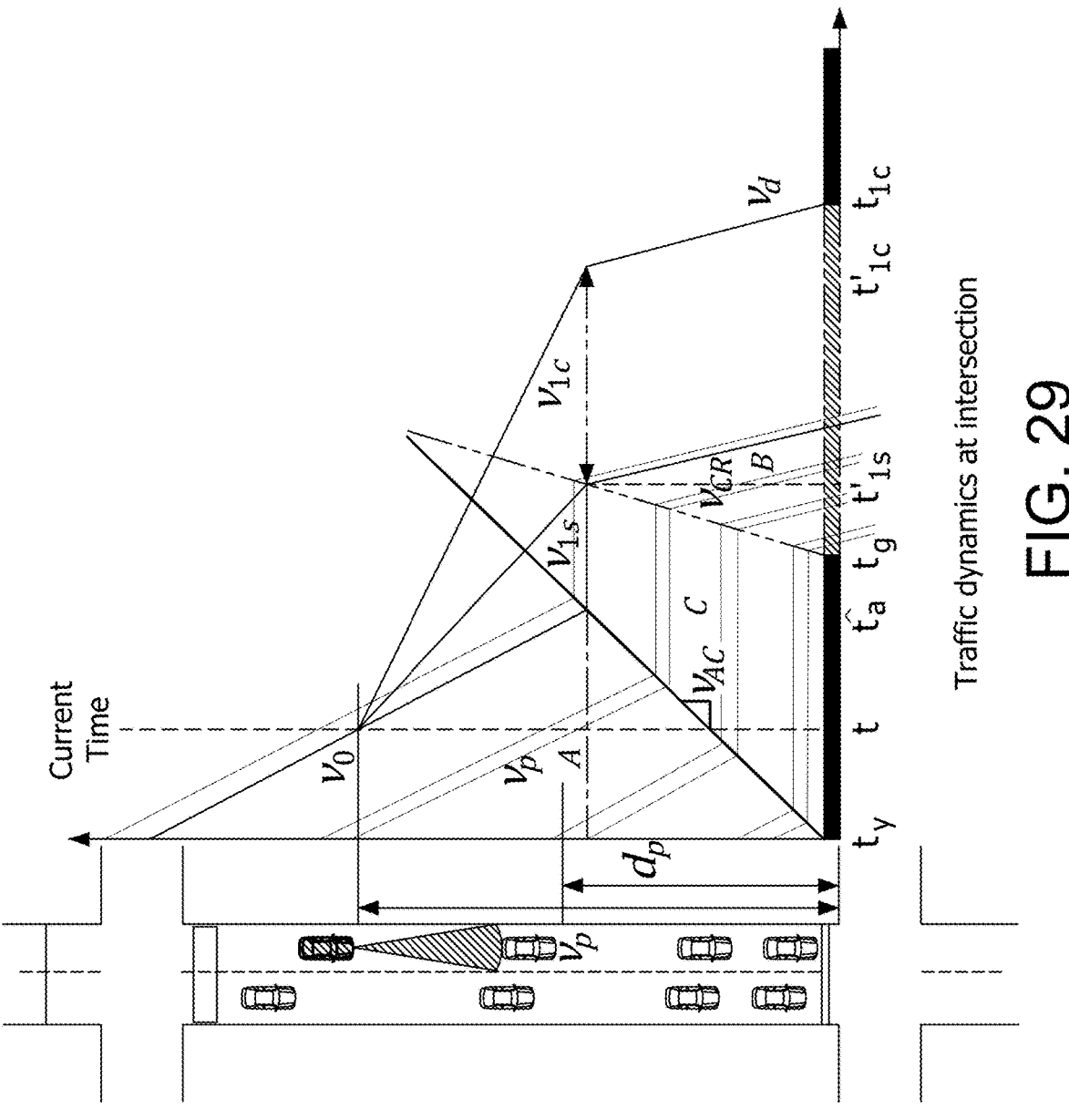
FIG. 29 provides an illustration showing traffic dynamics at an intersection.

FIG. 29 illustrates a group of vehicles approaching and departing an intersection. The upstream vehicles enter the intersection at traffic state A ($\rho_0$, $q_0$), as shown in FIG. 28. Once the signal turns red, all the approaching vehicles need to stop and wait for the green signal, resulting in the traffic state with the maximum traffic density at a flow rate of zero. This state corresponds to the traffic state C(0, $\rho_j$) in FIG. 28. The transition process from state A to state C generates a queuing shockwave that propagates backward. The queuing shockwave speed $v_{AC}$ can be estimated in accordance with the following mathematical equation (14).

$$v_{AC} = \frac{q_0}{\rho_0 - \rho_j} = \frac{q_0}{\frac{q_0}{v} - \rho_j} = \frac{1}{\frac{1}{v} - \frac{\rho_j}{q_0}}, \tag{14}$$

where $q_0$ is the flow rate of the upstream traffic, v is the average speed of the upstream vehicles, and $\rho_j$ is the maximum traffic density. For implementation, the real-world GRIDSMART data is available to provide minute-by-minute $q_0$ and for every outgoing intersection approach. An assumption may be made that the average headway distance between two consecutive stopped vehicles is twenty five feet, and therefore the maximum traffic density $\rho_j$ would be (5280 feet/mile)/25 feet≈211 vehicles per mile per lane.

After the signal turns green, all stopped vehicles start to discharge at the saturation flow rate ($q_c$), which corresponds to the transition from state C to state B. Therefore, the discharge shockwave speed $v_{CB}$ can be estimated as shown by the following mathematical equation (15).

$$v_{CB} = \frac{q_c}{\rho_c - \rho_j} \tag{15}$$

Considering the saturation flow rate ($q_c$) is quite stable, $v_{CB}$ was assumed to be a constant value in this study. Based on data collected from the real-world data calibrated VIS-SIM simulation, the average discharge shockwave speed $v_{CB}$ is set at 14 ft/s. The present solution is not limited in this regard. The average discharge shockwave speed $v_{CB}$ may be set to other values.

The vehicle in blue in FIG. 29 represents a CAV, whereas the others are human-driven vehicles (HDVs). The blue bar designates the location where upstream traffic conditions are measured, which emulates the detection zone of GRIDS-MART data. To predict the queue length ($d_0$) when the CAV arrives at the end of the queue at the intersection, an intersecting point of $v_0$ and $v_{AC}$ should be calculated. In this context, a relationship may be defined by the following mathematical equation (16).

$$\frac{d_0}{d - v_0(t_v - t) - d_0} = \frac{v_{AC}}{v_0} \tag{16}$$

Therefore, the predicted queue length do can be estimated by transforming the mathematical equation (16) as follows.

$$d_0 = \frac{v_{AC}}{v_0 + v_{AC}}(d - v_0(t_r - t)) \tag{17}$$

$$\forall\, t \in \left[t_r - \frac{d}{v_0}, t_g + \frac{v_{AC}(t_g - t_r)}{v_{CB} - v_{AC}} - \frac{d - \frac{v_{AC}v_{CB}(t_g - t_r)}{v_{CB} - v_{AC}}}{v_0}\right]. \tag{18}$$

Mathematical equation (17) works for the situation that is limited by mathematical equation (18). Otherwise, vehicles will arrive at the intersection during the green time, where the queue length will be zero.

Dynamic Adjustment Based on Forward Radar Sensor. The shockwave theory-based queue length prediction has several limitations: (1) it assumes the queuing shockwave speed ($v_{AC}$) is a fixed value until the CAV reaches the end of the queue; (2) it assumes a uniform vehicle arrival rate during the red duration; and (3) the estimation of $v_{AC}$ depends on the historical upstream traffic flow (e.g., aggregated at 5-min intervals), which cannot accurately represent the traffic flow between the CAV and the downstream intersection. These limitations may affect the accuracy of queue length prediction.

Adaptive cruise control technology has been widely deployed in recent production vehicles using a forward radar sensor. The radar sensor can detect the speed of the preceding vehicle (e.g., vehicle 2322 of FIG. 22) and detect a distance to the preceding vehicle within the radar detection range, which can be employed to adjust the queue length prediction under some conditions. An assumption is made that all CAVs have a front radar sensor that can detect the preceding vehicle's speed and distance in real time, as illustrated in FIG. 29.

Using the example of the detected preceding vehicle's speed and location as Up and $d_p$, the predicted queue length ($d'_0$) is adjusted according to the following mathematical expressions (19).

$$\tag{19}$$

$$d'_0 = \begin{cases} 0, \text{ if } (d \le 500 \text{ feet and } v_p \text{ is null}) \text{ or (signal is green and } v_p > 3.1) \\ d_p, \text{ if } v_p \le 3.1 \text{ and } v_p > 0 \\ \min(d - 500, d_0), \text{ if } d > 500 \text{ feet and } v_p \text{ is null} \\ d_0, \text{ otherwise} \end{cases}$$

where $v_p$ is null indicates no preceding vehicle is detected and do is the initially predicted queue length based on the LWR shockwave theory. The detection range of the radar sensor is assumed to be five hundred feet. Any vehicle traveling at less than 3.1 mph (5 kmh) is considered a stopped vehicle in the queue.

In view of the mathematical expression (19), the present solution involves selectively adjusting the predicted queue length based on range data generated by a radar (e.g., radar 2566 of FIG. 25) of the vehicle. The predicted queue length is not selectively adjusted when the range data indicates that a detected speed of a preceding vehicle (e.g., vehicle 2322 of FIG. 23) falls within a pre-specified range of speeds for stopped vehicles. The pre-specified range can include, but is not limited to, 0-3.1 miles per hour. The predicted queue length may be set to zero when (i) the range data indicates that a preceding vehicle has not been detected and the distance to the downstream intersection (e.g., distance 2324 of FIG. 23) is less than or equal to a detection range of the radar of the vehicle, or (ii) the traffic light (e.g., traffic light 2314) at the downstream intersection is green and the range data indicates that a preceding vehicle has been detected with a speed falling within a pre-specified range of speeds for stopped vehicles. The predicted queue length may be set to another previously predicted queue length (e.g., $d_0$ or d−500) when the distance to the downstream intersection (e.g., distance 2324 of FIG. 23) is greater than a detection range of the radar of the vehicle and the range data indicates that a preceding vehicle has not been detected.

Roadmanship-Aware Eco-Driving (RAED)

The following operations may be performed in block 208 of FIG. 2 and/or block 2720 of FIG. 27.

Vehicle Coasting Process: The tractive power $P_{trac}$ can be calculated using the following mathematical equation (20) based on the vehicle-specific mass and coast-down (A, B, C) parameters using second-by-second speed and acceleration.

$$P_{trac} = A \times v + B \times v^2 + C \times v^3 + M \times (a + g \times \sin\theta) \times v \tag{20}$$

where A is the rolling term, B is the rotating term, C is the drag term, M is the vehicle mass, g is the acceleration due to gravity, $\theta$ is the road grade, v is the vehicle speed in m/s, and a is the vehicle acceleration in m/s².

The tractive power $P_{trac}$ is zero when a vehicle is coasting. Therefore, for a vehicle traveling on a road with zero grade, the coasting deceleration rate is given by the following mathematical equation (21).

$$a_{coast} = d_v/d_t = -(A + B \times v + C \times v^2)/M \tag{21}$$

Figure 30:
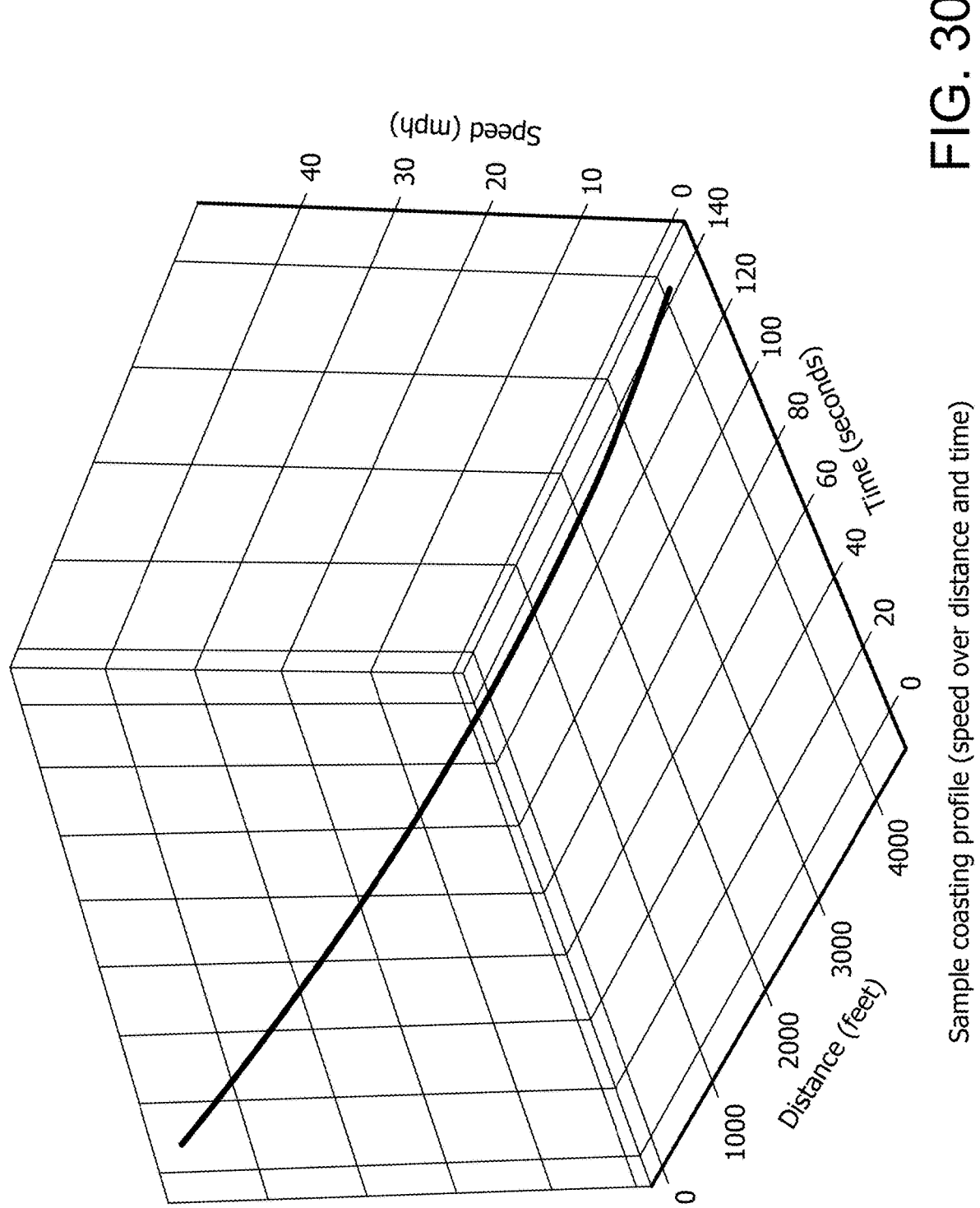
FIG. 30 provides a graph showing a sample coasting profile.

FIG. 30 shows a sample coasting profile from 50 mph to 0 mph, given a set value of A, B, C, M. The coasting distance $D_{coast}(v_1, v_2)$ that a vehicle could travel during the coasting period (i.e., from $[t_1, v_1]$ to $[t_2, v_2]$) can be calculated as shown by the following mathematical equation (22).

$$D_{coast(v_1,v_2)} = \int_{t_1}^{t_2} v\, dt = -\int_{v_1}^{v_2} \frac{Mv}{(A + B \times v + C \times v^2)}\, dv =$$

$$-\frac{M}{2C}\left(\int_{v_1}^{v_2} \frac{2Cv + B}{(A + B \times v + C \times v^2)}\, dv - \int_{v_1}^{v_2} \frac{B}{(A + B \times v + C \times v^2)}\, dv\right) = \frac{M}{2C}$$

$$\left(\ln(A + B \times v + C \times v^2)\Big|_{v_2}^{v_1} - \frac{B}{C\sqrt{\frac{A}{C} - \frac{B^2}{4C^2}}}\tan^{-1}\left(\frac{v + \frac{B}{2C}}{\sqrt{\frac{A}{C} - \frac{B^2}{4C^2}}}\right)\Big|_{v_2}^{v_1}\right) \tag{22}$$

On the other hand, the coasting time that a vehicle needs to coast from $v_1$ to $v_2$ can be calculated as shown by the following mathematical equation (23).

$$T_{coast(v_1,v_2)} = \int_{t_1}^{t_2} dt =$$

$$\int_{v_2}^{v_1} \frac{M}{(A + B \times v + C \times v^2)}\, dv = \frac{M}{C\sqrt{\frac{A}{C} - \frac{B^2}{4C^2}}}\tan^{-1}\left(\frac{v + \frac{B}{2C}}{\sqrt{\frac{A}{C} - \frac{B^2}{4C^2}}}\right)\Big|_{v_2}^{v_1} \tag{23}$$

Figure 31:
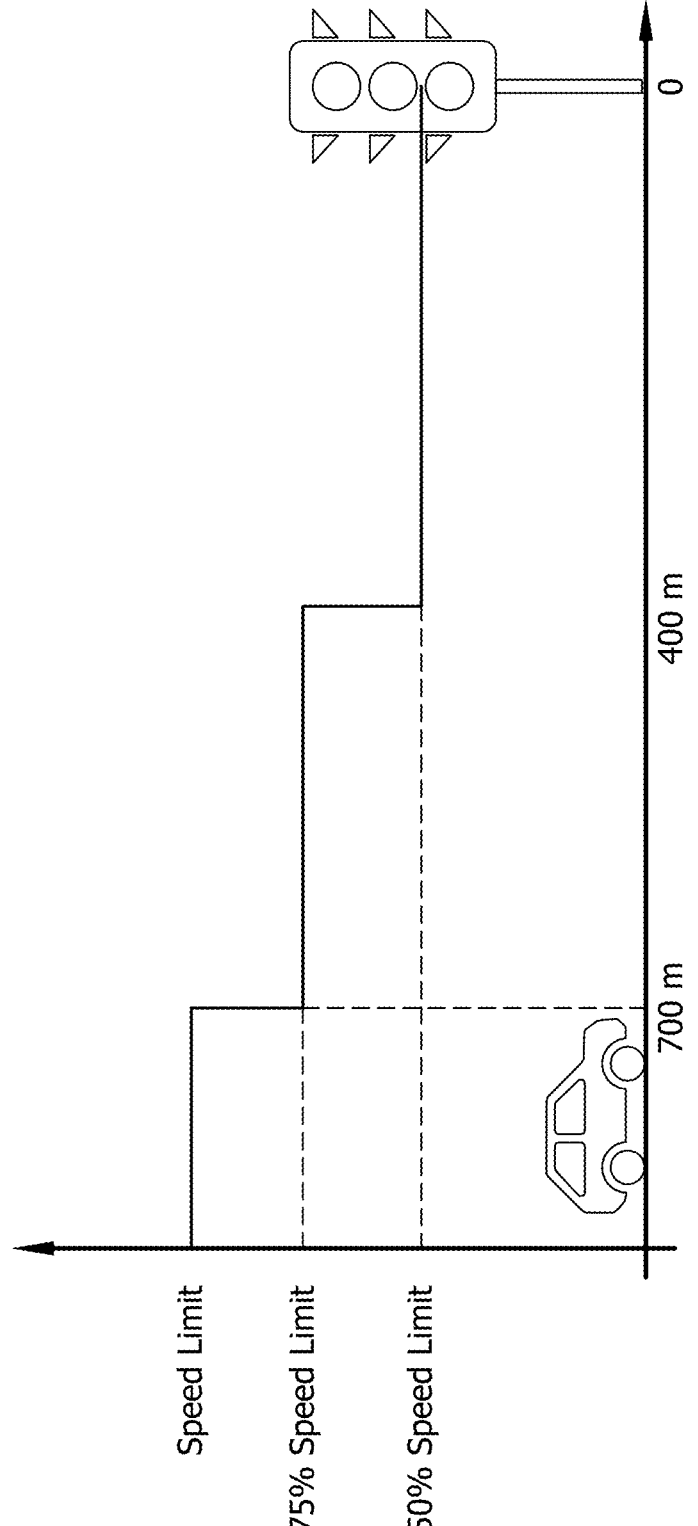
FIG. 31 provides an illustration showing a simple roadmanship strategy.

Roadmanship in Eco-Driving: A CAV driving at speed much lower than the speed limit may affect HDVs' operation in the vicinity of the CAV (i.e., undesirable roadmanship), are generally justified when studies show that slow-moving vehicles on any part of a highway consistently impede the normal and reasonable movement of traffic to such an extent that they contribute to unnecessary lane changing or passing maneuvers." FIG. 31 illustrates the distance-based minimum control speed implemented in this study. Specifically, the minimum control speed is divided into three stages: (1) when the CAV is more than 700 m away from the downstream stop bar, the CAV may be controlled as if there is no traffic light; (2) when the distance to the stop bar is between 400 m and 700 m, the minimum control speed may be set to be 75% of the original speed limit; and (3) when the distance to the stop bar is within 400 m, we set the minimum control speed at 50% of the original speed limit. For the third stage, however, one exception is applied to the minimum control speed: if the CAV is coasting, the algorithm will allow it to coast below the minimum speed limit.

Hierarchical Velocity Planning: The proposed velocity planning strategy is a two-step process, as follows: (1) The acceptable range for the target velocities is determined by considering the vehicle's distance to the stop bar, the SPAT information for two downstream intersections, and the real-time predicted queue profile. (2) An optimized velocity profile is calculated based on the proposed heuristic coasting-oriented velocity planning algorithm.

Figure 32:
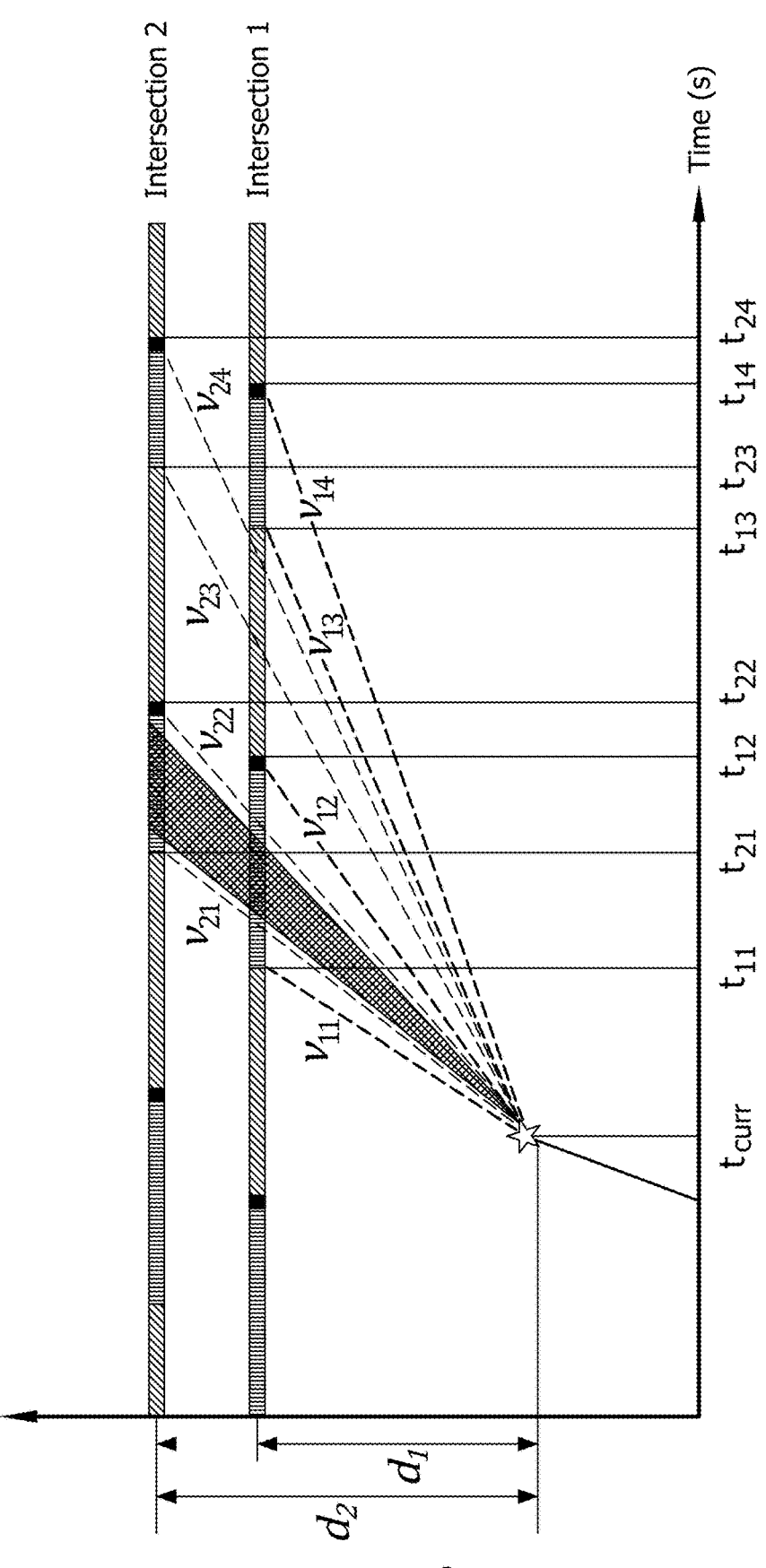
FIG. 32 provides a space-time diagram for a feasible target velocity.

Determination of the Range of Target Velocities: As the bilinear signal optimization algorithm is updated cycle by cycle, the confirmed SPAT information for every intersection is available only for the current cycle, and the SPAT information or the subsequent cycle is based on SPaT prediction. Because SPAT prediction will introduce a certain level of uncertainty, further downstream intersections tend to have a higher uncertainty in the SPaT information. Therefore, only two downstream intersections are considered for velocity optimization in this study (FIG. 32). Note, however, that the algorithm is reevaluated continually, and after a vehicle passes the first intersection, the algorithm considers the next two intersections. In most cases, considering the next two intersections provides a sufficient prediction for developing an efficient target speed profile, and a longer range would not result in additional improvements.

The feasible target velocities C (the shaded green triangle area in FIG. 33) for the two downstream intersections during two upcoming cycles are computed as shown by the following mathematical equations (24)-(28).

$$C_{11} = \left[\frac{d_1}{t_{12} - t_{curr}}, \frac{d_1}{t_{11} - t_{curr}}\right] \cap [v_{min}, v_{max}] \tag{24}$$

$$C_{12} = \left[\frac{d_1}{t_{14} - t_{curr}}, \frac{d_1}{t_{13} - t_{curr}}\right] \cap [v_{min}, v_{max}] \tag{25}$$

$$C_{21} = \left[\frac{d_2}{t_{22} - t_{curr}}, \frac{d_2}{t_{21} - t_{curr}}\right] \cap [v_{min}, v_{max}] \tag{26}$$

$$C_{22} = \left[\frac{d_2}{t_{24} - t_{curr}}, \frac{d_2}{t_{23} - t_{curr}}\right] \cap [v_{min}, v_{max}] \tag{27}$$

$$C = \begin{cases} (C_{11} \cap C_{21}) \cup (C_{11} \cap C_{22}), & \text{if } (C_{11} \cap C_{21}) \cup (C_{11} \cap C_{22}) \text{ is not empty} \\ C_{11}, & \text{else if } C_{11} \text{ is not empty} \\ C_{12} \cap C_{22}, & \text{else if } C_{12} \cap C_{22} \text{ is not empty} \\ C_{12}, & \text{otherwise} \end{cases} \tag{28}$$

especially for those HDVs that are following the ego-CAV. To alleviate such situations, a simple distance-based minimum control speed may be implemented as a constraint to regulate the optimized speed profile. As defined by the Federal Highway Administration, "Minimum speed limits where $d_1$ and $d_2$ represent the distance to the first and second downstream intersections, respectively. $t_1=[t_1, t_{12}, t_{13}, t_{14}]$ and $t_2=[t_{21}, t_{22}, t_{23}, t_{24}]$ represent the next two green windows for the two downstream intersections, respectively. It is worth noting that the dynamic queue length prediction is only implemented for the first downstream intersection, where the $d_1$ and $t_1$ consider the queue accumulating and discharging process. Also in the equations, $t_{curr}$ indicates the current time. $v_{max}$ is the speed limit, 40 mph. In addition, $C_{11}$ and $C_{12}$ define the lower and upper limits, respectively, of feasible target velocity for the CAV to go through the first downstream intersection during the upcoming two green windows. Similarly, $C_{21}$ and $C_{22}$ define the lower and upper limits, respectively, of feasible target velocity for the CAV to go through the second downstream intersection during the green window. And finally, $C=[v_{min\_desire}, v_{max\_desire}]$ is the range of the determined target velocities, which will be an input for the following piecewise velocity algorithm.

Heuristic Coasting-Oriented Piecewise Velocity Planning: FIG. 33 illustrates a method 3300 implementing detailed control logic in a coasting-oriented piecewise velocity planning algorithm. At every timestep (i.e., 1 second), the algorithm requires the input of the current vehicle status ($t_{curr}$, $v_{curr}$, $D_{curr}$, $v_{OrgDesSpeed}$), the traffic flow status (Q), and the determined range of target velocities $C=[v_{min\_desire}, v_{max\_desire}]$. The initial desired speed for the ego vehicle, $v_{OrgDesSpeed}$, is assumed to be a vehicle-specific fixed value while the ego vehicle is traveling through the corridor. In the VISSIM simulation, the value of $v_{OrgDesSpeed}$ is determined at the time the vehicle enters the network by drawing a value from the predefined speed distribution. If the $v_{OrgDesSpeed}$ is within C, which means the ego vehicle is expected to go through the downstream signal light during green without any intervention, the algorithm takes $v_{OrgDesSpeed}$ as the target speed and controls the vehicle as if there is no traffic light using the intelligent driver model, which is defined as mode=IDM. Otherwise, the algorithm will determine the control mode (i.e., cruising, coasting, braking, or accelerating) based on the consideration of four different cases. The four different cases will be discussed in detail below in relation to FIG. 34.

Method 3300 begins with block 3302 and continues with block 3304 where the system detects that a vehicle (e.g., vehicle 2302 of FIGS. 23-24) is approaching an intersection (e.g., intersection 2308 of FIG. 23). This detection may be made using sensor data, location data (e.g., GPS data), and/or map data. Any known or to-be-known technique for detecting when an object is approaching another thing can be used here.

Next, method 3300 continues with a plurality of decisions to facilitate the selection of one of the following pre-defined modes of operation: intelligent driver mode; cruising mode; coasting mode; or braking mode. In block 3306, the system determines whether the vehicle's distance to the end of a predicted queue ($D_{curr}$–Q) is greater than seven hundred meters. If so [3306:YES], the system selects the IDM mode as shown by block 3308. Otherwise [3306:NO], the system determines whether the vehicle's distance to the end of a predicted queue ($D_{curr}$–Q) is greater than four hundred meters and less than or equal to seven hundred meters. If not [3310:NO], then method 3300 continues to block 3332 of FIG. 33C (which will be discussed below). If so [3310: YES], then method 3300 continues to block 3312.

In block 3312, the system determines whether the initial desired speed for the ego vehicle, $v_{OrgDesSpeed}$, is within the determined range of target velocities C (i.e., [$v_{min\_desire}$, $v_{max\_desire}$]). If so [3312:YES], then the system selects IDM as shown by block 3308. If not [3312:NO], then method 3300 continues to block 3314.

In block 3314, the system determines whether the vehicle's current velocity $v_{curr}$ is greater than the determined maximum desired velocity $v_{max\_desire}$. If not [3314:NO], method 3300 continues to block 3340 of FIG. 33C (which will be discussed below). Otherwise [3314:YES], method 3300 continues to block 3316.

In block 3316, the system determines whether the vehicle's current velocity $v_{curr}$ is greater than seventy-five percent of the speed limit. If not [3316:NO], then IDM is selected as shown by block 3308. Otherwise [3316:YES], then method 3300 continues to block 3318 where the system finds a solution for case 1. The manner in which this solution is found will be discussed below. Thereafter, method 3300 continues to block 3320 of FIG. 33B.

Figure 33A:
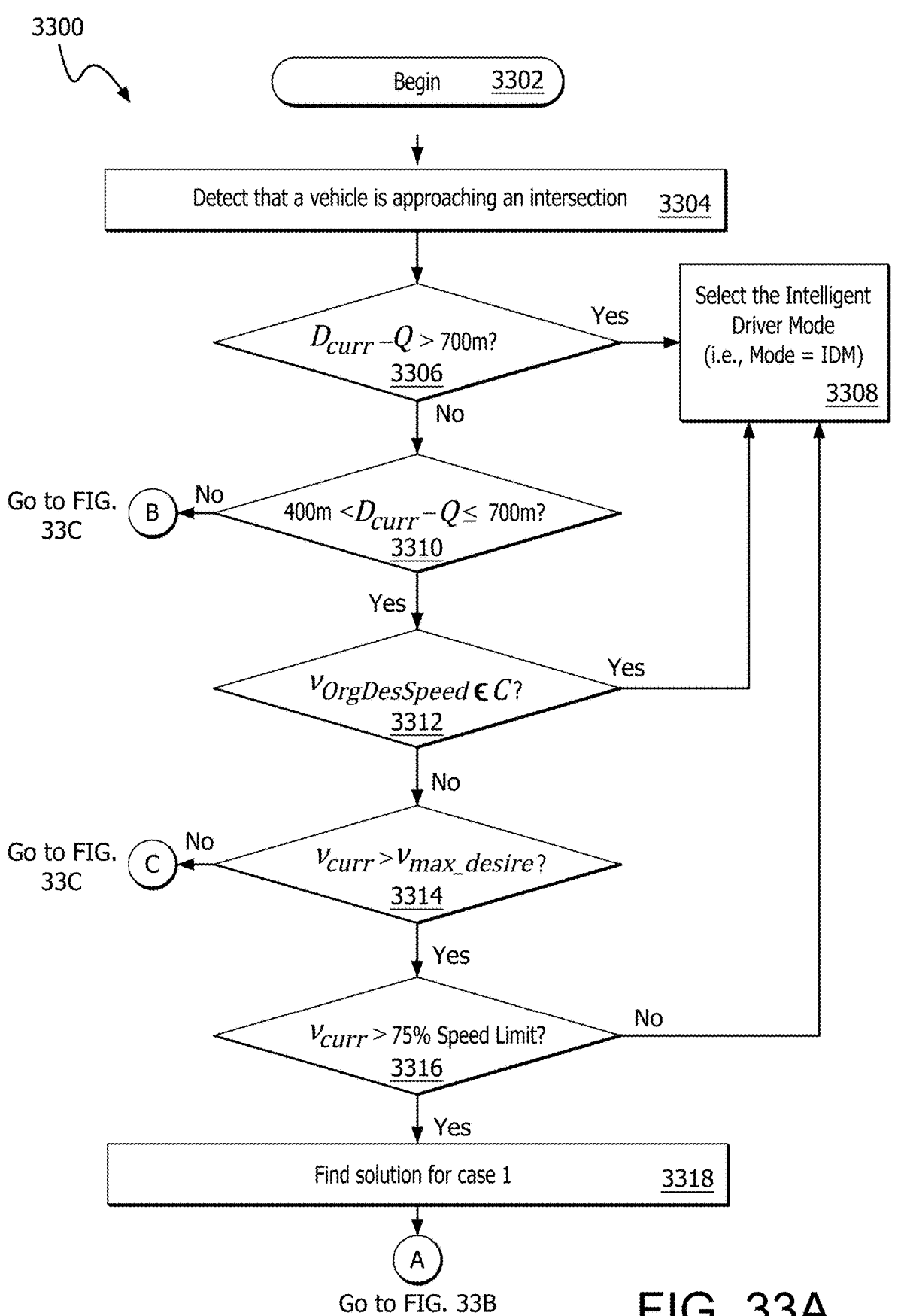
FIGS. 33A-33D (collectively referred to as "FIG. 33") provides a flow diagram of an illustrative method for determine an operational mode for a vehicle.
Figure 33B:
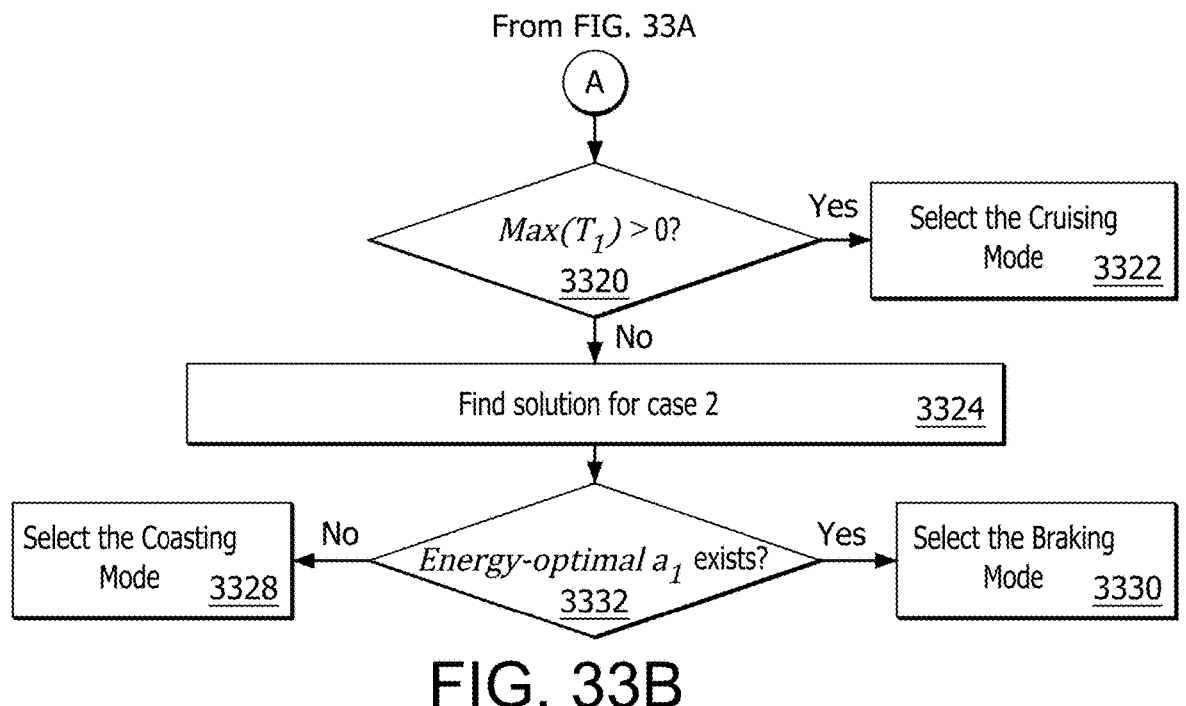

As shown in FIG. 33B, block 3320 involves determining whether a maximum time window $Max(T_1)$ is greater than zero. $T_1$ represents the assumed cruising time. If so [3320: YES], then the cruising mode is selected as shown by block 3322. Otherwise [3320:NO], the system finds a solution for case 2. The manner in which this solution is found will be discussed below. Thereafter, method 3300 continues to block 3326 where the system determines whether an energy-optimal braking deceleration $a_1$ exists. If not [3326:NO], then the coasting mode is selected as shown by block 3328. If so [3328:YES], then the braking mode is selected.

Figure 33C:
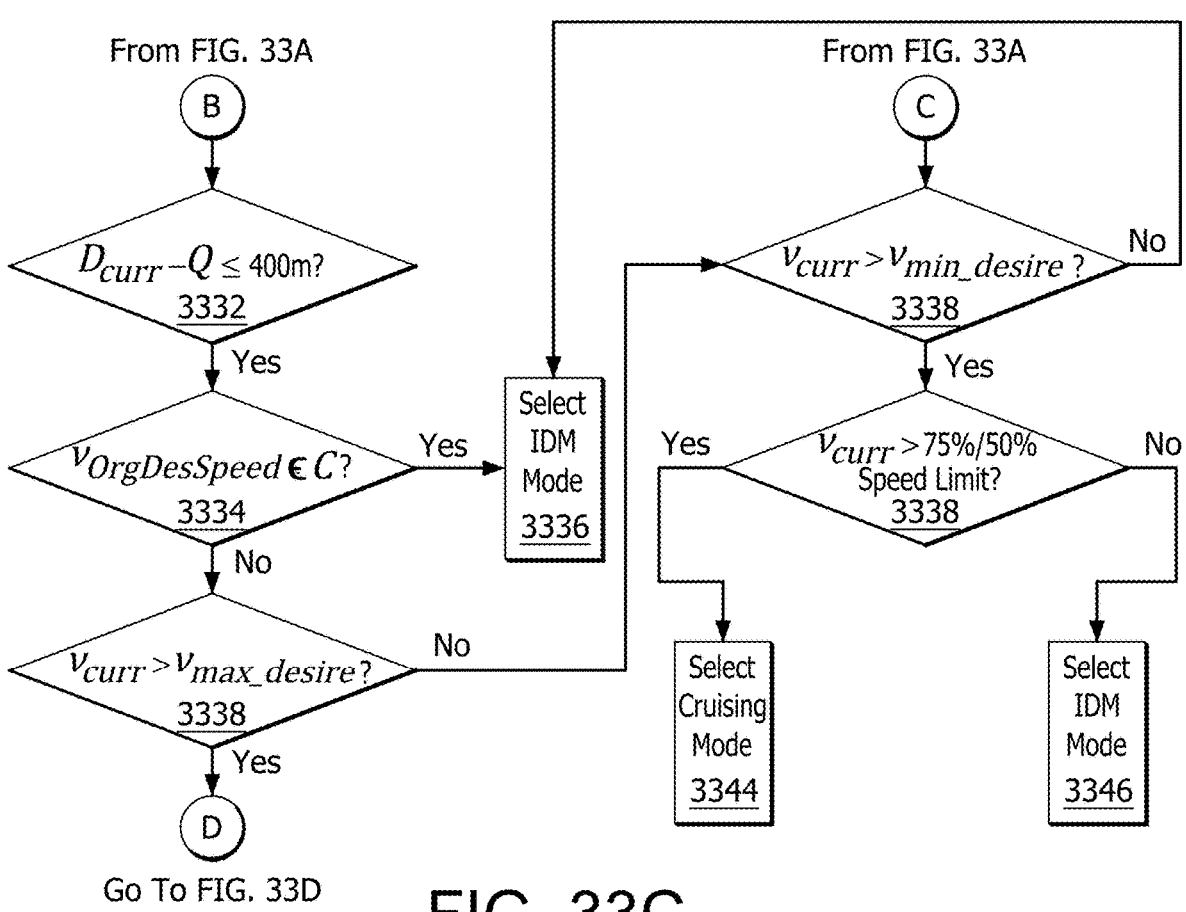

Referring now to FIG. 33C, method 3300 continues to block 3332 when the vehicle's distance to the end of a predicted queue ($D_{curr}$–Q) is not with the range of four hundred meters to seven hundred meters. In block 3332, the system determines whether the vehicle's distance to the end of a predicted queue ($D_{curr}$–Q) is less than or equal to four hundred meters. If so [3332:YES], then the system determines whether the initial desired speed for the ego vehicle, $v_{OrgDesSpeed}$, is within the determined range of target velocities C (i.e., [$v_{min\_desire}$, $v_{max\_desire}$]). If so [3334:YES], then IDM is selected. If no [3334:NO], then the system determines whether the vehicle's current velocity $v_{curr}$ is greater than a maximum desired velocity $v_{max\_desire}$. If so [3338: YES], then method 3300 continues to block 3348 of FIG. 33D. If not [3338:NO], then the system determines whether the vehicle's current velocity $v_{curr}$ is greater than a minimum desired velocity $v_{min\_desire}$. If not [3340:NO], then IDM is selected. If so [3340:YES], then the system determines whether the vehicle's current speed is greater than 1.5 times (75%/50%) the speed limit. If so [3342:YES], the cruising mode is selected. If not [3342:NO], then IDM is selected.

Figure 33D:
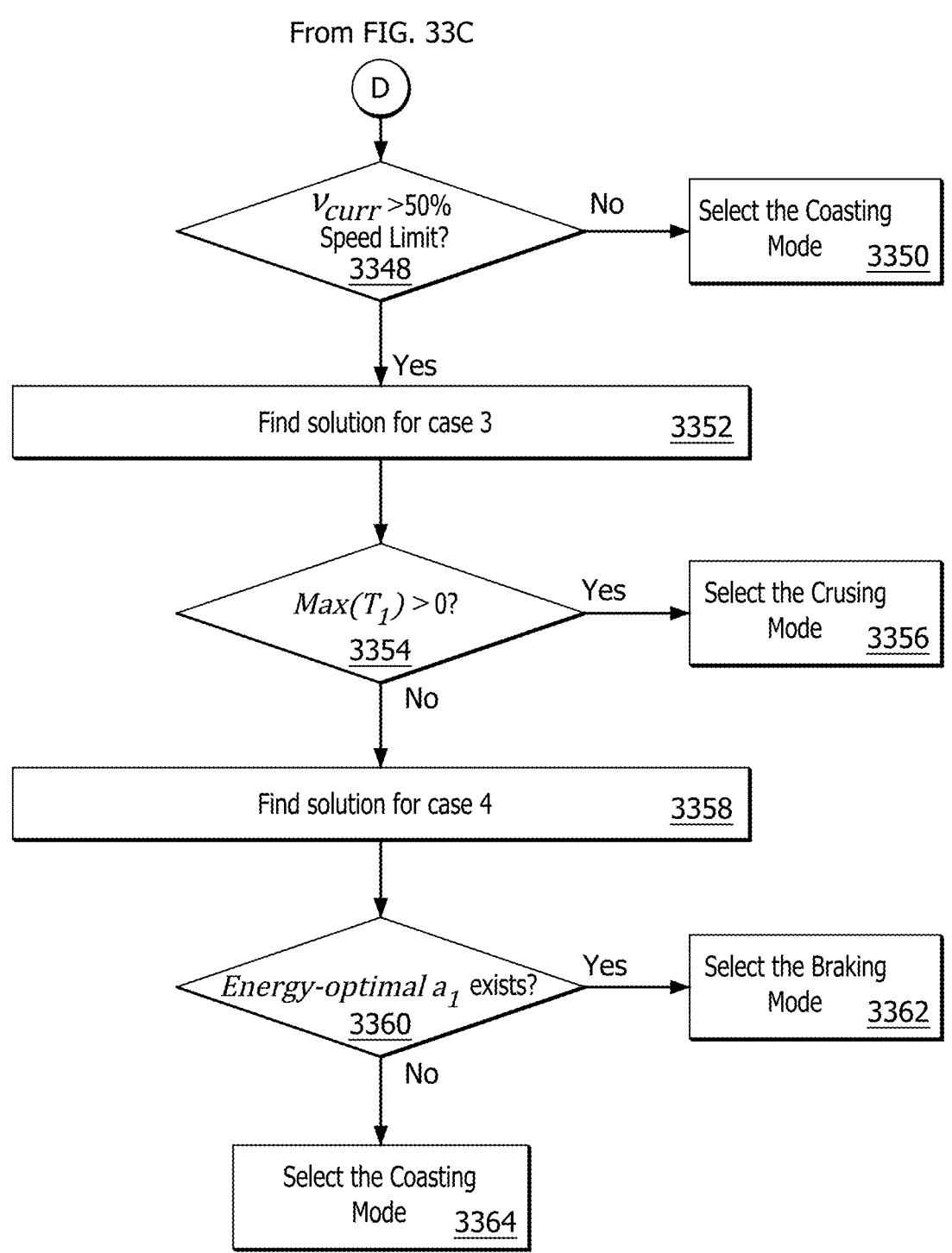
Figure 34A:
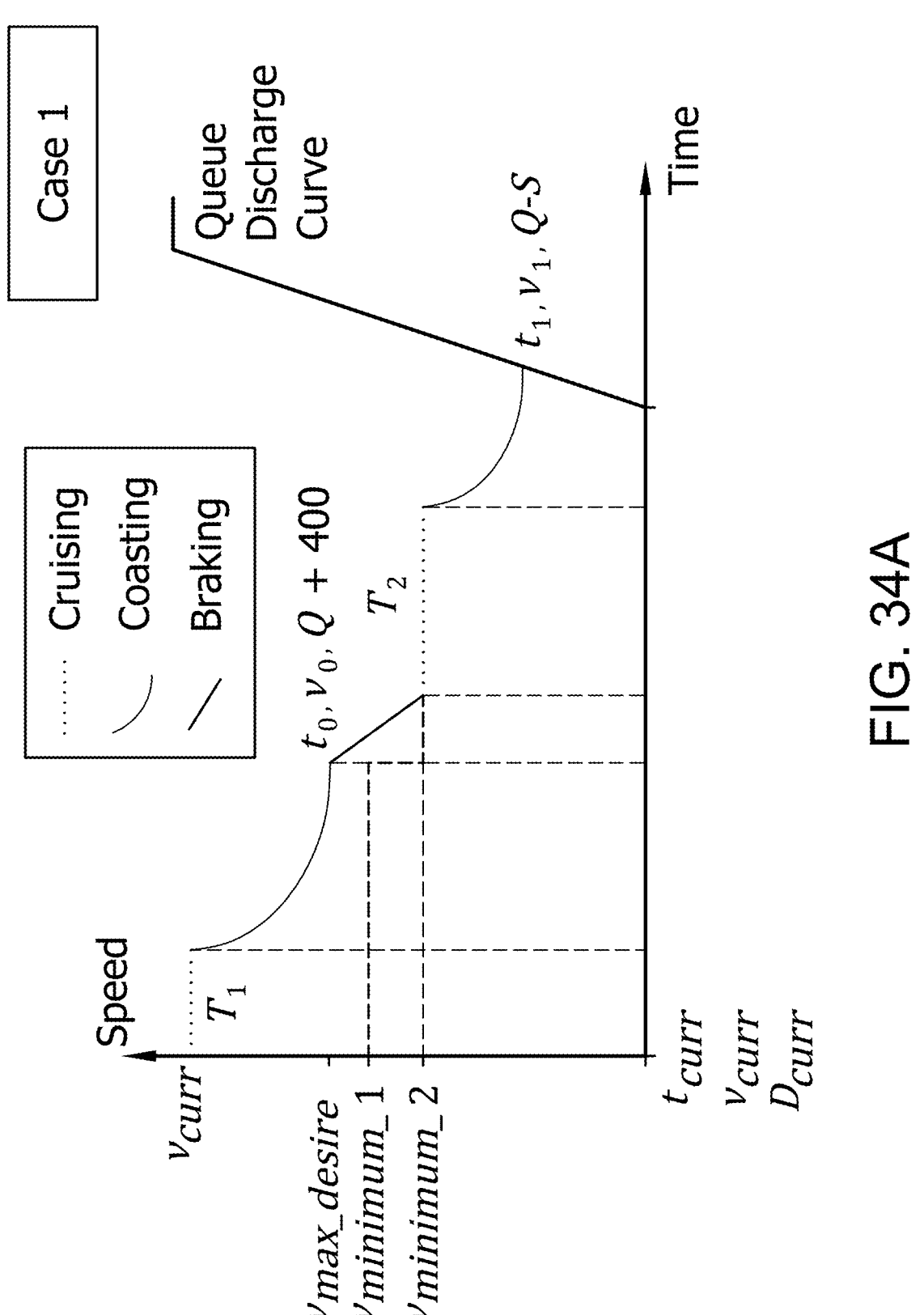
FIGS. 34A-34D (collectively referred to as "FIG. 34") provides an illustration showing four velocity planning cases.
Figure 34B:
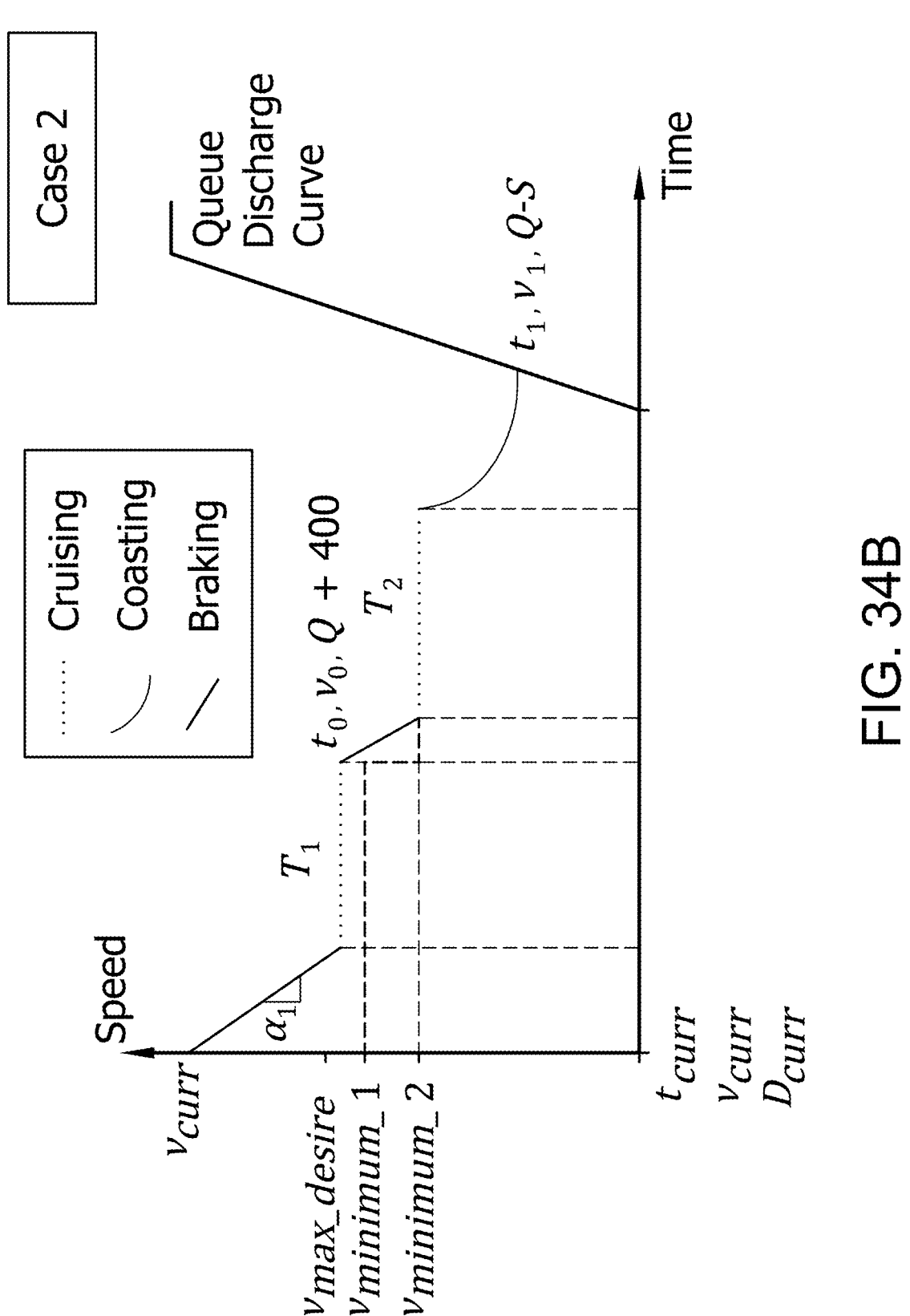
Figure 34C:
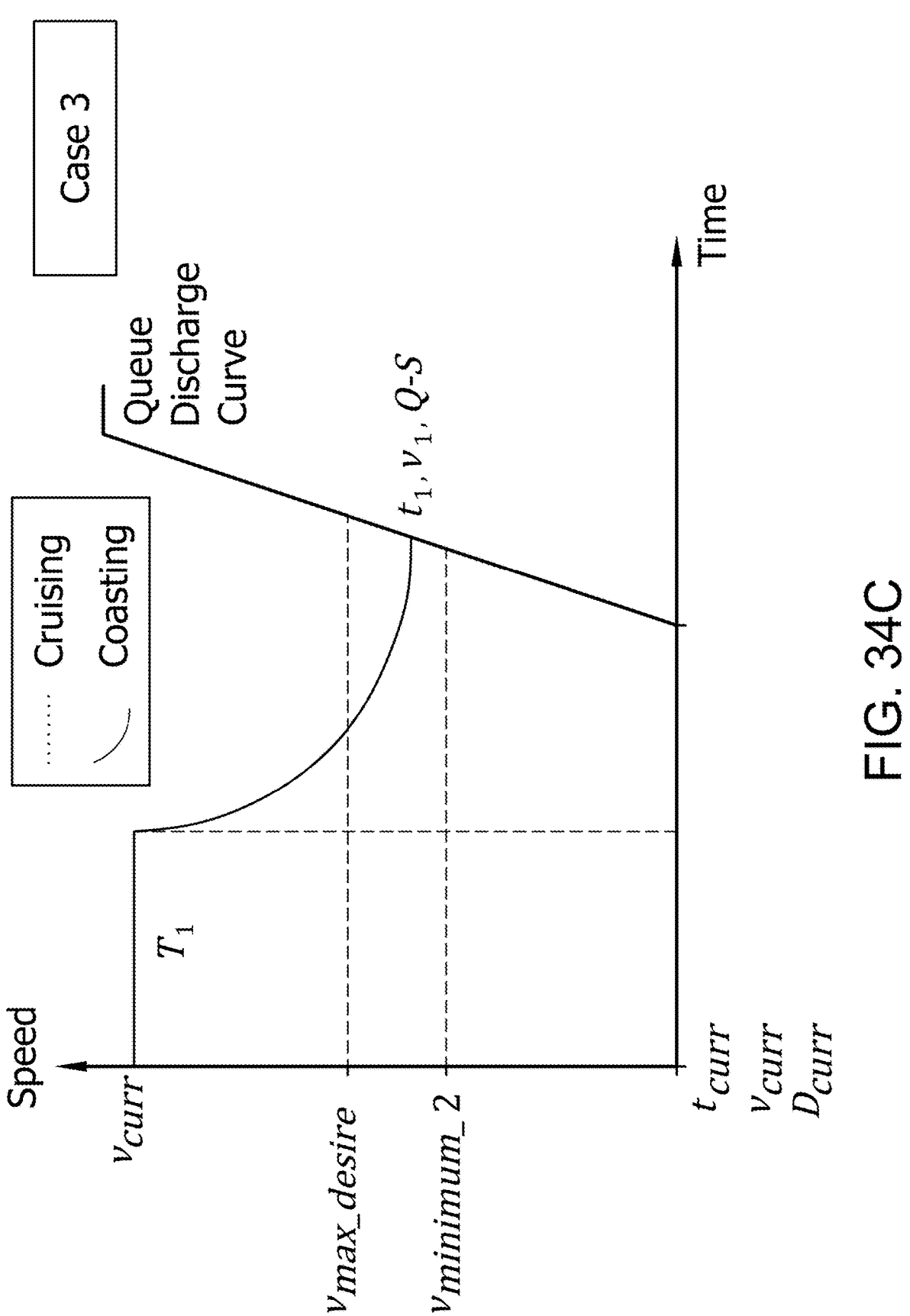
Figure 34D:
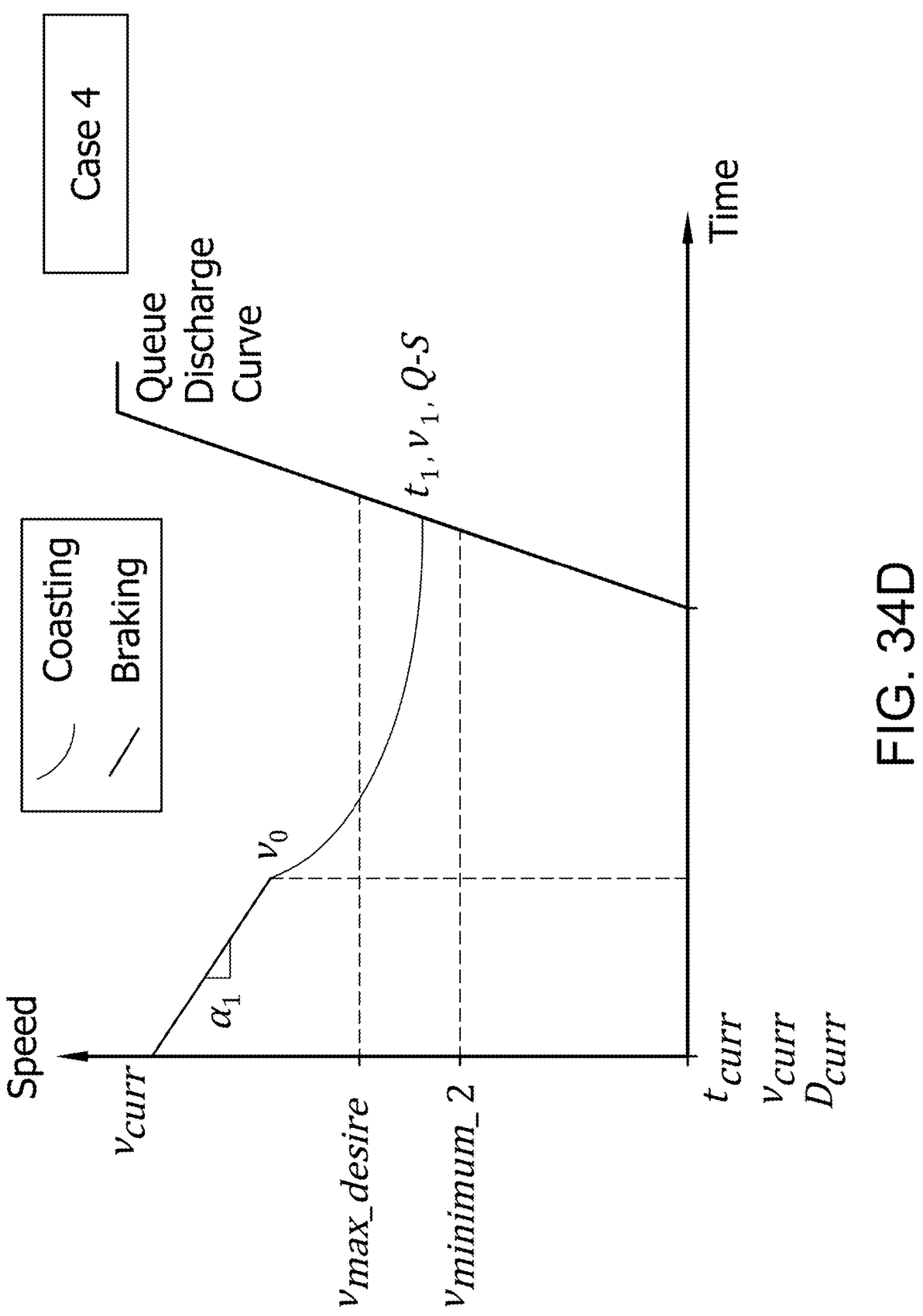

Referring now to FIG. 33D, method 3300 continues to block 3348 when the vehicle's current velocity $v_{curr}$ is greater than the maximum desired velocity $v_{max\_desire}$. In block 3348, the system determines whether the vehicle's current velocity $v_{curr}$ is greater than fifty percent of the speed limit. If not [3348:NO], the coasting mode is selected. If so [3348:YES], the system finds a solution for case 3 as shown by block 3352. The manner in which this solution is found will be discussed below.

Thereafter, the system determines whether a maximum time window $Max(T_1)$ is greater than zero. $T_1$ represents the assumed cruising time. If so [3354:YES], the cruising mode is selected. If not [3354:NO], then the system finds a solution for case 4 as shown by block 3358. The manner in which this solution is found will be discussed below. Next in block 3360, the system determines whether an energy-optimal braking deceleration $a_1$ exists. If so [3360:YES], the breaking mode is selected. If not [3360:NO], the coasting mode is selected.

In view of FIG. 33, the system selects the different modes as follows. The IDM mode is selected when: (i) the vehicle's distance to an end of a predicted queue ($D_{curr}$–Q) is greater than seven hundred meters; (ii) the initial desired speed for the vehicle $v_{OrgDesSpeed}$ is within the determined range of target velocities C (i.e., [$v_{min\_desire}$, $v_{max\_desire}$]); or (iii) the vehicle's current velocity $v_{curr}$ is greater than 75% of a speed limit. The cruising mode is selected when: (i) a maximum time window Max($T_1$) is greater than zero. The coasting mode is selected when: (i) an energy-optimal braking deceleration $a_1$ does not exist; and (ii) the vehicle's current velocity $v_{curr}$ is greater than 50% of a speed limit. The breaking mode is selected when an energy-optimal braking deceleration a exists.

As shown in FIG. 2, the desired velocity(ies) $v_{desire}$, $v_{min\_desire}$, $v_{max\_desire}$ and the selected mode are provided to the vehicle such that driving operations of the vehicle are controlled in accordance therewith. The vehicle's driving operations can be controlled to adjust the vehicle's speed in accordance with the received information. For example, the vehicle's speed may be reduced to the desired velocity $v_{desire}$ or $v_{min\_desire}$ via breaking when the selected mode is a braking mode. The vehicle's speed may be reduced to the desired velocity $v_{desire}$ or $v_{min\_desire}$ via coasting when the selected mode is a coasting mode. The vehicle's speed may be increased to a value less than maximum desired velocity $v_{max\_desire}$ via acceleration when the selected mode is intelligent driving mode or the cruising mode. The present solution is not limited to the particulars of this example.

FIG. 34 presents four detailed velocity planning cases. Case 1 and 2 are considered when the ego vehicle's distance to the end of the predicted queue ($D_{curr}$–Q) is between 400 meters and 700 meters. Case 1 aims to determine whether the ego vehicle can cruise or coast from the current location ($D_{curr}$) to the location 400 meters upstream of the predicted queue end (Q+400), given that the vehicle is going to travel at the minimum allowable velocity profile within 400 meters of the end of the queue. Case 2 is considered when Case 1 has no feasible solution, an indication that the ego vehicle must brake. Case 2 aims to generate the energy-optimal braking deceleration a1, given the assumed profile. Cases 3 and 4 are considered when the ego vehicle's distance to the end of the predicted queue ($D_{curr}$–Q) is within 400 m. Case 3 aims to determine whether the ego vehicle can cruise and/or coast, given the distance constraint (i.e., the ego vehicle's trajectory should meet with the queue-end vehicle's trajectory). Case 4 is considered when Case 3 has no feasible solution, which means that the ego vehicle must brake to some extent; therefore, Case 4 attempts to generate the energy-optimal braking deceleration a1.

The algorithm aims to get a piecewise energy-optimal speed profile by minimizing the total energy consumption, which follows:

$$\text{Minimize } J = \int_{t_{curr}}^{T_1} \left( Av_t + Bv_t^2 + Cv_t^3 + Ma_t v_t \right) dt + \frac{1}{2} M \left( v_{curr}^2 - v_1^2 \right) \quad (29)$$

Mathematical equation (29) is subject to safety and comfort constraints as follows.

$$v_t \le -b\Delta t + \sqrt{2b(s - s_0) + v_t^2 + (b\Delta t)^2} \quad (30)$$

$$|\dot{a}_t| \le 2 \text{ m/s}^3 \quad (31)$$

where b is the comfort deceleration, $\Delta t$ is the reaction time, s is the gap with the leading vehicle, $s_0$ is the minimum gap distance, and $v_1$ is the speed of the leading vehicle.
Details of the Piecewise Velocity Planning Cases Case 1 (cruising or coasting, 400<$D_{curr}$–Q≤700): There are four unknown variables in this case: $T_1$, $T_2$, $v_0$, and $v_1$. Subject to:

$$T_1 \ge 0 \quad (32)$$

$$T_2 \ge 0 \quad (33)$$

$$v_{minimum\_1} \le v_0 \le v_{curr} \quad (34)$$

$$0 \le v_1 \le \min (v_{minimum\_2}, v_{max\_desire}) \quad (35)$$

$$v_{min\_desire} \le \frac{D_{curr} - Q + \dfrac{v_1^2}{2 * a_{comfort}}}{t_2 - t_{curr}} \le v_{max\_desire} \quad (36)$$

$$v_{curr} * T_1 + D_{coast(v_{curr}, v0)} = D_{curr} - Q - 400 \quad (37)$$

$$\frac{v_0^2 v_{minimum\_2}^2}{2 * a_{max\_decel}} + v_{minimum\_2} * T_2 + D_{coast(v_{minimum\_2}, v_1)} = 400 + \frac{v_1^2}{2 * a_{comfort}} \quad (38)$$

Case 2 (braking, 400<$D_{curr}$–Q≤700): There are five unknown variables in this case: $T_1$, $T_2$, $a_1$, $v_0$, and $v_1$. Subject to:

$$T_1 \ge 0 \quad (39)$$

$$T_2 \ge 0 \quad (40)$$

$$a_1 \le a_{max\_decel} \quad (41)$$

$$0 \le v_1 \le \min (v_{minimum\_2}, v_{max\_desire}) \quad (42)$$

$$v_{minimum\_1} \le v_0 \le v_{curr} \quad (43)$$

$$v_{min\_desire} \le \frac{D_{curr} - Q + \dfrac{v_1^2}{2 * a_{comfort}}}{t_2 - t_{curr}} \le v_{max\_desire} \quad (44)$$

$$\frac{v_{curr}^2 - v_0^2}{2 * a_1} + v_0 * T_1 = D_{curr} - Q - 400 \quad (45)$$

$$\frac{v_0^2 v_{minimum\_2}^2}{2 * a_{max\_decel}} + v_{minimum\_2} * T_2 + D_{coast(v_{minimum\_2}, v_1)} = 400 + \frac{v_1^2}{2 * a_{comfort}} \quad (46)$$

Case 3 (cruising or coasting, $D_{curr}$–Q≤400): There are two unknown variables in this case—$T_1$ and $v_1$. Subject to:

$$T_1 \ge 0 \quad (47)$$

$$0 \le v_1 \le v_{max\_desire}) \quad (48)$$

$$v_{min\_desire} \le \frac{D_{curr} - Q + \dfrac{v_1^2}{2 * a_{comfort}}}{t_2 - t_{curr}} \le v_{max\_desire} \quad (49)$$

$$D_{curr} - Q + \frac{v_1^2}{2 * a_{comfort}} = v_{curr} * T_1 + D_{coast(v_{curr}, v_1)} \quad (50)$$

Case 4 (braking, $D_{curr}$–Q≤400): There are three unknown variables in this case-$a_1$, $v_0$, and $v_1$. Subject to:

$$v_{minimum\_2} \le v_0 \le v_{curr} \quad (51)$$

$$0 \le v_1 \le \min (v_0, v_{max\_desire}) \quad (52)$$

$$a_1 \le a_{max\_decel} \quad (53)$$

-continued $$v_{min\_desire} \le \frac{D_{curr} - Q + \frac{v_1^2}{2*a_{comfort}}}{t_1 - t_{curr}} \le v_{max\_desire} \quad (54)$$

$$D_{curr} - Q + \frac{v_1^2}{2*a_{comfort}} = \frac{v_{curr}^2 - v_0^2}{2*a_1} + D_{coast(v_0,v_1)} \quad (55)$$

Tractive Energy Evaluation (Simulation)

The tractive energy $E_{trac}$ can be calculated by integrating the tractive power for periods when the tractive power is greater than zero, as expressed in the following mathematical equation (56).

$$E_{trac,drive} = \int_{t,P_{trac}>0}^{T} P_{trac}\, dt \quad (56)$$

One of the critical technologies in EVs is regenerative braking, which can recapture the energy lost during braking. Regenerative braking can increase the range of an EV by 8%-25%. In the energy evaluation of simulation, a coefficient n is assumed to be the efficiency of regenerative braking. The regenerative energy Eregen could be estimated using the following mathematical equation (57).

$$E_{regen} = \int_{t,P_{trac}<0}^{T} \eta \times P_{trac}\, dt \quad (57)$$

Considering that different drive scenarios may have different driving speeds at the origin and destination, an adjusted tractive energy $E_{trac,adj}$ is calculated to account for differences in vehicle entry and exit speeds between the vehicle and baseline scenarios. The driving tractive energy is adjusted by the difference in kinetic energy $E_{kinetic}$ from the beginning and end of the drive cycle, as shown in the following equation. This gives a tractive energy that is referenced to constant start and stop speeds, which may be used as a metric for the energy assessments.

$$E_{trac,adj} = E_{trac,drive} + E_{regen} + \frac{1}{2} \times M \times \left(v_{origin}^2 - v_{destination}^2\right) \quad (58)$$

Figure 35:
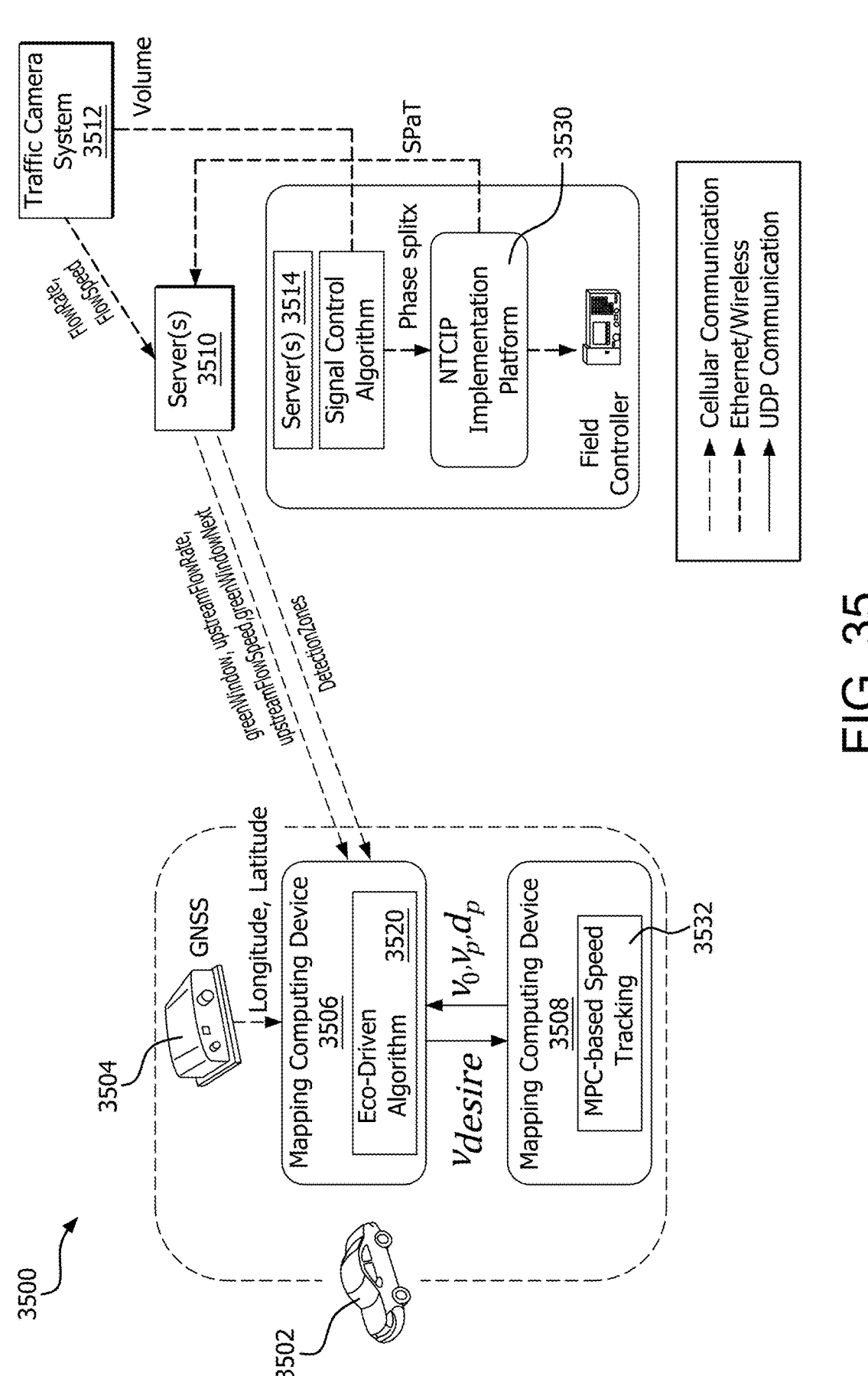
FIG. 35 provides an illustration of a system implementing the present solution.

FIG. 35 provides an illustration showing another system 3500 implementing the present solution. System 3500 may be part of the system discussed above or another system. System 3500 comprises vehicle(s) 3502, a GNSS 3504, a mapping computing device 3506, a host computing device 3508, a traffic camera system 3512, and servers 3510, 3514. The traffic camera system 3512 can include, but is not limited to, the GRIDSMART traffic camera system. Server (s) 3510, 3514 may be the same as or different than computing device 2600 of FIG. 26.

To demonstrate the feasibility of the proposed integrated control system in real-world conditions, a series of experimental tests were conducted on Shallowford Road, Chattanooga, Tennessee, with all components integrated, as shown in FIG. 35. The left side of FIG. 35 illustrates the main components in the vehicle, which include (1) the GNSS 3504 localization suite; (2) the mapping computing device 3506 that is configured to handle the localization process, communicate with server(s) 3514 to receive SPaT and traffic flow data, and execute the eco-driving algorithm 3520 to generate energy-optimal desired speed; and (3) the host computing device 3508 that is responsible for the data communication with vehicle's Controller Area Network (CAN bus), executing the vehicle's low-level speed tracking controller, and controlling the vehicle longitudinally through dSPACE MicroAutoBox II. The right side of the figure presents the infrastructure-related components, which include: (1) server(s) 2510 (e.g., a cloud server or web server) that is configured to collect SPaT and traffic flow data; (2) the traffic camera system 3512 comprising cameras and/or other sensors that are configured to detect the upstream traffic flow rate and flow speed; and (3) server(s) 3512 that are connected with the local signal controllers through a virtual machine. In some scenarios, the virtual machine is managed by the City of Chattanooga. The virtual machine may be responsible for controlling the field signal controllers and parsing the real-time NTCIP data and sending the decoded SPaT data to the server(s) 2510.

Figure 36:
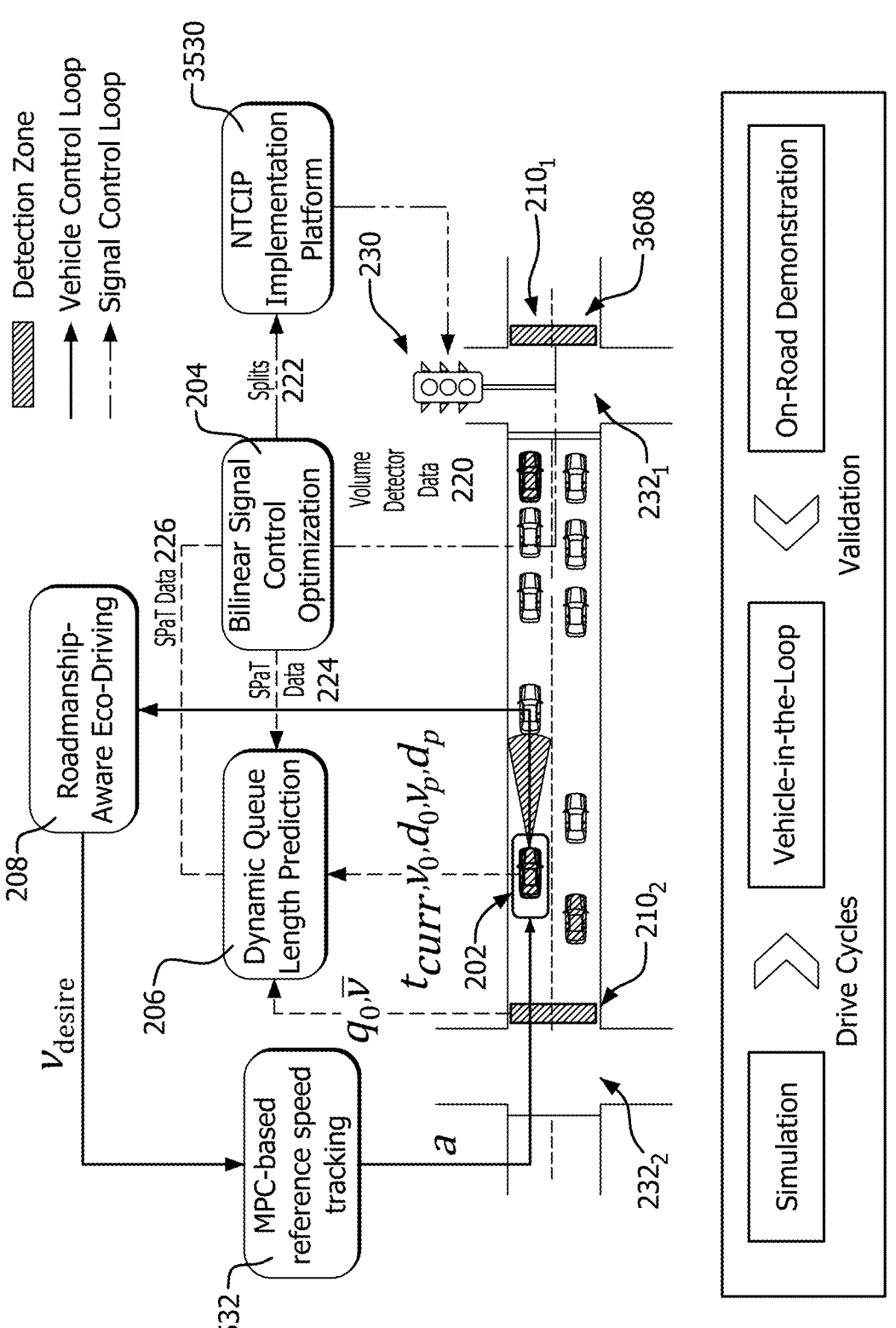
FIG. 36 provides an illustration showing an overview of an integrated traffic signal and vehicle control system.

It should be noted that FIG. 36 includes another block 3532 in which operations are performed for vehicle speed tracking. These operations may be performed by a vehicle on-board computing device (e.g., vehicle on-board computing device 2520 of FIG. 25).

FIG. 36 provides an illustration showing an overview of an integrated traffic signal and vehicle speed control system 3600. System 3600 is similar to system 200 shown in FIG. 2. The same reference numbers are used in FIG. 36 in relation to components of system 200 which are common. The above discussion is sufficient for understanding the common components. The common components include modules 204, 206, 208. However, module 208 will now be discussed in more detail.

System 3600 consists includes a traffic signal control algorithm, a dynamic queue length prediction algorithm, vehicle on-board control algorithms (e.g., distributed road-manship-aware eco-driving algorithm and model predictive control (MPC) based reference speed tracking algorithm, and a real-time mobility control and communication system (RTMCS). The traffic signal control algorithm outputs SPaT data 222 either to a simulated traffic system or a real-world traffic system via the National Transportation Communications for Intelligent Transportation System Protocol (NTCIP) implementation platform 3530.

In the on-road demonstration, the traffic and SPaT information of the real-world transportation system is obtained from the traffic camera system 3512 (e.g., GRIDSMART) and server(s) 3514 of signal controllers. Server(s) 3510 enable real-time communication between autonomous vehicles (AVs) and the transportation infrastructure. When a traffic signal changes, the AV control actions will also change to respond to the changes of the traffic signals. The change in the AV control actions will affect the downstream traffic condition, which might lead to adjustments in the next cycle of the downstream signal timings. This real-time interaction allows dynamically updating of both traffic control signals and AV control actions to adapt to the traffic conditions.

To address these challenges, a Dynamic Arrival Time Estimation (DATE) approximation method is used to infer a precise timing of vehicle arrivals at a target intersection $232_1$. An illustration is provided in FIG. 37 that is useful for understanding the DATE approximation method.

Although queues may extend upstream, it is often difficult for them to reach the outgoing detector $210_2$ of the upstream intersection $232_2$. Therefore, the activation time recorded by the outgoing detector $210_2$ at the upstream intersection $232_2$ is considered as a reliable indicator of vehicle departure.

This activation time is synchronized with the signal phase at the target intersection $232_1$ to distinguish whether the vehicle 3702 has started its journey on a green signal (SOG) or on a red signal (SOR). An estimated travel time $t_{est}$ is calculated by considering (i) the vehicle travel speed Vout detected by the outgoing detector $210_2$ and (ii) the distance $d_{out2stop}$ between the outgoing detector $210_2$ and a stop bar detector $210_1$. The estimated travel time $t_{est}$ may be defined by the following mathematical equation (59).

$$t_{est} = d_{out2stop}/v_{out} \qquad (59)$$

The estimated travel time $t_{est}$ is then added to the departure time recorded by the outgoing detector $210_2$, providing the system with the estimated arrival time for the vehicle 3702 at the target intersection $232_1$. By comparing the estimated travel time $t_{est}$ to the remaining duration of the green light phase of the target intersection $232_1$ and direction, the system can determine whether the vehicle 3702 will reach the target intersection $232_1$ during the green or red light. This methodology allows the system to overcome the limitations of direct stop bar detection in heavy traffic conditions and provides a more comprehensive understanding of traffic flow, enabling a detailed assessment of signal control strategies.

Predictive Bilinear Control for Traffic Signals

An urban traffic signal control problem aims at calculating optimal traffic signal timings cycle by cycle to reduce traffic delays. A bilinear signal control is extended to a predictive bilinear control that can compute the signal timings for the next few cycles. An objective function in predictive bilinear control is modified from minimizing travel delay to maximizing traffic volume (throughput) since the network performance (delay and energy consumption) is improved by changing objective function.

A discrete-time multi-input and multi-output (MIMO) model is applied for traffic system modeling, as shown in mathematical equation (60).

$$z(k+1) = F(z(k), v(k)) \qquad (60)$$

where F denotes the nonlinear relationships between traffic volumes z and phase duration v. k denotes a time step (a cycle with fixed time, e.g., 100 seconds).

The system $z(k+1)$ can be approximated by a bilinearized state-space form as shown in mathematical equation (61).

$$\Delta z(k+1) = A\Delta z(k) + B\Delta v(k) + (C\Delta v(k)) \odot \Delta z(k) \qquad (61)$$

where $A \in R(M \times M)$, $B \in R(M \times N)$, and $C \in R(M \times N)$ are the system parameters that can be estimated online (cycle-by-cycle) using normalized least squared algorithm. $\Delta z(k)$ and $\Delta v(k)$ are the volume increment and phase duration increment at $k^{th}$ time step, and the operator $\odot$ is the elementwise multiplication. Mathematical equation (61) can be reformulated as mathematical equation (62) if the following is defined: $y(k) = \Delta z(k)$ and $u(k) = \Delta v(k)$.

$$y(k+1) = Ay(k) + Bu(k) + (Cu(k)) \odot y(k) \qquad (62)$$

It is noted that $y(k+1) = \Delta z(k+1) = z(k+1) - z(k)$ is the traffic volume increment. Because the volume at current time step $z(k)$ is known (e.g., collect from traffic detectors at k), to maximize the future volume $z(k+1)$ is equivalent to maximize the volume change $y(k+1)$. Hence, the objective of bilinear control is to maximize the volume change of all movements M at k+1 by computing the optimal signal timings $v^*(k+1)$.

$$v^*(k+1) = \arg \max_{v(k+1)} \sum_{m=1}^{M} [y_m(k+1)] \qquad (63)$$

The optimal signal timings for all movements are bounded by the maximum and minimum green splits as shown in mathematical equation (64).

$$s.t. \ v_{min} \leq v^*(k+1) \leq v_{max} \qquad (64)$$

Another constraint is the fixed cycle length constraint defined in mathematical equation (65). For each intersection, all phases in one ring sum up to a fixed value of C, e.g., C=100 s.

$$\sum_{p=r}^{R} v_p = C \qquad (65)$$

where r denotes the identifier (ID) of the first phase in a ring and R denotes the ID of the last phase in a ring in Ring Barrier Controller.

Mathematical equations Eq. (60) to (65) demonstrate the use of a bilinear control model to compute optimal signal timings for the next cycle based on current traffic conditions. To plan AV trajectories and reduce energy consumption, optimal signal timing information for upcoming cycles should be provided in advance. Therefore, a predictive bilinear control model has been developed. Mathematical equation (66) predicts traffic volume for cycle $k+i(i \geq 2)$, while mathematical equation (67) aims to maximize the traffic volume for all movements M in future cycle i based on the predicted volume from mathematical equation (66). For computing signal timings for additional future cycles ($i \geq 2$), mathematical equation (66) and (67) are applied iteratively to generate optimal signal timings $v^*(k+i)$. The optimization problems in mathematical equations (63) and (67), along with online parameter estimation, can be solved using the Conjugate Gradient (CG) method implemented in SciPy.

$$y^\wedge(k+i) = Ay^\wedge(k+i-1) + B(v(k+i) - v*(k+i-1)) + \qquad (66)$$
$$C(v(k+i) - v*(k+i-1)) \odot y^\wedge(k+i-1)$$

$$v^*(k+1) = \arg \max_{v(k+1)} \sum_{m=1}^{M} [\hat{y}_m(k+i)] \qquad (67)$$

Figure 38:
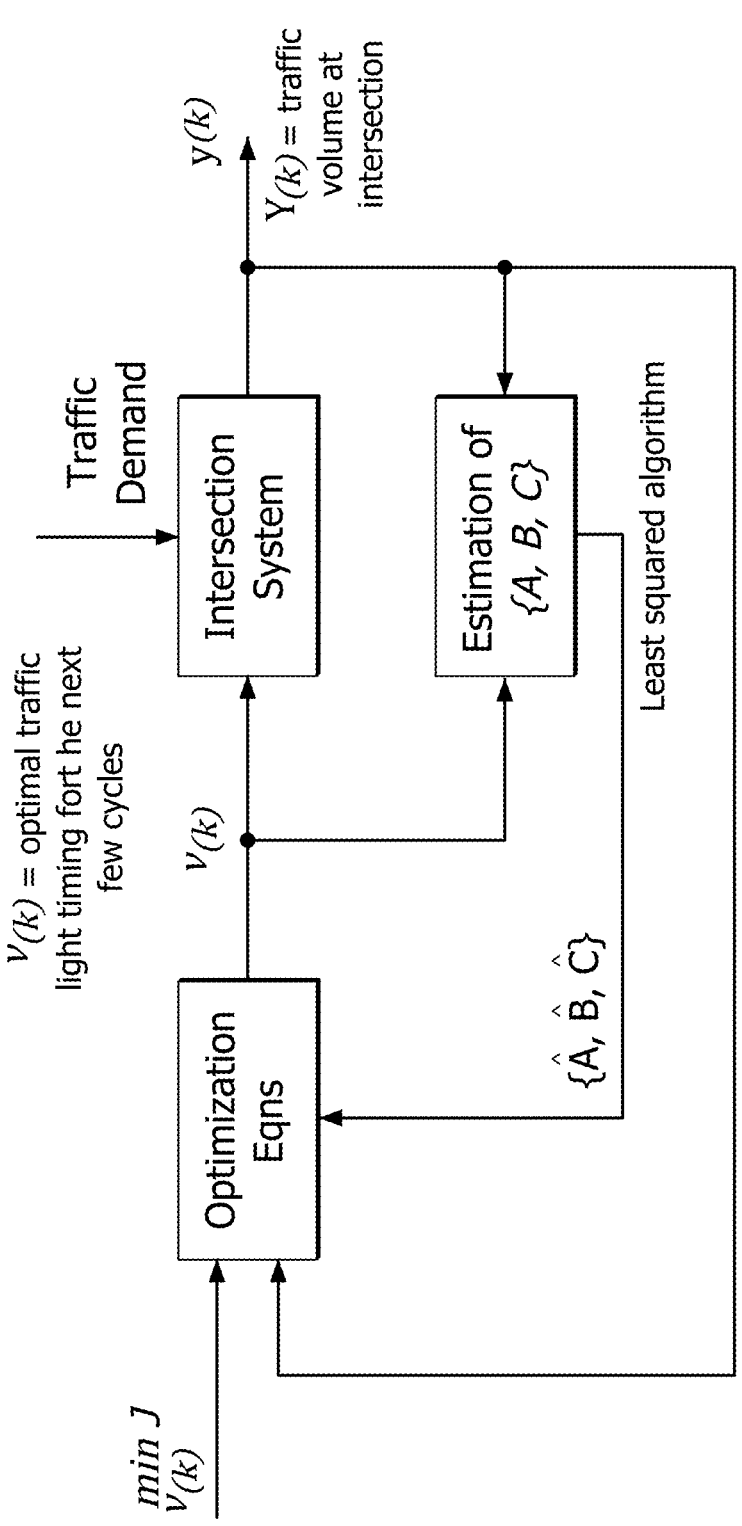
FIG. 38 provides an illustration of a closed loop bilinear control system structure.

FIG. 38 provides an illustration showing the closed loop structure of the bilinear signal control strategy. This is a real-time framework and contains the learning of the system as denoted in the online estimation of the parameter matrices A, B and C using online least squares algorithm. Since the system is of a bilinear structure where parameter matrices are linearly related to the system output y(k), the parameter estimation in the closed loop system should converge. In this context, once all the eigenvalues of the estimated matrix A are inside a unit circle of the complex plan, then the closed loop system should be always stable once the optimized signal timing plan v* is a uniformly bounded.

Figure 37:
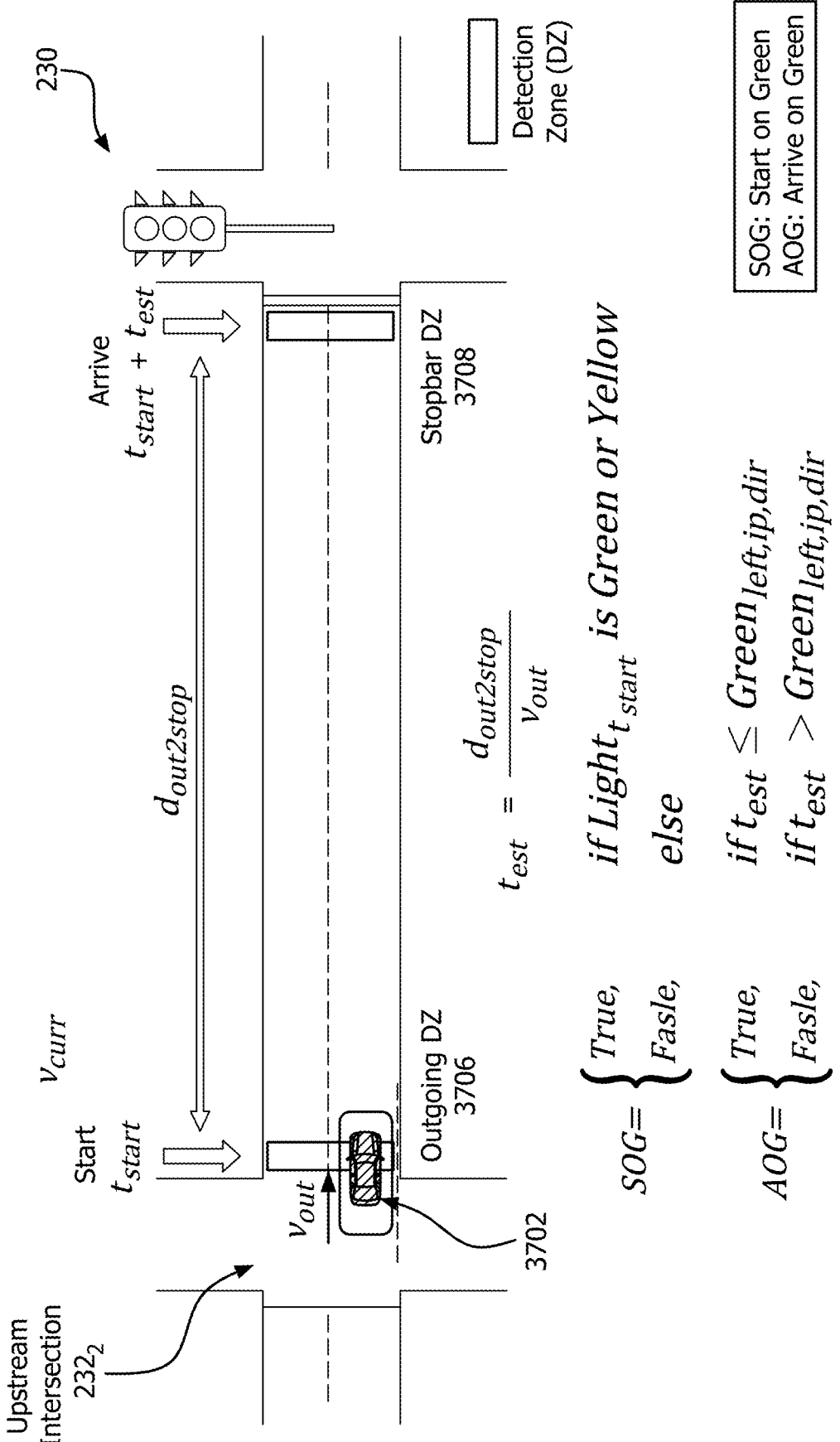
FIG. 37 provides an illustration of a dynamic arrival time estimation.

FIG. 39 provides a flow diagram of an illustrative method 3900 for controlling traffic lights (e.g., traffic lights 230 of FIG. 2 and FIG. 36) and/or vehicle(s) (e.g., vehicle 3702 of FIG. 37). Method 3900 may be performed fully or partially by a computing device (e.g., server(s) 2410 of FIG. 24, mobile communication device(s) 2418, 2456 of FIG. 24, vehicle on-board computing device 2520 of FIG. 20, computing device 2600 of FIG. 26, and/or server(s) 3514 of FIG. 35) implementing the bilinear speed control optimization module 204 of FIGS. 2 and/or 36.

Method 3900 begins with block 3902 and continues to block 3904 where a first detector (e.g., detector 2102 of FIG. 36) detects a vehicle (e.g., vehicle 3702 of FIG. 37) at a first intersection (e.g., upstream intersection $232_2$ of FIGS. 36-37). The first detector performs operations in block 3906 to record an activation time of the sensor that detected the vehicle at the first intersection. The sensor may be the first detector or one of a plurality of sensors of the first detector. Activation of the sensor may be triggered, for example, responsive to movement in its Field of View (FOV). The first detector also performs operation in block 3908 to record a travel speed of the vehicle.

In block 3910, the system (e.g., computing device 2600 of FIG. 26 and/or bilinear speed control optimization module 204 of FIGS. 2 and/or 36) performs operations to consider the activation time of the sensor as indicating the vehicle's departure time from the first intersection. In this regard, a value of the vehicle's departure time may be set equal to the activation time and stored in a datastore (e.g., memory 2612 of FIG. 26) for subsequent use.

The system also performs operations in block 3912 to synchronize the activation time with a signal phase at a second downstream intersection (e.g., intersection $232_1$ of FIGS. 36-37) to distinguish whether the vehicle started the journey when there was a green signal (or green light) or a red signal (or red light) at the second downstream intersection. In next block 3914, the system calculates an estimated travel time based on the recorded travel speed of the vehicle and a distance between either (i) the first detector and a second detector (e.g., detector $210_1$ of FIG. 36) at the second downstream intersection or (ii) the vehicle and the second detector. The vehicle's arrival time at the second downstream intersection is estimated in block 3916 by adding the estimated travel time to the vehicle's departure time. As noted above, the vehicle's departure time may be set to the activation time in previous block 3910).

The estimate travel time and/or estimated arrival time is/are compared in block 3918 to a remaining duration of the green light at the second downstream intersection. Based on results of this comparison, the system decides whether the vehicle will reach the second intersection during a green or yellow light. A decision that the vehicle will reach the second intersection during a green or yellow light may be made, for example, when the estimated travel time is less than the remaining duration of the green light phase, and/or when the estimated vehicle arrival time is before the end time of the green light phase or after the end of the green light phase by a certain threshold amount (e.g., 30 seconds). A decision that the vehicle will not reach the second intersection during a green or yellow light may be made, for example, when estimated travel time is greater than the remaining duration of the green light phase, when estimated travel time is less than the remaining duration of the green light phase plus a threshold amount, and/or when the estimated vehicle arrival time is after the end time of the green light phase and before the start of a next green light phase of the second intersection. If so [3920:YES], then method 3900 return to 3902 as shown by block 3922. If not [3920:NO], then method 3900 continues to block 3924 of FIG. 39B.

Block 3924 involves optionally performing operations by the system to modify a speed and/or trajectory of the vehicle to prevent, avoid, or reduce the probability or likelihood of stopping at a red light at the second downstream intersection. These operations can involve, for example: generating a command signal; communicating the command signal to an onboard computing device (e.g., vehicle on-board computing device 2520 of FIG. 25) of the vehicle to cause the speed of the vehicle to be decreased or increased, and/or to cause the vehicle's trajectory to be changed or replaced with a newly generated trajectory. Any known or to be known technique for changing, replacing, and/or generating vehicle trajectories can be used here.

Next block 3926 involves optionally controlling traffic lights (e.g., traffic lights 230 of FIGS. 36-37) for the next N downstream intersections to reduce vehicle stops due to read lights thereat and/or to improve traffic flow therethrough. Any known or to be known traffic light control technique can be used here. For example, the traffic light at one or more intersections can be controlled to increase or decrease a duration of a green light phase and/or a red light phase. Additionally or alternatively, the traffic lights at two or more intersections can be controlled to synchronize their green light phases such that the green lights occur at the same time, occur in overlapping time periods, and/or occur in sequential time periods. The present solution is not limited in this regard.

Subsequently, method 3900 continues to block 3928 where it ends or other operations are performed. For example, method 3900 may return to block 3902 of FIG. 39A.

Figure 40:
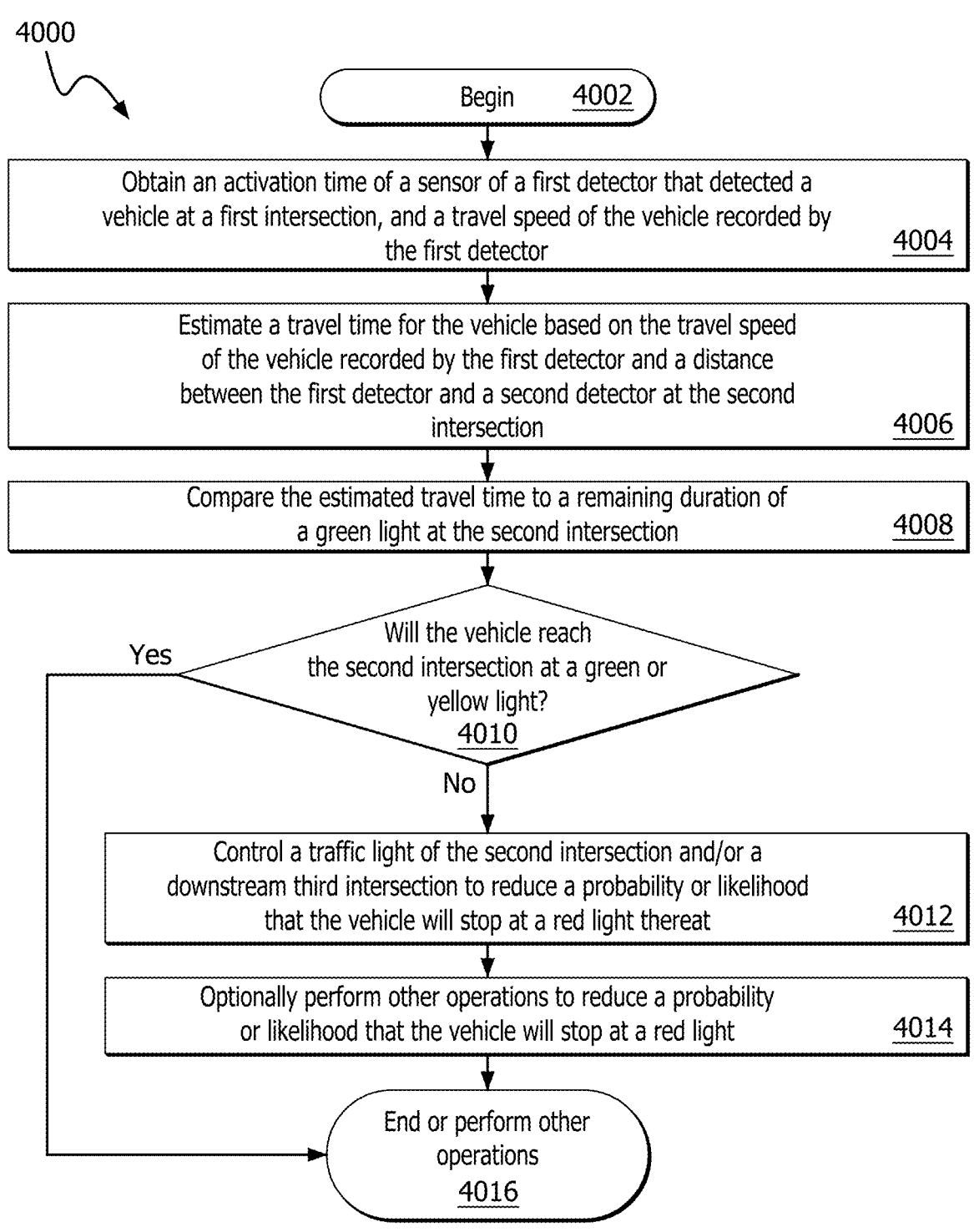
FIG. 40 provides a flow diagram of an illustrative method for controlling traffic flow.

FIG. 40 provides a flow diagram of an illustrative method 4000 for controlling traffic flow. Method 4000 may be performed fully or partially by a processor that is centralized or distributed. In this regard, method 4100 may be performed by server(s) 2410 of FIG. 24, mobile communication device(s) 2418, 2456 of FIG. 24, vehicle on-board computing device 2520 of FIG. 20, computing device 2600 of FIG. 26, and/or server(s) 3514 of FIG. 35.

Method 4000 begins with 4002 and continues with 4004 where a processor (e.g., central processing unit 2606 of FIG. 26) performs operations to obtain an activation time of a sensor of a first detector (e.g., detector $210_2$ of FIG. 36) that detected a vehicle (e.g., vehicle 3702 of FIG. 37) at a first intersection (e.g., intersection $232_2$ of FIGS. 36-37), and a travel speed of the vehicle recorded by the first detector. Next in 4006, the processor performs operations to estimate a travel time for the vehicle based on the travel speed of the vehicle recorded by the first detector and a distance between the first detector and a second detector (e.g., detector 21012 of FIG. 36) at the second intersection (e.g., intersection $232_1$ of FIGS. 36-37). The processor compares the estimated travel time to a remaining duration of a green light at the second intersection, as shown by block 4008.

In some scenarios, block 4008 also involves using the activation time to make the determination as to whether the vehicle started the journey from the first intersection to a second intersection when there was a green light at the second intersection. The comparison operation may be performed when the processor determines that the vehicle started the journey from the first intersection to a second intersection when there was a green light at the second intersection.

In those or other scenarios, block 4008 also involves: setting a value of a vehicle departure time equal to a value of the activation time; and using the vehicle departure time to determine whether the vehicle started a journey from the first intersection to a second intersection when there was a green light at the second intersection. The comparison operation may be performed when the processor determines that the vehicle started the journey from the first intersection to a second intersection when there was a green light at the second intersection.

Based on results of this comparison, the processor determines in decision block 4010 whether the vehicle will reach the second intersection during a green or yellow light. These operations may involve: synchronizing the activation time with a green signal phase at the second intersection; synchronizing the vehicle departure time with a green signal phase at the second intersection; and/or estimating an arrival time for the vehicle at the second intersection by adding the travel time estimated for the vehicle to the activation time. For example, a determination may be made that the vehicle will reach the second intersection during a green light and/or a yellow light when the estimated travel time is less than the remaining duration of a green light at the second intersection. In contrast, a determination may be made that the vehicle will not reach the second intersection during a green or yellow light when the estimated travel time is equal to or greater than (e.g., by a certain amount) the remaining duration of a green light at the second intersection. The present solution is not limited to the particulars of this example.

When a determination is made that the vehicle will not reach the second intersection at the green or yellow light [4010:NO], the processor performs operations in block 4012 to control the traffic light (e.g., traffic light 230 of FIG. 36-37) of one or both of the second intersection and a downstream intersection (e.g., a third intersection) to reduce a probability or likelihood that the vehicle will stop at a red light thereat.

The processor may optionally perform other operations in block 4014 to reduce a probability or likelihood that the vehicle will stop at a red light. These operations can involve, for example: predicting a queue length defined by a number of vehicles in a queue at the second intersection or a downstream intersection based on a traffic volume and vehicle speeds that were detected during a past period of time by the first detector; obtaining a current location of the vehicle; computing a distance to the second or third intersection from the vehicle's current location; generating a desired speed for the vehicle based on (i) the traffic volume and vehicle speeds, (ii) traffic signal phase and timing data for at least a next two cycles, (iii) the predicted queue length at the second or third intersection, (iv) the current location of the vehicle, (v) the computed distance to the second intersection, and (vi) a current time; using the desired speed to generate a command for changing a travel speed of the vehicle; and/or communicating, from the processor to the vehicle, the command to change its travel speed. The command may be configured to cause autonomous operations to be performed by the vehicle to change its travel speed. The desired speed may be generated further based on a speed limit associated with at least one road along which the vehicle is to travel to reach the second or third intersection.

Subsequently, method 4000 continues to block 4016 where it ends or other operations are performed. For example, method 4000 may return to block 4002.

The various methods have been described above may be combined with each other and implemented in a centralized or distributed system. For example, operations of methods 2700, 3300, 3900 and/or 4000 may be combined in any order to form a combined method in accordance with a given application.

Figure 41:
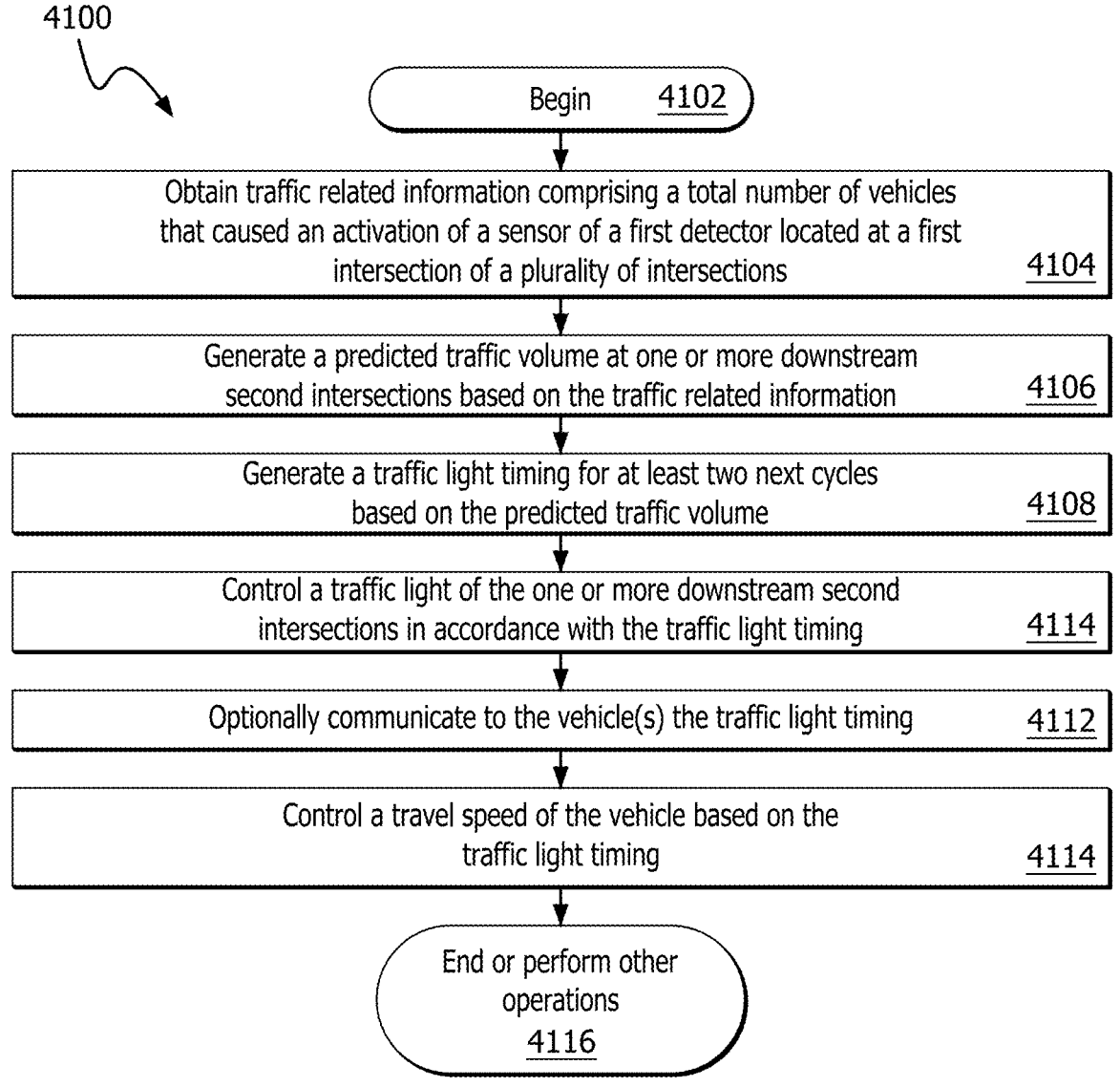
FIG. 41 provides a flow diagram of another illustrative method for controlling traffic flow.

FIG. 41 provides a flow diagram of an illustrative method 4100 for controlling traffic flow on road. Method 4100 may be performed fully or partially by a processor that is centralized or distributed. In this regard, method 4100 may be performed by server(s) 2410 of FIG. 24, mobile communication device(s) 2418, 2456 of FIG. 24, vehicle on-board computing device 2520 of FIG. 20, computing device 2600 of FIG. 26, and/or server(s) 3514 of FIG. 35.

Method 4100 begins with block 4102 and continues to block 4104 where a processor performs operations to obtain traffic related information comprising a total number of vehicles that caused an activation of a sensor of a first detector located at a first intersection of a plurality of intersections. Next in block 4106, the processor generates a predicted traffic volume at one or more downstream second intersections based on the traffic related information. The processor also performs operations in blocks 4108-4110 to: generate the traffic light timing in block 4108 for at least two next cycles based on the predicted traffic volume; and control the traffic light of the one or more downstream second intersections in accordance with the traffic light timing. The traffic light may be controlled so as to reduce a probability or likelihood that the vehicle will stop at a red light thereat.

The operations of block 4108 may involve performing one or more iterations of the following operations: using a current traffic volumes at the plurality of intersections as a first input of a predictive bilinear control algorithm; using a signal timing at the plurality of intersections as a second input of the predictive bilinear control algorithm; using a combination of the first and second input as a third input to the predictive bilinear control algorithm; and solving the predictive bilinear control algorithm to obtain the traffic light timing. The predictive bilinear control algorithm may implement an objective function to maximize a traffic volume during a next cycle of the traffic lights, timing constraints for the traffic light timing, and sequential least square regression to solve an optimization traffic light timing problem. Above mathematical equations (60)-(67) show one way to implement these iterative operations.

In some scenarios, the first, second and third inputs to the predictive bilinear control algorithm are assigned weights by the predictive bilinear control algorithm. A different weight may be assigned to each of the first, second and third inputs. The weights may be dynamically updated based on an output of the predictive bilinear control algorithm during a previous iteration.

Method 4100 may also involve performing optional operations of blocks 4112-4114. These operations involve: communicating, from the processor to the vehicle, the traffic light timing; and controlling a travel speed of the vehicle based on the traffic light timing to further reduce a probability or likelihood that the vehicle will stop at a red light thereat. Subsequently, method 4100 ends or other operations are performed in block 4116 (e.g., return to 4102).

The travel speed of the vehicle may be controlled in block 4114 by: predicting a queue length defined by a number of vehicles in a queue at the second intersection or another (e.g., third) intersection based on a traffic volume and vehicle speeds that were detected during a past period of time by the first detector; obtaining a current location of the vehicle; computing a distance to the second or other (e.g., third) intersection from the vehicle's current location; generating a desired speed for the vehicle based on (i) the traffic volume and vehicle speeds, (ii) the traffic light timing for at least a next two cycles, (iii) the predicted queue length at the second or third intersection, (iv) the current location of the vehicle, (v) the computed distance to the second intersection, and (vi) a current time; and using the desired speed to generate the command for changing a travel speed of the vehicle. The travel speed of the vehicle may be controlled based on the desired speed. The desired speed may be generated further based on a speed limit associated with at least one road along which the vehicle is to travel to reach the second or third intersection.

As evident from the above discussion, the present solution concerns implementing systems and methods for controlling a speed of a vehicle traveling over a terrain. The methods comprise: predicting, by a mobile device, a queue length defined by the number of vehicles in a queue at a downstream intersection based on a traffic volume and vehicle speeds that were detected during a past period of time by a detector located at or near an upstream intersection; sensing, by sensors of the mobile device, a velocity of the vehicle and a location of the vehicle; computing, by the mobile device, a distance to a downstream intersection from the sensed location of the vehicle; generating, by the mobile device, a desired speed for the vehicle based on (i) the traffic volume and vehicle speeds, (ii) signal phase and timing data for at least a next two cycles, (iii) the predicted queue length at the downstream intersection, (iv) the sensed velocity and location of the vehicle, (v) the computed distance to the downstream intersection, (vi) a current time, and/or (v) a speed limit associated with at least one road along which the vehicle is to travel to reach the downstream intersection; using the desired speed to facilitate control of the speed of the vehicle while the vehicle is traveling over the terrain; periodically repeating the predicting, sensing, computing, generating and using while the vehicle is traveling over the terrain; and/or outputting the desired speed visually, auditorily and/or tactically from the mobile device and or the vehicle.

The use of the desired speed to facilitate control of the speed of the vehicle can involve, for example: communicating the desired speed from the mobile device to an on-board computing device of the vehicle; and performing autonomous operations by the vehicle to reduce or increase the speed thereof in accordance with the desired speed.

The queue length at the downstream intersection may be predicted using a modeled relationship between traffic density and traffic flow at a particular location. The methods may also include selectively adjusting the predicted queue length based on range data generated by a vehicle's radar. The predicted queue length may not be selectively adjusted when the range data indicates that a detected speed of a preceding vehicle falls within a pre-specified range of speeds for stopped vehicles. The predicted queue length may be set to zero when (i) the range data indicates that a preceding vehicle has not been detected and the distance to the downstream intersection is less than or equal to a detection range of the radar of the vehicle, or (ii) a signal at the downstream intersection is green and the range data indicates that a preceding vehicle has been detected with speed falling within a pre-specified range of speeds for stopped vehicles. The predicted queue length may be set to another previously predicted queue length when the distance to the downstream intersection is greater than the detection range of the vehicle's radar, and the range data indicates that a preceding vehicle has not been detected.

The present solution also concerns a non-transitory computer-readable medium that stores instructions that is configured to, when executed by at least one computing device, cause the at least one computing device to perform operations comprising: predicting a queue length defined by a number of vehicles in a queue at a downstream intersection based on a traffic volume and vehicle speeds that were detected during a past period of time by a detector located at or near an upstream intersection; sensing a velocity of the vehicle and a location of the vehicle; computing a distance to a downstream intersection from the sensed location of the vehicle; generating a desired speed for the vehicle based on (i) the traffic volume and vehicle speeds, (ii) signal phase and timing data for at least a next two cycles, (iii) the predicted queue length at the downstream intersection, (iv) the sensed velocity and location of the vehicle, (v) the computed distance to the downstream intersection, (vi) a current time; using the desired speed to facilitate control of the speed of the vehicle while the vehicle is traveling over the terrain, and/or (v) a speed limit associated with at least one road along which the vehicle is to travel to reach the downstream intersection; periodically repeat the predicting, sensing, computing, generating and using while the vehicle is traveling over the terrain; and/or output the desired speed visually, auditorily and/or tactically from the mobile device and or the vehicle.

The desired speed may used to facilitate control of the speed of the vehicle by: communicating the desired speed from the mobile device to an on-board computing device of the vehicle; and performing autonomous operations by the vehicle to reduce or increase the speed thereof in accordance with the desired speed.

The queue length at the downstream intersection may be predicted using a modeled relationship between traffic density and traffic flow at a particular location. The predicted queue length may be selectively adjusted based on range data generated by a radar of the vehicle. The predicted queue length may not be selectively adjusted when the range data indicates that a detected speed of a preceding vehicle falls within a pre-specified range of speeds for stopped vehicles. The predicted queue length may be selectively adjusted by setting the predicted queue length to zero when (i) the range data indicates that a preceding vehicle has not been detected and the distance to the downstream intersection is less than or equal to a detection range of the radar of the vehicle, or (ii) a signal at the downstream intersection is green and the range data indicates that a preceding vehicle has been detected with a speed falling within a pre-specified range of speeds for stopped vehicles. The predicted queue length may be selectively adjusted by setting the predicted queue length to another previously predicted queue length when the distance to the downstream intersection is greater than a detection range of the radar of the vehicle and the range data indicates that a preceding vehicle has not been detected.

Additionally or alternatively, the present solution concerns implementing systems and methods for controlling traffic flow on road. The method steps are performed by a processor which may be centralized or distributed amongst various computing devices. For example, the method steps may be performed by server(s), mobile communication device(s), and/or vehicle on-board computing device(s). The methods involve: obtaining an activation time of a sensor of a first detector that detected a vehicle at a first intersection, and a travel speed of the vehicle recorded by the first detector; estimating a travel time for the vehicle based on the travel speed of the vehicle recorded by the first detector and a distance between the first detector and a second detector at the second intersection; comparing the estimated travel time to a remaining duration of a green light at the second intersection; determining whether the vehicle will reach the second intersection during a green or yellow light based on said comparing; and controlling the traffic light of one or both of the second intersection and a downstream third intersection to reduce a probability or likelihood that the vehicle will stop at a red light thereat, when a determination is made that the vehicle will not reach the second intersection at the green or yellow light.

The method may also comprise: using the activation time to determine whether the vehicle started a journey from the first intersection to a second intersection when there was a green light at the second intersection; setting a value of a vehicle departure time equal to a value of the activation time; using the vehicle departure time to determine whether the vehicle started a journey from the first intersection to a second intersection when there was a green light at the second intersection; synchronizing the activation time with a signal phase at the second intersection; estimating an arrival time for the vehicle at the second intersection by adding the travel time estimated for the vehicle to the activation time; and/or communicating, to the vehicle, a command to change its travel speed to reduce a probability or likelihood that the vehicle will stop at a red light thereat, when a determination is made that the vehicle will not reach the second intersection at the green or yellow light.

Additionally or alternatively, the methods may also involve: predicting a queue length defined by a number of vehicles in a queue at the second intersection or the third intersection based on a traffic volume and vehicle speeds that were detected during a past period of time by the first detector; obtaining a current location of the vehicle; computing a distance to the second or third intersection from the vehicle's current location; generating a desired speed for the vehicle based on (i) the traffic volume and vehicle speeds, (ii) traffic signal phase and timing data for at least a next two cycles, (iii) the predicted queue length at the second or third intersection, (iv) the current location of the vehicle, (v) the computed distance to the second intersection, and (vi) a current time; and using the desired speed to generate the command for changing a travel speed of the vehicle. The command may be configured to cause autonomous operations to be performed by the vehicle to change its travel speed. Generation of the desired speed may be further based on a speed limit associated with at least one road along which the vehicle is to travel to reach the second or third intersection.

The present solution also concerns a non-transitory computer-readable medium that stores instructions that is configured to, when executed by at least one computing device, cause the at least one computing device to perform operations comprising: obtain an activation time of a sensor of a first detector that detected a vehicle at a first intersection, and a travel speed of the vehicle recorded by the first detector; estimate a travel time for the vehicle based on the travel speed of the vehicle recorded by the first detector and a distance between the first detector and a second detector at the second intersection; compare the estimated travel time to a remaining duration of a green light at the second intersection; determine whether the vehicle will reach the second intersection during a green or yellow light based on said comparing; and control the traffic light of one or both of the second intersection and a downstream third intersection to reduce a probability or likelihood that the vehicle will stop at a red light thereat, when a determination is made that the vehicle will not reach the second intersection at the green or yellow light.

The computing device may also be caused to: use the activation time to determine whether the vehicle started a journey from the first intersection to a second intersection when there was a green light at the second intersection; set a value of a vehicle departure time equal to a value of the activation time; use the vehicle departure time to determine whether the vehicle started a journey from the first intersection to a second intersection when there was a green light at the second intersection; synchronize the activation time with a signal phase at the second intersection; estimate an arrival time for the vehicle at the second intersection by adding the travel time estimated for the vehicle to the activation time; and communicate to the vehicle a command to change its travel speed to reduce a probability or likelihood that the vehicle will stop at a red light thereat, when a determination is made that the vehicle will not reach the second intersection at the green or yellow light.

Additionally or alternatively, the computing device may also be caused to: predict a queue length defined by a number of vehicles in a queue at the second intersection or the third intersection based on a traffic volume and vehicle speeds that were detected during a past period of time by the first detector; obtain a current location of the vehicle; compute a distance to the second or third intersection from the vehicle's current location; generate a desired speed for the vehicle based on (i) the traffic volume and vehicle speeds, (ii) traffic signal phase and timing data for at least a next two cycles, (iii) the predicted queue length at the second or third intersection, (iv) the current location of the vehicle, (v) the computed distance to the second intersection, and (vi) a current time; and use the desired speed to generate the command for changing a travel speed of the vehicle. The command may be configured to cause autonomous operations to be performed by the vehicle to change its travel speed. The desired speed may be generated further based on a speed limit associated with at least one road along which the vehicle is to travel to reach the second or third intersection.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

What is claimed is:

1. A method for controlling a speed of a vehicle traveling over a terrain, comprising:

predicting, by a mobile device, a queue length defined by a number of vehicles in a queue at a downstream intersection based on a traffic volume and vehicle speeds that were detected during a past period of time by a detector located at or near an upstream intersection;

selectively adjusting the predicted queue length based on range data generated by a radar of the vehicle;

sensing, by sensors of the mobile device, a velocity of the vehicle and a location of the vehicle;

computing, by the mobile device, a distance to a downstream intersection from the sensed location of the vehicle;

generating, by the mobile device, a desired speed for the vehicle based on (i) the traffic volume and vehicle speeds, (ii) traffic signal phase and timing data for at least a next two cycles, (iii) the predicted queue length at the downstream intersection, (iv) the sensed velocity and location of the vehicle, (v) the computed distance to the downstream intersection, (vi) a current time, and (vii) a predicted speed and time when the vehicle will reach a vehicle stopped farthest from the downstream intersection; and selecting a mode from a plurality of different modes for the vehicle based on at least one criteria being met, the plurality of different modes comprising an intelligent driver mode, a cruising mode, a coasting mode, and a braking mode;

using the desired speed to facilitate control of the speed of the vehicle while the vehicle is traveling over the terrain;

wherein the adjusting comprises setting the predicted queue length to zero when the range data indicates that a preceding vehicle has not been detected and the distance to the downstream intersection is less than or equal to a detection range of the radar of the vehicle; and wherein the at least one criteria comprises a distance from the vehicle to an end of a predicted queue exceeds a given distance value, an initial desired speed for the vehicle is within a determined range of target velocities, a current velocity of the vehicle exceeds a given percentage of a speed limit, a maximum time window is greater than zero, and an energy-optimal braking deceleration does or does not exist.

2. The method according to claim 1, wherein said using the desired speed to facilitate control of the speed of the vehicle comprises:

communicating the desired speed from the mobile device to an on-board computing device of the vehicle; and performing autonomous operations by the vehicle to reduce or increase the speed thereof in accordance with the desired speed.

3. The method according to claim 1, further comprising periodically repeating the predicting, sensing, computing, generating, and using while the vehicle is traveling over the terrain.

4. The method according to claim 1, further comprising outputting the desired speed visually, auditorily and/or tactically from the mobile device and or the vehicle.

5. The method according to claim 1, wherein said generating, by the mobile device, a desired speed further based on a speed limit associated with at least one road along which the vehicle is to travel to reach the downstream intersection.

6. The method according to claim 1, wherein the queue length at the downstream intersection is predicted using a modeled relationship between traffic density and traffic flow at a particular location.

7. The method according to claim 1, wherein the predicted queue length is not selectively adjusted when the range data indicates that a detected speed of a preceding vehicle falls within a pre-specified range of speeds for stopped vehicles.

8. The method according to claim 1, wherein the adjusting comprises setting the predicted queue length to another previously predicted queue length when the distance to the downstream intersection from the sensed location of the vehicle is greater than a detection range of the radar of the vehicle and the range data indicates that a preceding vehicle has not been detected.

9. A non-transitory computer-readable medium that stores instructions that is configured to, when executed by at least one computing device, cause the at least one computing device to perform operations comprising:

predicting a queue length defined by a number of vehicles in a queue at a downstream intersection based on a traffic volume and vehicle speeds that were detected during a past period of time by a detector located at or near an upstream intersection;

selectively adjusting the predicted queue length based on range data generated by a radar of the vehicle;

sensing a velocity of the vehicle and a location of the vehicle;

computing a distance to a downstream intersection from the sensed location of the vehicle;

generating a desired speed for the vehicle based on (i) the traffic volume and vehicle speeds, (ii) signal phase and timing data for at least a next two cycles, (iii) the predicted queue length at the downstream intersection, (iv) the sensed velocity and location of the vehicle, (v) the computed distance to the downstream intersection, (vi) a current time, and (vii) a predicted speed and time when the vehicle will reach a vehicle stopped farthest from the downstream intersection;

selecting a mode from a plurality of different modes for the vehicle based on at least one criteria being met, the plurality of different modes comprising an intelligent driver mode, a cruising mode, a coasting mode, and a braking mode; and using the desired speed to facilitate control of the speed of the vehicle while the vehicle is traveling over the terrain;

wherein the adjusting comprises setting the predicted queue length to zero when the range data indicates that a preceding vehicle has not been detected and the distance to the downstream intersection is less than or equal to a detection range of the radar of the vehicle; and wherein the at least one criteria comprises a distance from the vehicle to an end of a predicted queue exceeds a given distance value, an initial desired speed for the vehicle is within a determined range of target velocities, a current velocity of the vehicle exceeds a given percentage of a speed limit, a maximum time window is greater than zero, and an energy-optimal braking deceleration does or does not exist.

10. The non-transitory computer-readable medium according to claim 9, wherein the desired speed is used to facilitate control of the speed of the vehicle by:

communicating the desired speed from the mobile device to an on-board computing device of the vehicle; and performing autonomous operations by the vehicle to reduce or increase the speed thereof in accordance with the desired speed.

11. The non-transitory computer-readable medium according to claim 9, wherein the at least one computing device is further caused to periodically repeat the predicting, sensing, computing, generating, and using while the vehicle is traveling over the terrain.

12. The non-transitory computer-readable medium according to claim 9, wherein the at least one computing device is further caused to output the desired speed visually, auditorily and/or tactically from the mobile device and or the vehicle.

13. The non-transitory computer-readable medium according to claim 9, wherein the desired speed is generated further based on a speed limit associated with at least one road along which the vehicle is to travel to reach the downstream intersection.

14. The non-transitory computer-readable medium according to claim 9, wherein the queue length at the downstream intersection is predicted using a modeled relationship between traffic density and traffic flow at a particular location.

15. The non-transitory computer-readable medium according to claim 9, wherein the predicted queue length is not selectively adjusted when the range data indicates that a detected speed of a preceding vehicle falls within a pre-specified range of speeds for stopped vehicles.

16. The non-transitory computer-readable medium according to claim 9, wherein the predicted queue length is selectively adjusted by setting the predicted queue length to another previously predicted queue length when the distance to the downstream intersection from the sensed location of the vehicle is greater than a detection range of the radar of the vehicle and the range data indicates that no preceding vehicle has not been detected.

17. The non-transitory computer-readable medium according to claim 9, wherein the at least one computing device is further configured to perform vehicle-to-infrastructure (V2I) communications.

* * * * *